US012607221B2

(12) United States Patent
Han et al.

(10) Patent No.: US 12,607,221 B2
(45) Date of Patent: Apr. 21, 2026

(54) HINGE STRUCTURE AND ELECTRONIC APPARATUS INCLUDING SAME

(71) Applicant: SAMSUNG ELECTRONICS CO., LTD., Suwon-si (KR)

(72) Inventors: Yonghwa Han, Suwon-si (KR); Iksu Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 495 days.

(21) Appl. No.: 18/120,182

(22) Filed: Mar. 10, 2023

(65) Prior Publication Data

US 2023/0213056 A1     Jul. 6, 2023

Related U.S. Application Data

(63) Continuation of application No. PCT/KR2021/014126, filed on Oct. 13, 2021.

(30) Foreign Application Priority Data

Oct. 16, 2020     (KR) ........................ 10-2020-0134173

(51) Int. Cl.
*F16C 11/04*        (2006.01)
*H04M 1/02*        (2006.01)
(52) U.S. Cl.
CPC ........... *F16C 11/04* (2013.01); *H04M 1/0214* (2013.01)
(58) Field of Classification Search
CPC ... F16C 11/04; H04M 1/0214; H04M 1/0216; H04M 1/022; H04M 1/0268;
(Continued)

(56) References Cited

U.S. PATENT DOCUMENTS 6,917,824 B2     7/2005 Kobayashi
7,676,889 B2     3/2010 Kim
(Continued)

FOREIGN PATENT DOCUMENTS

CN          111698355 A      9/2020
JP        2003-161312 A      6/2003
(Continued)

OTHER PUBLICATIONS

Communication issued on Jan. 8, 2025 by the Korean Intellectual Property Office in counterpart Korean Patent Application No. 10-2020-0134173.

(Continued)

*Primary Examiner* — Eugene Yun
(74) *Attorney, Agent, or Firm* — Sughrue Mion, PLLC

(57)        ABSTRACT

Disclosed is an electronic apparatus. The electronic apparatus includes a first housing, a second housing, and a hinge structure connected to the first housing and the second housing. The hinge structure may include: a first arm shaft associated with the rotation of the first housing and parallel to the axial direction; a second arm shaft associated with the rotation of the second housing and parallel to the axial direction; a first arm cam and a second arm cam, which rotate together with the first arm shaft; a third arm cam and a fourth arm cam, which rotate together with the second arm shaft; a first cam member that includes a first moving cam fastened to the first arm cam and a second moving cam fastened to the third arm cam; a second cam member that includes a third moving cam fastened to the second arm cam and a fourth moving cam fastened to the fourth arm cam; a first elastic member coupled to the first arm shaft and disposed between the first cam member and the second cam member; and a second elastic member coupled to the second arm shaft and disposed between the first cam member and
(Continued)

the second cam member. Various other embodiments that can be understood through the specification are also possible.

15 Claims, 18 Drawing Sheets

(58) Field of Classification Search
CPC .... G06F 1/1652; G06F 1/1656; G06F 1/1679; G06F 1/1681; G06F 1/1616
USPC ........................................................ 455/575.3
See application file for complete search history.

(56) References Cited

U.S. PATENT DOCUMENTS

| | | | |
|---|---|---|---|
| 9,250,733 B2 | 2/2016 | Lee et al. | |
| 9,921,613 B2 | 3/2018 | Kuramochi | |
| 10,423,019 B1* | 9/2019 | Song | G06F 1/1652 |
| 10,551,880 B1 | 2/2020 | Ai et al. | |
| 11,336,759 B2 | 5/2022 | Liao et al. | |
| 11,353,932 B2 | 6/2022 | Kim et al. | |
| 11,360,526 B2 | 6/2022 | Kim et al. | |
| 11,385,686 B2 | 7/2022 | Ai et al. | |
| 11,467,633 B2 | 10/2022 | Liao et al. | |
| 11,726,532 B2 | 8/2023 | Kim et al. | |
| 2002/0173281 A1* | 11/2002 | Kobayashi | H04M 1/0218 |
| | | | 455/575.1 |
| 2007/0039133 A1 | 2/2007 | Kim | |
| 2010/0064478 A1 | 3/2010 | Duan et al. | |
| 2012/0182677 A1 | 7/2012 | Seo | |
| 2020/0166974 A1 | 5/2020 | Ai et al. | |
| 2021/0368032 A1 | 11/2021 | Liao et al. | |
| 2022/0004232 A1 | 1/2022 | Wu et al. | |
| 2022/0100238 A1* | 3/2022 | Siddiqui | G06F 1/1641 |
| 2022/0104370 A1 | 3/2022 | Wu et al. | |
| 2022/0137676 A1 | 5/2022 | Tian et al. | |
| 2022/0303371 A1 | 9/2022 | Liao et al. | |

FOREIGN PATENT DOCUMENTS

| | | | |
|---|---|---|---|
| JP | 2012-251572 A | 12/2012 | |
| KR | 10-2005-0002561 A | 1/2005 | |
| KR | 10-2006-0101637 A | 9/2006 | |
| KR | 10-0630138 B1 | 10/2006 | |
| KR | 10-0949839 B1 | 3/2010 | |
| KR | 10-2015-0096827 A | 8/2015 | |
| KR | 10-2017-0136983 A | 12/2017 | |
| KR | 10-2020-0101251 A | 8/2020 | |
| WO | 2007/029546 A1 | 3/2007 | |
| WO | 2020/186889 A1 | 9/2020 | |

OTHER PUBLICATIONS

Search Report (PCT/ISA/210) issued Feb. 4, 2022 by the International Searching Authority for International Patent Application No. PCT/KR2021/014126.

Written Opinion (PCT/ISA/237) issued Feb. 4, 2022 by the International Searching Authority for International Patent Application No. PCT/KR2021/014126.

Search Report issued on Jan. 3, 2024 by European Patent Office in European Patent Application No. 21880506.7.

Communication issued Sep. 12, 2025 by the Korean Intellectual Property Office in Korean Patent Application No. 10-2020-0134173.

* cited by examiner

100
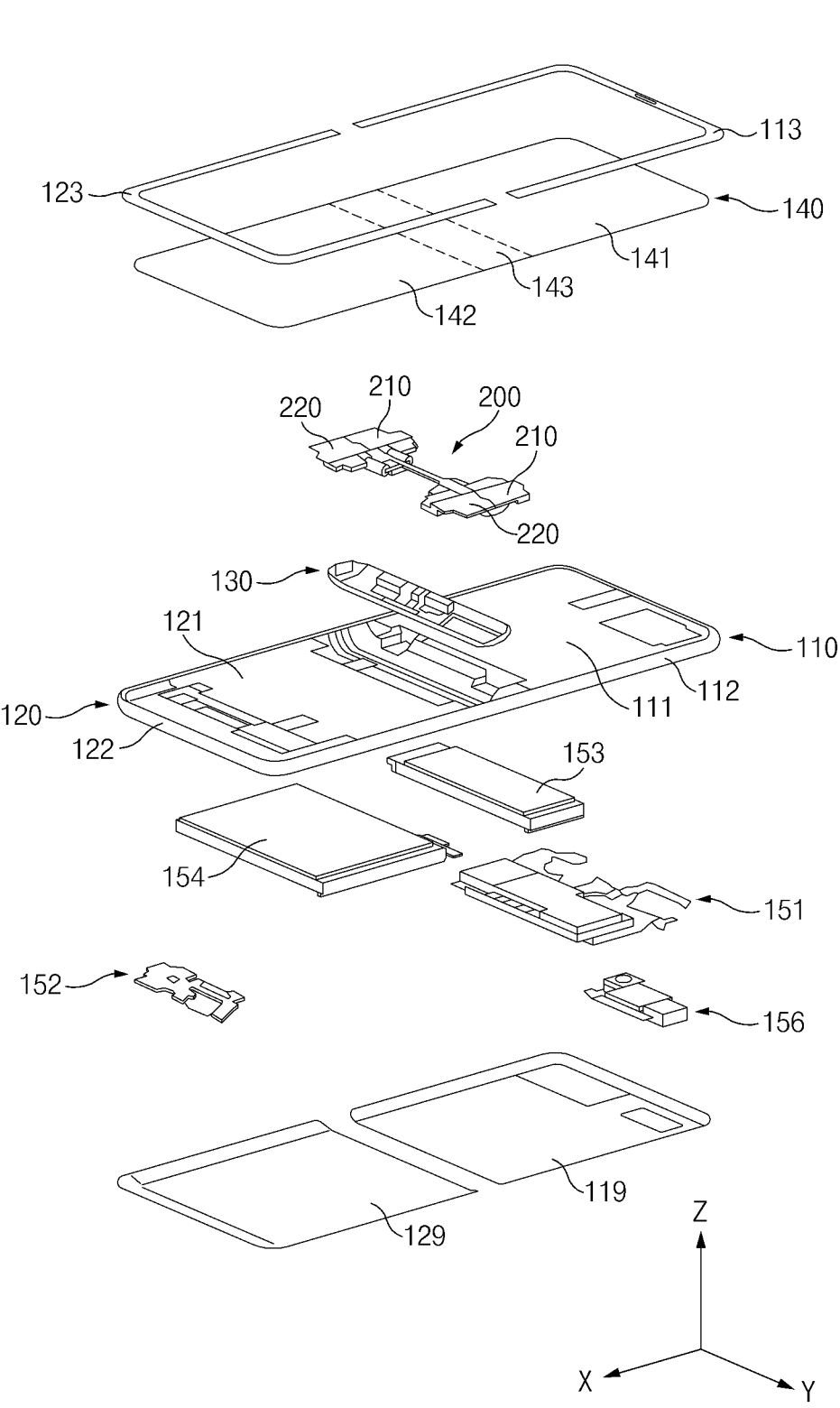
F I G . 1

100

100

202

① ←——— AXIAL DIRECTION ———→ ②

200

200

FOLDING DIRECTION

① ←→ ②

AXIAL DIRECTION

UNFOLDING DIRECTION

HINGE STRUCTURE AND ELECTRONIC APPARATUS INCLUDING SAME

CROSS-REFERENCE TO RELATED APPLICATIONS

This application is a Bypass Continuation Application of International Patent Application No. PCT/KR2021/014126, filed on Oct. 13, 2021, which claims priority from Korean Patent Application No. 10-2020-0134173 filed on Oct. 16, 2020, in the Korean Intellectual Property Office, the disclosure of which is incorporated by reference herein in its entirety.

TECHNICAL FIELD

Embodiments of the disclosure relate to a hinge structure and an electronic device including the same.

BACKGROUND ART

A portable electronic device, such as a smartphone, may provide various functions, such as telephone call, video playback, Internet search, and the like, based on various types of applications. A user may want to use the aforementioned various functions through a wider screen. However, portability may be deteriorated with an increase in the size of the screen of the portable electronic device. Accordingly, a foldable electronic device including a flexible display, a partial region of which is deformable to be curved or flat, is being developed. The foldable electronic device may include a hinge structure to fold or unfold the flexible display.

The hinge structure of the foldable electronic device may be connected with adjacent housings such that each of the adjacent housings rotates through a predetermined angle. As the adjacent housings rotate, the flexible display may be unfolded or folded.

SUMMARY

Restoring forces to return the flexible display in a folded state to a flat state may act on the flexible display. The restoring forces may impede a folding operation of the foldable electronic device. To solve this problem, the foldable electronic device may include a friction structure that provides friction torques having a specified magnitude to stably maintain the folded state. Due to the friction structure, relatively large rotational torques may be required to unfold the foldable electronic device in the folded state. For example, a user has to rotate the housings connected to opposite sides of the hinge structure with larger torques. For example, the user cannot unfold the foldable electronic device with one hand.

Embodiments of the disclosure provide a hinge structure for providing a semi-automatic unfolding section in which the hinge structure is further unfolded to an additional angle without an additional external force when unfolded to a predetermined angle in a folded state and a free-stop section in which the hinge structure is able to stably maintain folded states at various angles, and a foldable electronic device including the hinge structure.

An embodiment provides an electronic device including: a first housing; a second housing; and a hinge structure connected to the first housing and the second housing such that the first housing rotates about a first rotational axis parallel to an axial direction and the second housing rotates about a second rotational axis parallel to the axial direction.

The hinge structure includes: a first arm shaft configured to operate with a rotation of the first housing, the first arm shaft being parallel to the axial direction; a second arm shaft configured to operate with a rotation of the second housing, the second arm shaft being parallel to the axial direction; a first arm cam and a second arm cam, both configured to rotate together with the first arm shaft; a third arm cam and a fourth arm cam, both configured to rotate together with the second arm shaft; a first cam member including a first moving cam and a second moving cam, the first moving cam being engaged with the first arm cam and the second moving cam being engaged with the third arm cam, and the first cam member being configured to move in the axial direction along the first arm shaft and the second arm shaft; a second cam member including a third moving cam and a fourth moving cam, the third moving cam being engaged with the second arm cam and the fourth moving cam being engaged with the fourth arm cam, and the second cam member being configured to move in the axial direction along the first arm shaft and the second arm shaft; a first elastic member coupled to the first arm shaft and disposed between the first cam member and the second cam member; and a second elastic member coupled to the second arm shaft and disposed between the first cam member and the second cam member, wherein the electronic device is operable to be in a free-stop section between a fully folded state and a flat state, a first state between the free-stop section and the fully folded state, and a second state in which the electronic device is further unfolded than in the first state, the second state being between the free-stop section and the fully folded state, and wherein the hinge structure is configured such that when the electronic device changes from the fully folded state to the second state, the first cam member is fixed in a specified position in the axial direction and the second cam member moves in the axial direction.

In another embodiment, disclosed is an electronic device including: a first housing; a second housing; a display on a first surface of the first housing and a second surface of the second housing; and a hinge structure connected to the first housing and the second housing, wherein the first surface and the second surface form an included angle A by rotation of the first housing about a first rotational axis and rotation of the second housing about a second rotational axis parallel to the first rotational axis, wherein the electronic device includes a flat state in which the first surface and the second surface form a continuous flat surface and a fully folded state in which the first housing and the second housing are rotated such that an edge of the first housing and an edge of the second housing at least partially make contact with each other.

The hinge structure includes: a first arm shaft configured to operate with rotation of the first housing, a first elastic member mounted on the first arm shaft to provide an elastic force in an extension direction of the first arm shaft, a second arm shaft configured to operate with rotation of the second housing, and a second elastic member mounted on the second arm shaft to provide an elastic force in an extension direction of the second arm shaft, wherein the hinge structure is operable to be in a folding detent section from the fully folded state to a first state having a first included angle, wherein in the folding detent section, both the first elastic member and the second elastic member are compressed by a first displacement, as the included angle A increases; an automatic unfolding section from the first state to a second state having a second included angle greater than the first included angle, wherein in the automatic unfolding section, the first elastic member and the second elastic member are uncompressed by a second displacement as the included angle A increases; a free-stop section having an included angle greater than the second included angle to a state having an included angle greater than the included angle, wherein in the free-stop section, the first elastic member and the second elastic member remain in a compressed state independently of the included angle A or are compressed as the included angle A increases; and an unfolding detent section disposed from the end of free-stop section closer to the flat state to the flat state, wherein in the unfolding detent section, the first elastic member and the second elastic member are uncompressed by a third displacement, as the included angle A increases.

An electronic device according to embodiments of the disclosure includes a first housing, a second housing, and a hinge structure connected to the first housing and the second housing such that the first housing rotates about a first rotational axis R1 parallel to an axial direction and the second housing rotates about a second rotational axis R2 parallel to the axial direction.

The hinge structure includes a first arm shaft that operates in conjunction with rotation of the first housing and is parallel to the axial direction, a second arm shaft that operates in conjunction with rotation of the second housing and is parallel to the axial direction, a first arm cam and a second arm cam that rotate together with the first arm shaft, a third arm cam and a fourth arm cam that rotate together with the second arm shaft, a first cam member that includes a first moving cam engaged with the first arm cam and a second moving cam engaged with the third arm cam and moves in the axial direction along the first arm shaft and the second arm shaft, a second cam member that includes a third moving cam engaged with the second arm cam and a fourth moving cam engaged with the fourth arm cam and moves in the axial direction along the first arm shaft and the second arm shaft, a first elastic member coupled to the first arm shaft and disposed between the first cam member and the second cam member, and a second elastic member coupled to the second arm shaft and disposed between the first cam member and the second cam member.

The electronic device includes a free-stop section defined between a fully folded state Sf and a flat state Su, a first state S1 defined between the free-stop section and the fully folded state Sf, and a second state S2 in which the electronic device is further unfolded than in the first state S1, the second state S2 being defined between the free-stop section and the fully folded state.

The hinge structure is configured such that when the electronic device changes from the fully folded state Sf to the second state S2, the first cam member is fixed in a specified position in the axial direction and the second cam member moves in the axial direction.

An electronic device according to embodiments of the disclosure includes a first housing, a second housing, a display 140 on a first surface of the first housing and a second surface of the second housing, and a hinge structure connected to the first housing and the second housing. The first surface and the second surface form an included angle A by rotation of the first housing about a first rotational axis R1 and rotation of the second housing about a second rotational axis R2 parallel to the first rotational axis R1.

The electronic device includes a flat state Su in which the first surface and the second surface form a substantially continuous flat surface and a fully folded state Sf in which the first housing and the second housing are rotated such that an edge P1 of the first housing and an edge P2 of the second housing at least partially make contact with each other.

The hinge structure includes a first arm shaft that operates in conjunction with rotation of the first housing, a first elastic member mounted on the first arm shaft to provide an elastic force in an extension direction of the first arm shaft, a second arm shaft that operates in conjunction with rotation of the second housing, and a second elastic member mounted on the second arm shaft to provide an elastic force in an extension direction of the second arm shaft.

The hinge structure includes a folding detent section defined from the fully folded state Sf to a first state S1 having a first included angle A1, wherein in the folding detent section, the first elastic member and the second elastic member are compressed by a first displacement as the included angle A increases, an automatic unfolding section defined from the first state S1 to a second state S2 having a second included angle A2 greater than the first included angle A1, wherein in the automatic unfolding section, the first elastic member and the second elastic member are uncompressed by a second displacement as the included angle A increases, a free-stop section defined from a state 3-1 S31 having an included angle 3-1 A31 greater than the second included angle A2 to a state 3-2 S32 having an included angle 3-2 A32 greater than the included angle 3-1 A31, wherein in the free-stop section, the first elastic member and the second elastic member remain in a compressed state independently of the included angle A or are compressed as the included angle A increases, and an unfolding detent section defined from the state 3-2 S32 to the flat state Su, wherein in the unfolding detent section, the first elastic member and the second elastic member are uncompressed by a third displacement as the included angle A increases.

The hinge structure and the electronic device according to the embodiments of the disclosure may provide a semi-automatic unfolding operation in which the hinge structure and the electronic device are automatically unfolded to an additional angle when unfolded to a specified angle by a user in a folded state. Furthermore, the hinge structure and the electronic device may provide a free-stop operation capable of maintaining folded states at various angles. Moreover, the hinge structure and the electronic device may include two cams connected to each of the elastic members, thereby increasing the friction areas of the cams to secure lifespan and operation reliability.

In addition, the disclosure may provide various effects that are directly or indirectly recognized.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is an exploded perspective view of an electronic device according to an embodiment.

FIGS. 15A and 15B are views illustrating another example of cams of the hinge structure according to an embodiment.

With regard to description of the drawings, identical or similar reference numerals may be used to refer to identical or similar components.

DETAILED DESCRIPTION

Figure 2A:
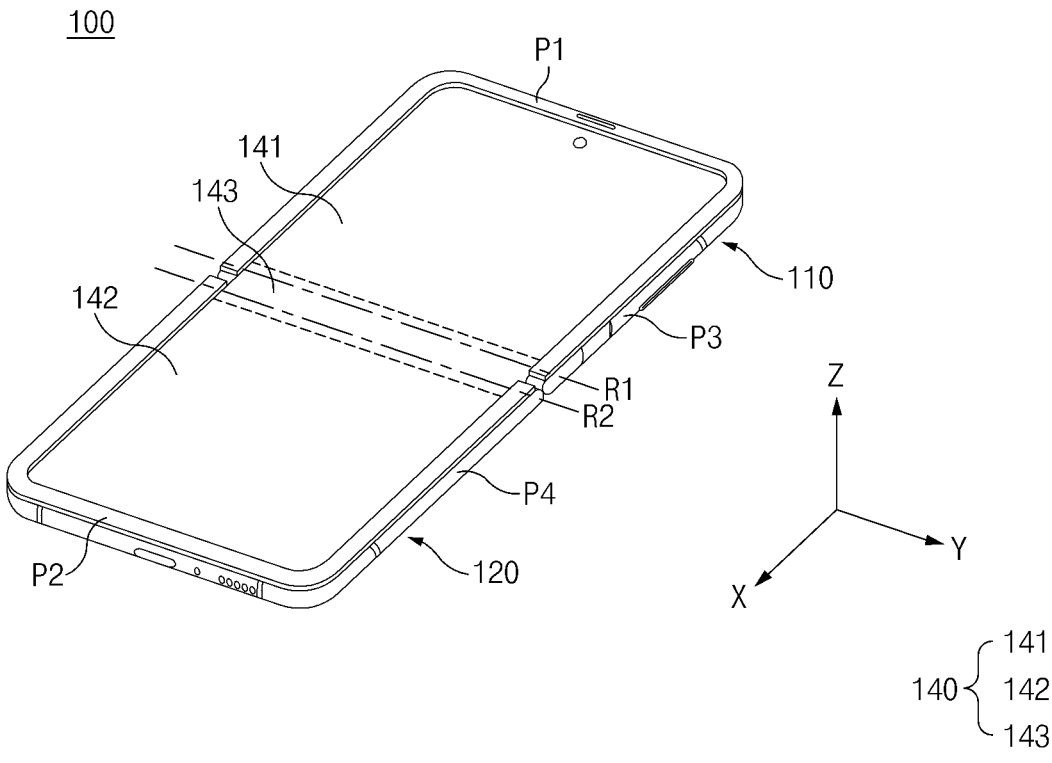
FIG. 2A is a view illustrating a flat state of the electronic device according to an embodiment.
Figure 2A:
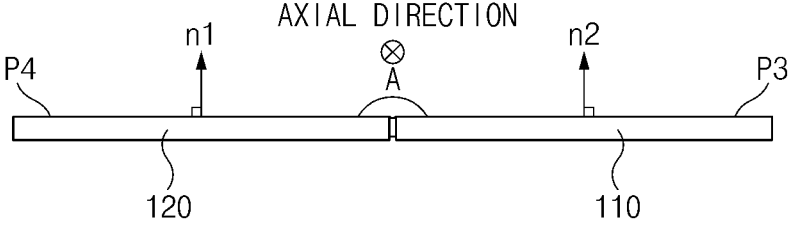

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

FIG. 1 is an exploded perspective view of an electronic device according to an embodiment.

Referring to FIG. 1, the electronic device 100 may include a first housing 110, a second housing 120, a hinge housing 130, a hinge structure 200, and a display 140.

In an embodiment, the first housing 110 may be connected with the second housing 120 through the hinge structure 200. The first housing 110 may include a first plate 111 on which the display 140 is seated and a first frame 112 surrounding at least a portion of the first plate 111. For example, the first frame 112 may form a portion of a surface (e.g., a side surface) of the electronic device 100. For example, a portion of a first region 141 and a portion of a folding region 143 of the display 140 may be disposed on the first plate 111. First rotary structures 210 of the hinge structure 200 may be connected to the first plate 111. In an embodiment, at least a portion of the first housing 110 may be attached with the first region 141 of the display 140. Alternatively, a portion of a periphery of a front surface of the first housing 110 may be attached with a periphery of the first region 141 of the display 140. In this regard, an adhesive layer may be disposed between the first plate 111 of the first housing 110 and the first region 141 of the display 140.

In an embodiment, at least a portion of the inside of the first housing 110 may be provided in a hollow form. A first circuit board 151, a first battery 153, and a camera module 156 may be disposed in the first housing 110. The first circuit board 151 and the first battery 153 may be electrically connected with a second circuit board 152 and a second battery 154 in the second housing 120 through flexible circuit boards. For example, a processor and a memory may be disposed on the first circuit board 151. For example, the first battery 153 and the first circuit board 151 may be disposed on the first plate 111. In an embodiment, at least a portion of the first housing 110 may be formed of a metallic material, or at least a portion of the first housing 110 may be formed of a non-metallic material. The first housing 110 may be formed of a material having a predetermined stiffness to support at least a portion of the display 140. In an embodiment, a portion of the first housing 110 that faces the second housing 120 may include a depression, at least a portion of which has a predetermined curvature such that the hinge housing 130 is disposed therein.

In various embodiments, the first housing 110 may include a first decorative member 113 surrounding the periphery of the display 140 and a first back cover 119 facing the first plate 111 and forming a surface of the electronic device 100. For example, the first decorative member 113 may be disposed to cover the periphery of the first region 141 and the periphery of at least a portion of the folding region 143 of the display 140. For example, in a flat state (e.g., FIG. 2A), the first back cover 119 may form a rear surface of the electronic device 100, and the display 140 may form a front surface of the electronic device.

In an embodiment, the second housing 120 may be connected with the first housing 110 through the hinge structure 200. The second housing 120 may include a second plate 121 on which the display 140 is seated and a second frame 122 surrounding at least a portion of the second plate 121. For example, the second frame 122 may form a portion of a surface (e.g., the side surface) of the electronic device 100. For example, a portion of a second region 142 and a portion of the folding region 143 may be disposed on the second plate 121. Second rotary structures 220 of the hinge structure 200 may be connected to the second plate 121. In an embodiment, at least a portion of the second housing 120 may be attached with the second region 142 of the display 140. Alternatively, a portion of a periphery of a front surface of the second housing 120 may be attached with a periphery of the second region 142 of the display 140. In this regard, an adhesive layer may be disposed between the second plate 121 of the second housing 120 and the second region 142 of the display 140.

In an embodiment, at least a portion of the inside of the second housing 120 may be provided in a hollow form. The second circuit board 152 and the second battery 154 may be disposed in the second housing 120. The second circuit board 152 and the second battery 154 may be electrically connected with the first circuit board 151 and/or the first battery 153 in the first housing 110 through the flexible circuit boards. For example, the second battery 154 and the second circuit board 152 may be disposed on the second plate 121. In an embodiment, at least a portion of the second housing 120 may be formed of a metallic material, or at least a portion of the second housing 120 may be formed of a non-metallic material. The second housing 120 may be formed of a material having a predetermined stiffness to support at least a portion of the display 140. In an embodiment, a portion of the second housing 120 that faces the first housing 110 may include a depression, at least a portion of which has a predetermined curvature such that the hinge housing 130 is disposed therein.

In various embodiments, the second housing 120 may include a second decorative member 123 surrounding the periphery of the display 140 and a second back cover 129 facing the second plate 121 and forming a surface of the electronic device 100. For example, the second decorative member 123 may be disposed to cover the periphery of the second region 142 and the periphery of a portion of the folding region 143 of the display 140. For example, in the flat state (e.g., FIG. 2A), the second back cover 129 may form the rear surface of the electronic device 100, and the display 140 may form the front surface of the electronic device.

In various embodiments, the electronic device may further include a lattice structure (not illustrated) and/or a bracket (not illustrated) disposed between the display 140 and the adhesive layers. The lattice structure may include a slit region including a plurality of slits at least partially overlapping the folding region 143. The plurality of slits may extend in the extension direction (e.g., the y-axis) of the folding region 143. The plurality of slits may support the folding region 143 that is flat in the flat state (e.g., FIG. 2a) and may support deformation of the folding region 143 in a folding operation or an unfolding operation. In various embodiments, only a portion of the lattice structure or the bracket may be stacked on the display 140.

In an embodiment, the hinge housing 130 may be disposed in the depressions of the first housing 110 and the second housing 120. The hinge housing 130 may have a shape extending in the y-axis direction as a whole. A boss for fixing the hinge structure 200 may be disposed on a partial region of an inner surface of the hinge housing 130.

In an embodiment, at least a portion of the display 140 may have flexibility. For example, the display 140 may include the first region 141 disposed on the first housing 110, the second region 142 disposed on the second housing 120, and the folding region 143 located between the first region 141 and the second region 142. In an embodiment, the first region 141 and the second region 142 may be formed to be flat, and the folding region 143 may be deformable to be flat or curved.

According to various embodiments, the hinge structure 200 may include the first rotary structures 210 connected to the first housing 110 and the second rotary structure 220 connected to the second housing 120. The hinge structure 200 may be configured such that the first rotary structures 210 and the second rotary structures 220 are rotatable about rotational axes thereof, respectively (e.g., virtual axes parallel to the y-axis direction). For example, when the first housing 110 and the second housing 120 are folded or unfolded, the first rotary structures 210 and the second rotary structures 220 may rotate about the rotational axes thereof.

Figure 2B:
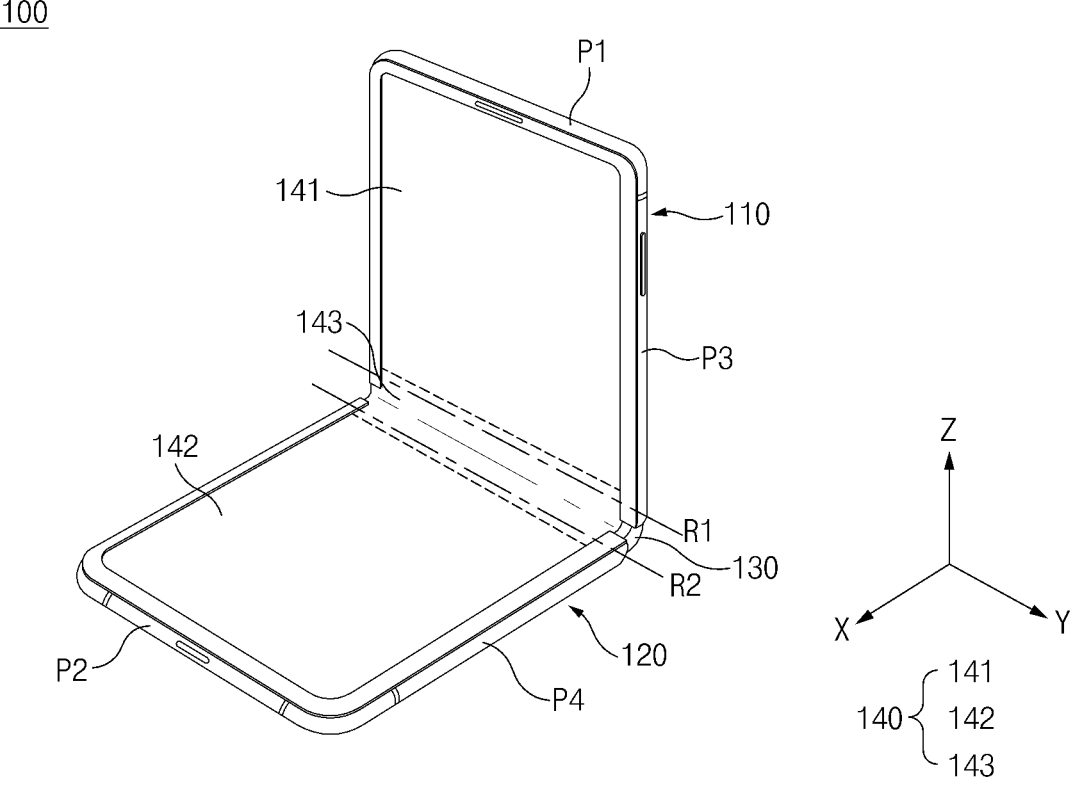
FIG. 2B is a view illustrating a folded state of the electronic device according to an embodiment.
Figure 2B:
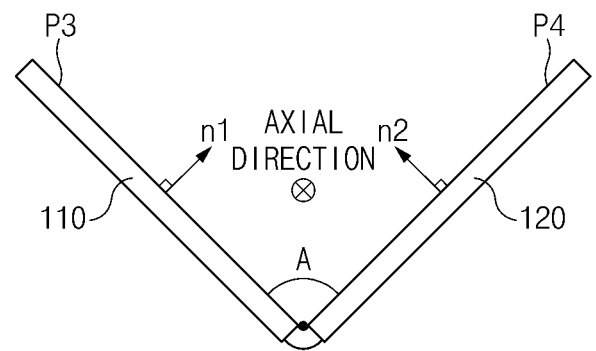
Figure 2C:
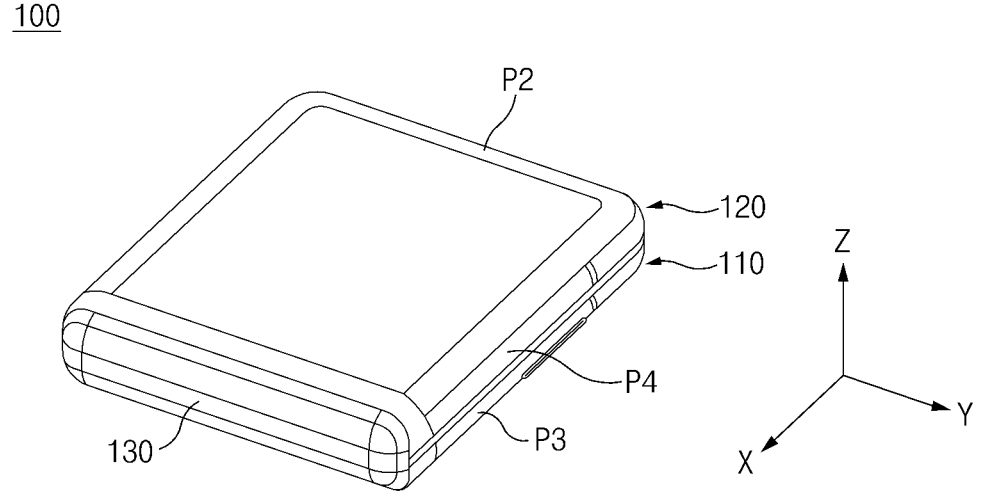
FIG. 2C is a view illustrating a fully folded state of the electronic device according to an embodiment.
Figure 2C:
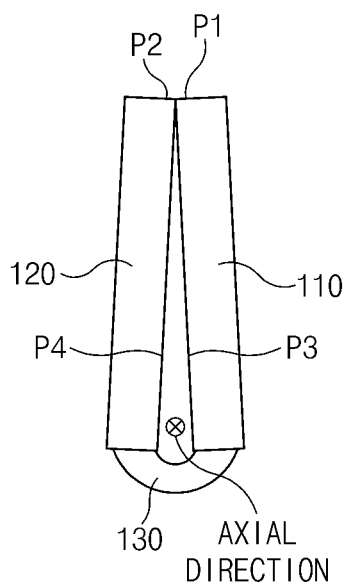

FIG. 2A is a view illustrating a flat state of the electronic device according to an embodiment. FIG. 2B is a view illustrating a folded state of the electronic device according to an embodiment. FIG. 2C is a view illustrating a fully folded state of the electronic device according to an embodiment.

In an embodiment, the first housing 110 and the second housing 120 may rotate in opposite directions about the rotational axes thereof, respectively. For example, in a folding operation performed in the flat state, the first housing

110 may rotate in the clockwise direction, and the second housing 120 may rotate in the counterclockwise direction.

In an embodiment, an axial direction parallel to the rotational axes of the first housing 110 and the second housing 120 is shown. The axial direction is shown as the extension direction of the folding region 143 of the display 140. For example, the axial direction is shown as the direction of long sides of the folding region 143. For example, the axial direction may refer to a direction parallel to the y-axis of FIG. 1.

To describe a state of the electronic device 100 according to an embodiment of the disclosure, a first edge P1 of the electronic device 100 and a second edge P2 of the electronic device 100 that are parallel to the axial direction is shown. To describe a state of the electronic device 100, a third edge P3 of the electronic device 100 and a fourth edge P4 of the electronic device 100 that are perpendicular to the axial direction is shown. For example, the first edge P1 and the third edge P3 may include a portion of the first frame 112 of the first housing 110. For example, the second edge P2 and the fourth edge P4 may include a portion of the second frame 122 of the second housing 120.

The flat state of the electronic device will be described below with reference to FIG. 2A.

For example, the flat state may include a state in which the folding region 143 of the display 140 is flat. For example, the flat state may include a state in which the first region 141 and the second region 142 of the display 140 are flat to face the same direction. For example, the flat state may include a state in which a first normal vector n1 of the first region 141 and a second normal vector n2 of the second region 142 of the display 140 are parallel to each other. For example, the flat state may include a state in which the third edge P3 and the fourth edge P4 form substantially one straight line. For example, the flat state may include a state in which the third edge P3 and the fourth edge P4 form an angle of 180 degrees.

The folded state of the electronic device will be described below with reference to FIG. 2B.

For example, the folded state may include a state in which the folding region 143 of the display 140 is curved. For example, the folded state may include a state in which the first normal vector n1 of the first region 141 and the second normal vector n2 of the second region 142 form a predetermined angle rather than 180 degrees. For example, the folded state may include a state in which the third edge P3 and the fourth edge P4 form a predetermined angle rather than 180 degrees.

The fully folded state of the electronic device will be described below with reference to FIG. 2C.

For example, the fully folded state may refer to a state in which the first edge P1 and the second edge P2 substantially make contact with each other, among folded states. For example, the folding region 143 in the fully folded state may be curved with a curvature greater than that of the folding region 143 in the folded state.

Referring to FIGS. 2B and 2C, in the folded state and the fully folded state, at least a portion of the hinge housing 130 may form a surface of the electronic device 100. For example, the hinge housing 130 may be visually exposed between the first housing 110 and the second housing 120.

Figure 3A:
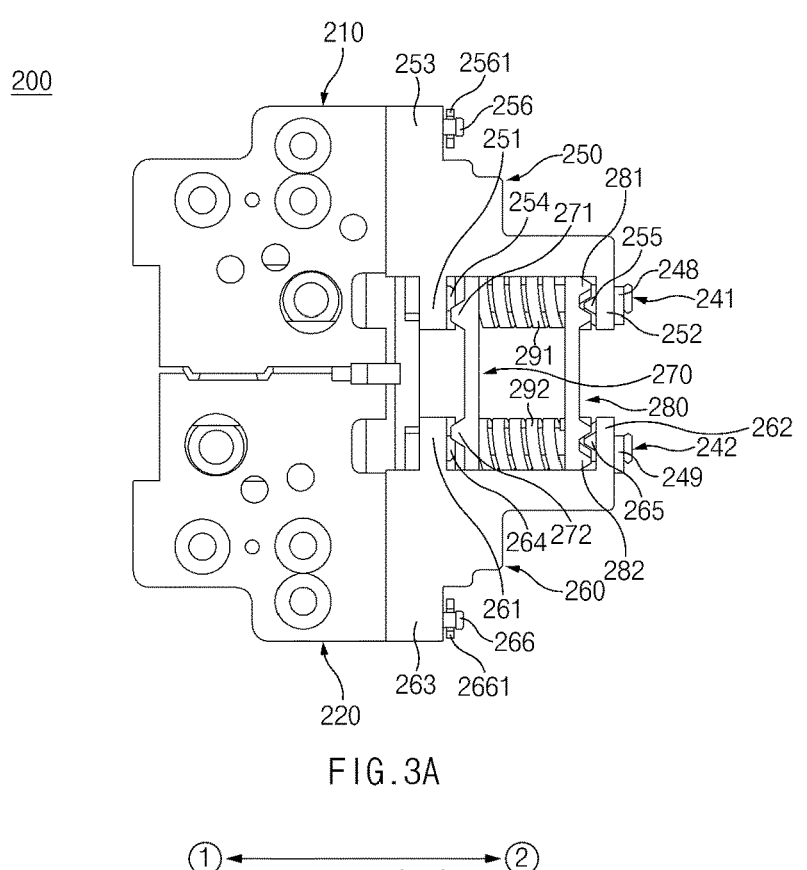
FIGS. 3A and 3B are views illustrating a hinge structure according to an embodiment.
Figure 3B:
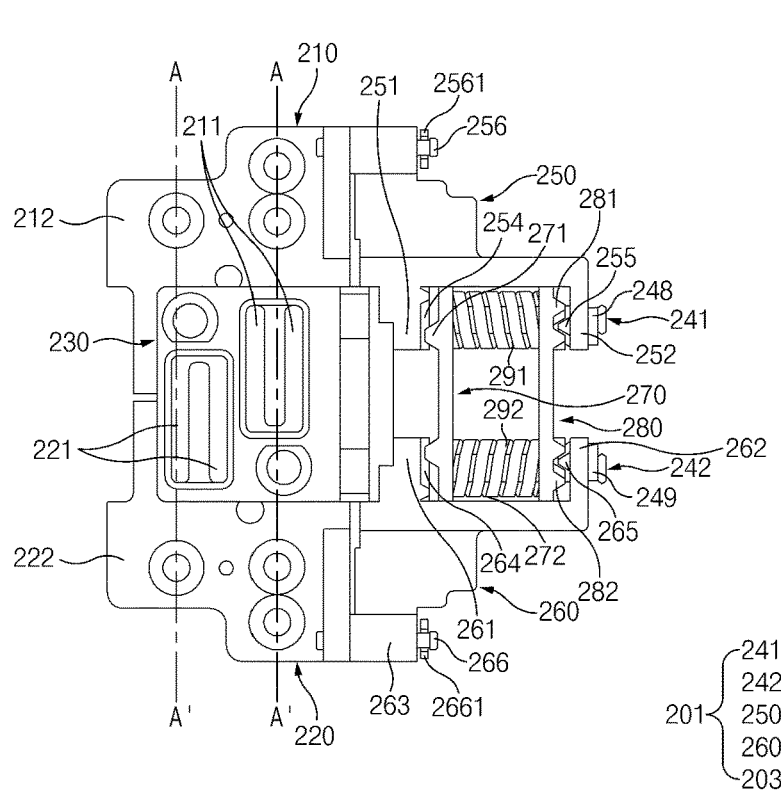
Figure 4:
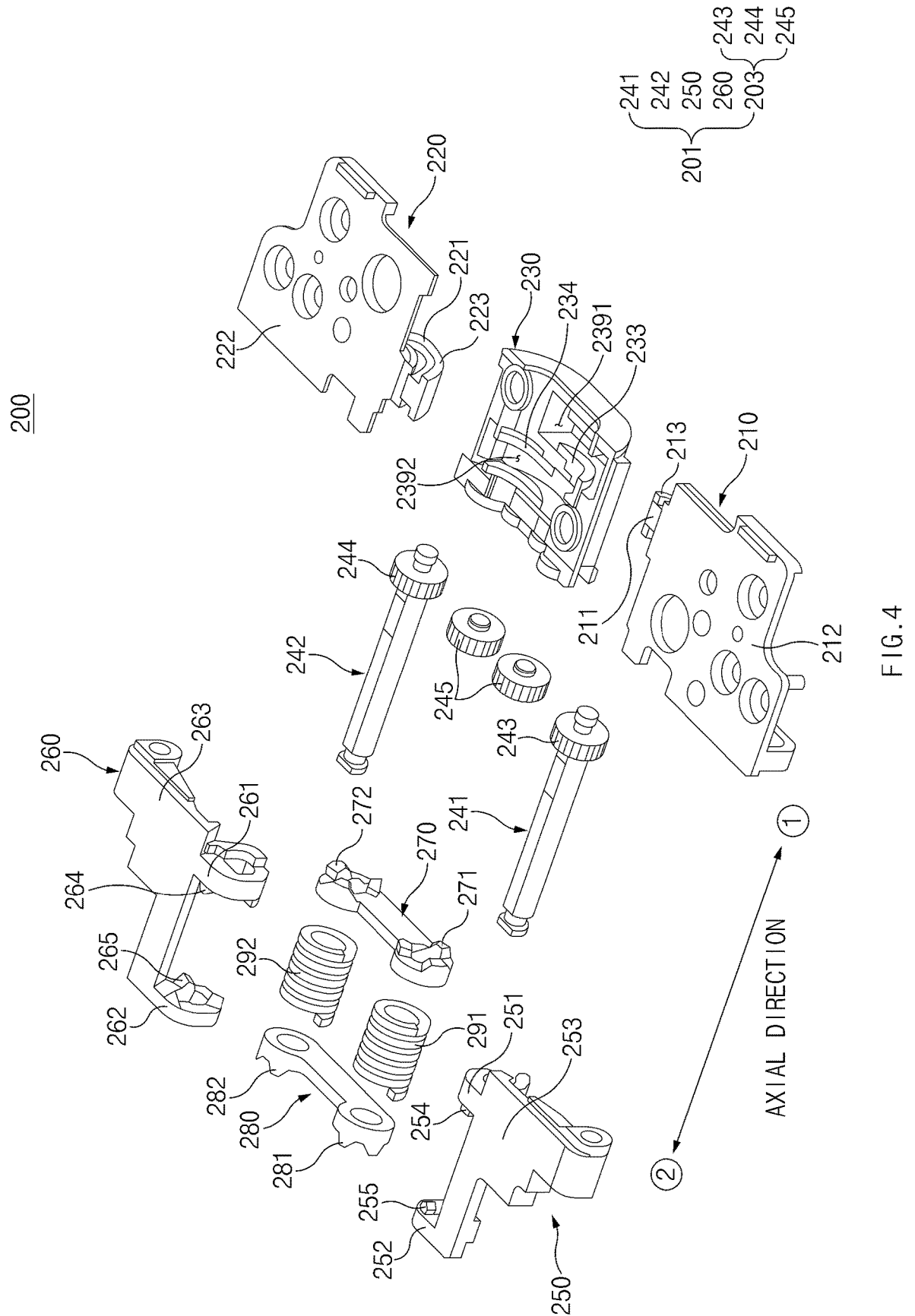
FIG. 4 is an exploded perspective view of the hinge structure according to an embodiment.

FIGS. 3A and 3B are views illustrating the hinge structure according to an embodiment. FIG. 4 is an exploded perspective view of the hinge structure according to an embodiment. FIG. 3A is a plan view of the hinge structure as viewed in the +z-axis direction. FIG. 3B is a plan view of the hinge structure as viewed in the −z-axis direction.

Referring to FIGS. 3A, 3B and 4, the axial direction is shown. The axial direction may be a direction parallel to the extension direction of a first rotational axis R1 and a second rotational axis R2. A first axial direction ① may be a direction toward a fixed structure 230, and a second axial direction ② may be a direction toward a second cam member 280.

In an embodiment, the hinge structure 200 may include the fixed structure 230, the first rotary structure 210, the second rotary structure 220, an arm structure 201, and a friction structure 202.

In an embodiment, at least a portion of the fixed structure 230 may be fixedly disposed in the hinge housing (e.g., the hinge housing 130 of FIG. 1). The first rotary structure 210 and the second rotary structure 220 may be coupled to the fixed structure 230 so as to be rotatable.

In an embodiment, the fixed structure 230 may include a first opening region 2391 to which a first guide portion 211 of the first rotary structure 210 is coupled. In an embodiment, the fixed structure 230 may include a first guide rail 233 for guiding a rotational path of the first rotary structure 210. For example, the first guide rail 233 may be formed on a sidewall of the first opening region 2391. For example, the first guide rail 233 may be formed on at least one of opposite sidewalls of the first opening region 2391 in the axial direction. In an embodiment, a first protruding portion 213 of the first rotary structure 210 may be accommodated in the first guide rail 233.

In an embodiment, the fixed structure 230 may include a second opening region 2392 to which a second guide portion 221 of the second rotary structure 220 is coupled. In an embodiment, the fixed structure 230 may include a second guide rail 234 for guiding a rotational path of the second rotary structure 220. For example, the second guide rail 234 may be formed on a sidewall of the second opening region 2392. For example, the second guide rail 234 may be formed on at least one of opposite sidewalls of the second opening region 2392 in the axial direction. In an embodiment, a second protruding portion 223 of the second rotary structure 220 may be accommodated in the second guide rail 234.

In an embodiment, the first rotary structure 210 may be configured to rotate along a predetermined path relative to the fixed structure 230, which is fixedly disposed in the hinge housing, when the first housing (e.g., the first housing 110 of FIG. 1) is folded or unfolded. In an embodiment, the first rotary structure 210 may include the first guide portion 211 coupled to the fixed structure 230 so as to be rotatable and a first connecting portion 212 connected to the first housing 110. The first connecting portion 212 may be folded or unfolded together with the first housing 110 when the electronic device 100 is folded or unfolded. In an embodiment, the first protruding portion 213 may include a portion protruding from the first guide portion 211 in the axial direction. In an embodiment, the first rotary structure 210 may include the first protruding portion 213 formed on the first guide portion 211. The first protruding portion 213, together with the first guide rail 233, may guide the rotational path of the first rotary structure 210.

In an embodiment, the second rotary structure 210 may be configured to rotate along a predetermined path relative to the fixed structure 230, which is fixedly disposed in the hinge housing, when the second housing (e.g., the second housing 120 of FIG. 1) is folded or unfolded. In an embodiment, the second rotary structure 220 may include the second guide portion 221 coupled to the fixed structure 230 so as to be rotatable and a second connecting portion 222 connected to the second housing 120. The second connecting portion 222 may be folded or unfolded together with the first housing 120 when the electronic device 100 is folded or unfolded. In an embodiment, the second protruding portion 223 may include a portion protruding from the second guide portion 221 in the axial direction. In an embodiment, the second rotary structure 220 may include the second protruding portion 223 formed on the second guide portion 221. The second protruding portion 223, together with the second guide rail 234, may guide the rotational path of the second rotary structure 220.

In an embodiment, the arm structure 201 may include a first arm shaft 241, a second arm shaft 242, a first arm part 250, a second arm part 260, and an interlocking structure 203.

In an embodiment, the interlocking structure 203 may link the first rotary structure 210 and the second rotary structure 220 such that the first rotary structure 210 and the second rotary structure 220 rotate in opposite directions by the same angle. In an embodiment, the interlocking structure 203 may include a first gear 243 formed on an outer circumferential surface of the first arm shaft 241, a second gear 244 formed on an outer circumferential surface of the second arm shaft 242, and connecting gears 245 connecting the first gear 243 and the second gear 244. For example, the connecting gears 245 may include an even number of gears. For example, the first gear 243 of the first arm shaft 241 and the second gear 244 of the second arm shaft 242 may be engaged with each other through an even number of connecting gears 245. Accordingly, the first arm shaft 241 and the second arm shaft 242 may be fastened with each other to rotate in the opposite directions by the same angle. The first arm part 250 coupled to the first arm shaft 241 and the second arm part 260 coupled to the second arm shaft 242 may rotate in the opposite directions by the same angle. Accordingly, the first rotary structure 210 and the second rotary structure 220 may rotate in the opposite directions by the same angle.

In an embodiment, the first arm shaft 241 may be coupled to the fixed structure 230 so as to be rotatable. For example, the first arm shaft 241 may extend from the fixed structure 230 in the second axial direction ②. For example, an end portion of the first arm shaft 241 that faces the first axial direction ① may be rotatably inserted into a recess or opening formed in the fixed structure 230. For example, a first fixing ring 248 may be coupled to an end portion of the second arm shaft 241 that faces the second axial direction ②. The first fixing ring 248 may prevent separation of the first arm shaft 241 from a second coupling portion 252 of the first arm part 250. In an embodiment, the first arm shaft 241, when viewed from the fixed structure 230 in the second axial direction ②, may pass through a first coupling portion 251 of the first arm part 250, a first cam member 270, a first elastic member 291, the second cam member 280, and the second coupling portion 252 of the first arm part 250. For example, the first coupling portion 251 and the second coupling portion 252 of the first arm part 250 may be coupled to the first arm shaft 241 to rotate together with the first arm shaft 241. For example, the first coupling portion 251 and the second coupling portion 252 may be press-fit onto the first arm shaft 241. For example, the first cam member 270 and the second cam member 280 may be penetrated by the first arm shaft 241. The first cam member 270 and the second cam member 280 may linearly move in the axial direction along the first arm shaft 241 without rotating together with the first arm shaft 241. For example, the first elastic member 291 may include a coil spring surrounding the first arm shaft 241. The first elastic member 291 may be compressed or uncompressed in the axial direction without rotating together with the first arm shaft 241.

In an embodiment, when the first rotary structure 210 rotates, the first arm part 250 may rotate together with the first arm shaft 241 and may slide relative to the first rotary structure 210. In an embodiment, the first arm part 250 may include the first coupling portion 251 and the second coupling portion 252 that are coupled to the first arm shaft 241, and a first extending portion 253 including a first sliding pin 256. The first coupling portion 251 and the second coupling portion 252 may extend from the first extending portion 253 in a direction perpendicular to the axial direction.

In an embodiment, a first arm cam 254 may be formed on the first coupling portion 251, and a second arm cam 255 may be formed on the second coupling portion. For example, the first arm cam 254 may be engaged with a first moving cam 271 of the first cam member 270. For example, the second arm cam 255 may be engaged with a third moving cam 281 of the second cam member 280. In an embodiment, the first arm cam 254 and the second arm cam 255 may be formed to face each other. For example, the first arm cam 254 may include protrusions protruding in the second axial direction ②, and the second arm cam 255 may include protrusions protruding in the first axial direction ①.

In an embodiment, in relation to rotation of the first arm part 250, the first coupling portion 251 and the second coupling portion 252 may be press-fit onto the first arm shaft 241. Accordingly, the first coupling portion 251 and the second coupling portion 252 may rotate together with the first arm shaft 241, and the first extending portion 253 may rotate about the first arm shaft 241. In an embodiment, the first coupling portion 251 and the second coupling portion 252 may be spaced apart from each other in the axial direction. For example, the first coupling portion 251 may be located in the first axial direction ①, compared to the second coupling portion 252. For example, the first elastic member 291, one portion of the first cam member 270, and one portion of the second cam member 280 may be disposed between the first coupling portion 251 and the second coupling portion 252.

In an embodiment, in relation to sliding of the first arm part 250, the first sliding pin 256 of the first extending portion 253 may be fastened to the first rotary structure 210. For example, at least a portion of the first sliding pin 256 may be accommodated in a first sliding groove (e.g., a first sliding groove 215 of FIGS. 7A, 7B and 7C) of the first rotary structure 210. For example, the first sliding pin 256 may move along the first sliding groove 215 when the first rotary structure 210 rotates. A fixing ring 2561 may be coupled to an end portion of the first sliding pin 256. In an embodiment, when the first rotary structure 210 rotates about the first rotational axis R1, the first arm part 250 may rotate about the first arm shaft 241 while sliding relative to the first rotary structure 210. For example, the first arm part 250 may slide in the state in which the first sliding pin 256 is fastened to the first rotary structure 210.

In an embodiment, the second arm shaft 242 may be coupled to the fixed structure 230 so as to be rotatable. For example, the second arm shaft 242 may extend from the fixed structure 230 in the second axial direction ②. For example, an end portion of the second arm shaft 242 that faces the first axial direction ① may be rotatably inserted into a recess or opening formed in the fixed structure 230. For example, a second fixing ring 249 may be coupled to an end portion of the second arm shaft 242 that faces the second axial direction ②. The second fixing ring 249 may prevent separation of the second arm shaft 242 from a fourth coupling portion 262 of the second arm part 260. In an embodiment, the second arm shaft 242, when viewed from the fixed structure 230 in the second axial direction ②, may pass through a third coupling portion 261 of the second arm part 260, the first cam member 270, a second elastic member 292, the second cam member 280, and the fourth coupling portion 262 of the second arm part 260. For example, the third coupling portion 261 and the fourth coupling portion 262 of the second arm part 260 may be coupled to the second arm shaft 242 to rotate together with the second arm shaft 242. For example, the third coupling portion 261 and the fourth coupling portion 262 may be press-fit onto the second arm shaft 242. For example, the first cam member 270 and the second cam member 280 may be penetrated by the second arm shaft 242. The first cam member 270 and the second cam member 280 may linearly move in the axial direction along the second arm shaft 242 without rotating together with the second arm shaft 242. For example, the second elastic member 292 may include a coil spring surrounding the second arm shaft 242. The second elastic member 292 may be compressed or uncompressed in the axial direction without rotating together with the second arm shaft 242.

In an embodiment, when the second rotary structure 220 rotates, the second arm part 260 may rotate together with the second arm shaft 242 and may slide relative to the second rotary structure 220. In an embodiment, the second arm part 260 may include the third coupling portion 261 and the fourth coupling portion 262 that are coupled to the second arm shaft 242, and a second extending portion 263 including a second sliding pin 266. The third coupling portion 261 and the fourth coupling portion 262 may extend from the second extending portion 263 in a direction perpendicular to the axial direction.

In an embodiment, a third arm cam 264 may be formed on the third coupling portion 261, and a fourth arm cam 265 may be formed on the fourth coupling portion 262. For example, the third arm cam 264 may be engaged with a second moving cam 272 of the first cam member 270. For example, the fourth arm cam 265 may be engaged with a fourth moving cam 282 of the second cam member 280. In an embodiment, the third arm cam 264 and the fourth arm cam 265 may be formed to face each other. For example, the third arm cam 264 may include protrusions protruding in the second axial direction ②, and the fourth arm cam 265 may include protrusions protruding in the first axial direction ①.

In an embodiment, in relation to rotation of the second arm part 260, the third coupling portion 261 and the fourth coupling portion 262 may be press-fit onto the second arm shaft 242. Accordingly, the third coupling portion 261 and the fourth coupling portion 262 may rotate together with the second arm shaft 242, and the second extending portion 263 may rotate about the second arm shaft 242. In an embodiment, the third coupling portion 261 and the fourth coupling portion 262 may be spaced apart from each other in the axial direction. For example, the third coupling portion 261 may be located in the first axial direction ①, compared to the fourth coupling portion 262. For example, the second elastic member 292, another portion of the first cam member 270, and another portion of the second cam member 280 may be disposed between the third coupling portion 261 and the fourth coupling portion 262.

In an embodiment, in relation to sliding of the second arm part 260, the second sliding pin 266 of the second extending portion 263 may be fastened to the second rotary structure 220. For example, at least a portion of the second sliding pin

266 may be accommodated in a second sliding groove (e.g., a second sliding groove 225 of FIGS. 7A, 7B and 7C) of the second rotary structure 220. For example, the second sliding pin 266 may move along the second sliding groove when the second rotary structure 220 rotates. A fixing ring 2661 may be coupled to an end portion of the second sliding pin 266. In an embodiment, when the second rotary structure 220 rotates about the second rotational axis R2, the second arm part 260 may rotate about the second arm shaft 242 while sliding relative to the second rotary structure 220. For example, the second arm part 260 may slide in the state in which the second sliding pin 266 is fastened to the second rotary structure 220.

Figure 5A:
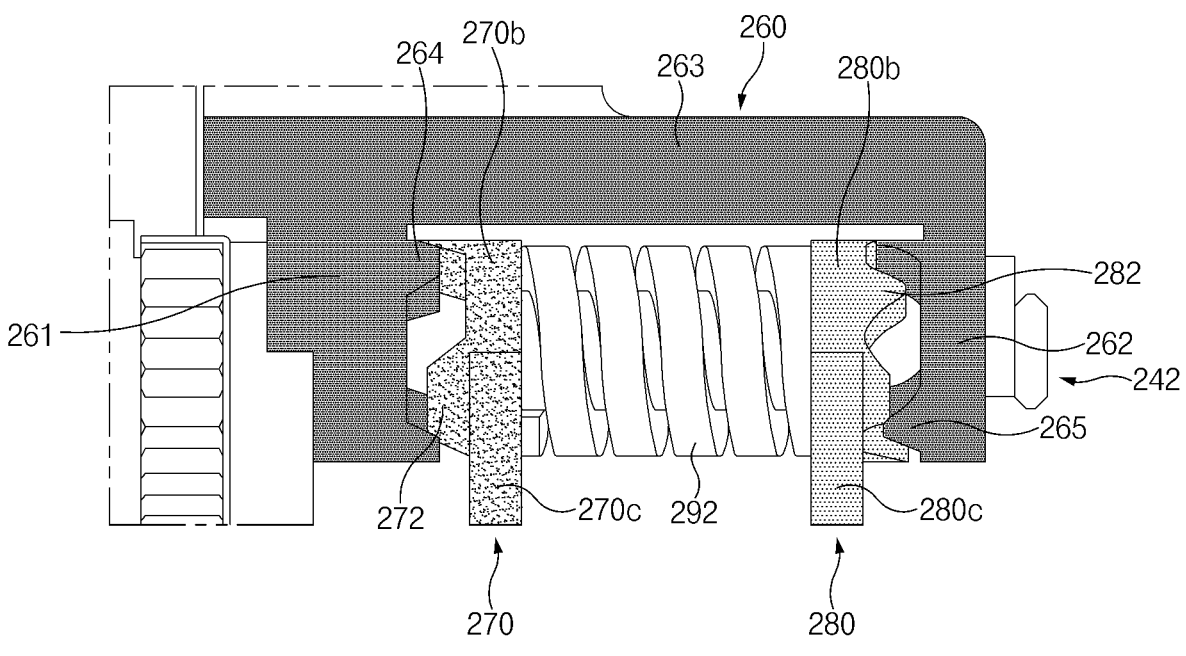
FIGS. 5A and 5B are views illustrating a friction structure of the hinge structure according to an embodiment.
Figure 5B:
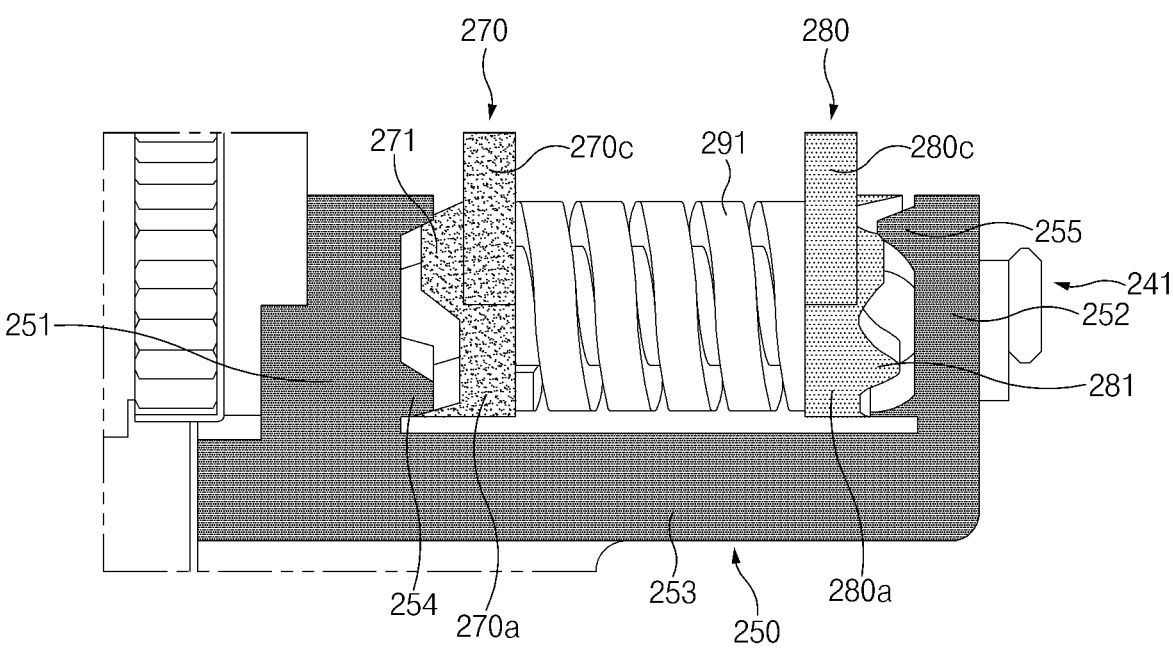

FIGS. 5A and 5B are views illustrating the friction structure of the hinge structure according to an embodiment.

In an embodiment, the friction structure 202 may provide friction torques corresponding to restoring torques of the flexible display 140. For example, in a folded state (e.g., FIG. 2B or 2C) in which a partial region of the display 140 is curved, restoring forces of the display 140 may act on the first rotary structure 210 connected with the first plate 111 and the second rotary structure 220 connected with the second plate 121. For example, the restoring forces of the display 140 may be forces by which the display 190 returns to a flat state. The restoring torques may be applied to the first arm shaft 241 and the second arm shaft 242 by the restoring forces. The restoring torques may act in directions in which the electronic device 100 and the hinge structure 200 are unfolded. The restoring torque acting on the first arm shaft 241 may act in a direction opposite to that of the restoring torque acting on the second arm shaft 242. For example, referring to FIGS. 7A, 7B and 7C, the restoring torques may act on the first arm shaft 241 in the counterclockwise direction, which is an unfolding direction, and may act on the second arm shaft 242 in the clockwise direction, which is an unfolding direction. Accordingly, the friction structure 202 may provide predetermined friction torques that cancel out the restoring torques such that the hinge structure 200, the electronic device 100, and/or the display 140 is maintained in the folded state. For example, the friction torques may be proportional to surface friction forces between the cam structures and the distances between the points where the friction forces are generated and the arm shafts 241 and 242 (e.g., the radii of the arm shafts 241 and 242). The surface friction forces may be increased by the compressed elastic members 291 and 292.

In an embodiment, the friction structure 202 may include the first arm cam 254, the second arm cam 255, the third arm cam 264, the fourth arm cam 265, the first cam member 270, the second cam member 280, the first elastic member 291, and the second elastic member 292.

FIG. 5B is a view illustrating friction structures coupled to the first arm shaft 241. Referring to FIG. 5A, when viewed from the first gear 243 in the second axial direction ②, the first arm cam 254, the first moving cam 271 of the first cam member 270, the first elastic member 291, the third moving cam 281 of the second cam member 280, and the second arm cam 255 may be coupled to the first arm shaft 241.

FIG. 5A is a view illustrating friction structures coupled to the second arm shaft 242. Referring to FIG. 5B, when viewed from the second gear 244 in the second axial direction ②, the third arm cam 264, the second moving cam 272 of the first cam member 270, the second elastic member 292, the fourth moving cam 282 of the second cam member 280, and the fourth arm cam 265 may be coupled to the second arm shaft 242.

In an embodiment, the first arm cam 254 may be formed on the first coupling portion 251 of the first arm part 250. The first arm cam 254 may rotate together with the first arm shaft 241. For example, the first arm cam 254 may be formed to surround the first arm shaft 241. The first arm cam 254 may include protrusions protruding in the first axial direction ①. The first arm cam 254 may be engaged with the first moving cam 271 of the first cam member 270.

In an embodiment, the second arm cam 255 may be formed on the second coupling portion 252 of the first arm part 250. The second arm cam 255 may rotate together with the first arm shaft 241. For example, the second arm cam 255 may be formed to surround the first arm shaft 241. The second arm cam may include protrusions protruding in the second axial direction ②. The second arm cam 255 may be engaged with the third moving cam 281 of the second cam member 280.

In an embodiment, the third arm cam 264 may be formed on the third coupling portion 261 of the second arm part 260. The third arm cam 264 may rotate together with the second arm shaft 242. For example, the third arm cam 264 may be formed to surround the second arm shaft 242. The third arm cam 264 may include protrusions protruding in the first axial direction ①. The third arm cam 264 may be engaged with the second moving cam 272 of the first cam member 270.

In an embodiment, the fourth arm cam 265 may be formed on the fourth coupling portion 262 of the second arm part 260. The fourth arm cam 265 may rotate together with the second arm shaft 242. For example, the fourth arm cam 265 may be formed to surround the second arm shaft 242. The fourth arm cam 265 may include protrusions protruding in the second axial direction ②. The fourth arm cam 265 may be engaged with the fourth moving cam 282 of the second cam member 280.

In an embodiment, the first cam member 270 may include a first portion 270a through which the first arm shaft 241 passes, a second portion 270b through which the second arm shaft 242 passes, and a first bridge portion 270c connecting the first portion 270a and the second portion 270b. In an embodiment, the first moving cam 271 may be formed on the first portion 270a. The first moving cam 271 may be engaged with the first arm cam 254. For example, the first moving cam 271 may include protrusions protruding in the first axial direction ①. In an embodiment, the second moving cam 272 may be formed on the second portion 270b. The second moving cam 272 may be engaged with the third arm cam 264. For example, the second moving cam 272 may include protrusions protruding in the first axial direction ①. In an embodiment, when the first arm shaft 241 and the second arm shaft 242 rotate, the first cam member 270 may move in the axial direction without rotating. For example, the first arm shaft 241 may include a portion having a polygonal cross-section perpendicular to the axial direction. The first portion 270a of the first cam member 270 may have a circular through-hole when viewed in a cross-section perpendicular to the axial direction. The portion of the first arm shaft 241 that has a polygonal cross-section may extend through the circular through-hole of the first portion 270a. Accordingly, the first cam member 270 may not rotate even though the first arm shaft 241 rotates.

In an embodiment, the second cam member 280 may include a third portion 280a through which the first arm shaft 241 passes, a fourth portion 280b through which the second arm shaft 242 passes, and a second bridge portion 280c connecting the third portion 280a and the fourth portion 280b. In an embodiment, the third moving cam 281 may be formed on the third portion. The third moving cam 281 may be engaged with the second arm cam 255. For example, the third moving cam 281 may include protrusions protruding in the second axial direction ②. In an embodiment, the fourth moving cam 282 may be formed on the fourth portion 280*b*. The fourth moving cam 282 may be engaged with the fourth arm cam 265. For example, the fourth moving cam 282 may include protrusions protruding in the second axial direction ②. In an embodiment, when the first arm shaft 241 and the second arm shaft 242 rotate, the second cam member 280 may move in the axial direction without rotating. For example, the second arm shaft 242 may include a portion having a polygonal cross-section perpendicular to the axial direction. The second portion 270*b* of the first cam member 270 may have a circular through-hole when viewed in a cross-section perpendicular to the axial direction. The portion of the second arm shaft 242 that has a polygonal cross-section may extend through the circular through-hole of the second portion 270*b*. Accordingly, the first cam member 270 may not rotate even though the second arm shaft 242 rotates.

In an embodiment, the first elastic member 291 may be disposed between the first cam member 270 and the second cam member 280. For example, the first elastic member 291 may be disposed between the first coupling portion 251 of the first arm part 250 and the second coupling portion 252 of the first arm part 250. For example, the first elastic member 291 may be disposed between the first portion 270*a* of the first cam member 270 and the third portion 280*a* of the second cam member 280. For example, the first elastic member 291 may be located in the first axial direction ① from the first cam member 270 and may be located in the second axial direction ② from the second cam member 280. In an embodiment, the first elastic member 291 may be compressed or uncompressed in response to linear movement of the first cam member 270 and the second cam member 280 in the axial direction. For example, the compressed first elastic member 291 may increase a friction force between the first moving cam 271 and the first arm cam 254 and/or a friction force between the third moving cam 281 and the second arm cam 255. The increased friction forces may provide increased friction torque acting in a direction opposite to a rotational direction of the first arm shaft 241.

In an embodiment, the second elastic member 292 may be disposed between the first cam member 270 and the second cam member 280. For example, the second elastic member 292 may be disposed between the third coupling portion 261 of the second arm part 260 and the fourth coupling portion 262 of the second arm part 260. For example, the second elastic member 292 may be disposed between the second portion 270*b* of the first cam member 270 and the fourth portion 280*b* of the second cam member 280. For example, the second elastic member 292 may be located in the first axial direction ① from the first cam member 270 and may be located in the second axial direction ② from the second cam member 280. In an embodiment, the second elastic member 292 may be compressed or uncompressed in response to linear movement of the first cam member 270 and the second cam member 280 in the axial direction. For example, the compressed second elastic member 292 may increase a friction force between the second moving cam 272 and the third arm cam 264 and/or a friction force between the fourth moving cam 282 and the fourth arm cam 265. The increased friction forces may provide increased friction torque acting in a direction opposite to a rotational direction of the second arm shaft 242.

In an embodiment, when the first arm shaft 241 and the second arm shaft 242 rotate, the structures included in the friction structure 202 may rotate in place, or may linearly move along the first arm shaft 241 and the second arm shaft 242.

For example, the first arm cam 254 and the second arm cam 255 may rotate together with the first arm shaft 241 and may not linearly move in the extension direction of the first arm shaft 241. For example, the first arm shaft 241 may include the portion having a polygonal cross-section perpendicular to the axial direction. Each of the first arm cam 254 and the second arm cam 255 may have a through-hole through which the first arm shaft 241 passes. The through-hole, when viewed in a cross-section perpendicular to the axial direction, may have a polygonal cross-section corresponding to the cross-section of the first arm shaft 241. Accordingly, when the first arm shaft 241 rotates, the first arm cam 254 and the second arm cam 255 may rotate together with the first arm shaft 241. In various embodiments, the first arm cam 254 and the second arm cam 255 may be at least partially press-fit onto the first arm shaft 241. Accordingly, linear movement of the first arm cam 254 and the second arm cam 255 along the first arm shaft 241 may be limited.

For example, the third arm cam 264 and the fourth arm cam 265 may rotate together with the second arm shaft 242 and may not linearly move in the extension direction of the second arm shaft 242. For example, the second arm shaft 242 may include the portion having a polygonal cross-section perpendicular to the axial direction. Each of the third arm cam 264 and the fourth arm cam 265 may have a through-hole through which the second arm shaft 242 passes. The through-hole, when viewed in a cross-section perpendicular to the axial direction, may have a polygonal cross-section corresponding to the cross-section of the second arm shaft 242. Accordingly, when the second arm shaft 242 rotates, the third arm cam 264 and the fourth arm cam 265 may rotate together with the second arm shaft 242. In various embodiments, the third arm cam 264 and the fourth arm cam 265 may be at least partially press-fit onto the second arm shaft 242. Accordingly, linear movement of the third arm cam 264 and the fourth arm cam 265 along the second arm shaft 242 may be limited.

For example, when the arm shafts 241 and 242 rotate, the first moving cam 271 and the second moving cam 272 may linearly move together in the axial direction by the first bridge portion 270*c* without rotating. For example, when the arm shafts 241 and 242 rotate, the third moving cam 281 and the fourth moving cam 282 may linearly move together in the axial direction by the second bridge portion 280*c* without rotating. For example, when the arm shafts 241 and 242 rotate, the first elastic member 291 and the second elastic member 292 may be compressed or uncompressed depending on the distance between the first cam member 270 and the second cam member 280 without rotating. For example, the first elastic member 291 may be compressed when the first cam member 270 moves in the second axial direction ② and the second cam member 280 moves in the first axial direction ①.

Figure 6A:
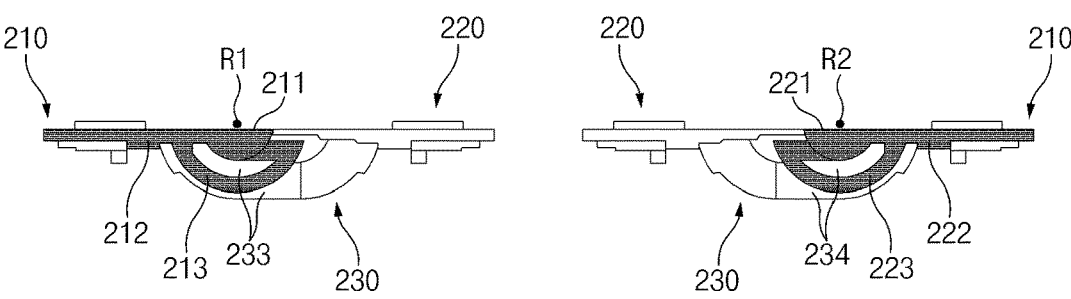
FIGS. 6A, 6B and 6C are views illustrating rotational operations of rotary structures of the hinge structure according to an embodiment.
Figure 6B:
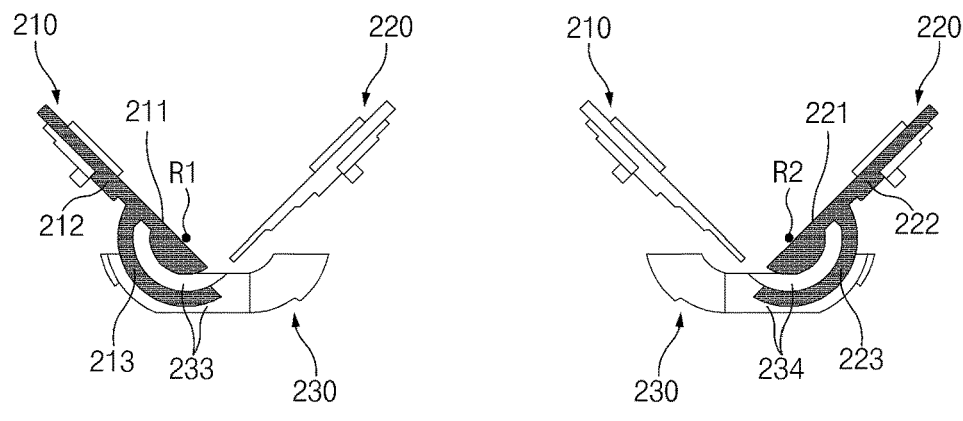
Figure 6C:
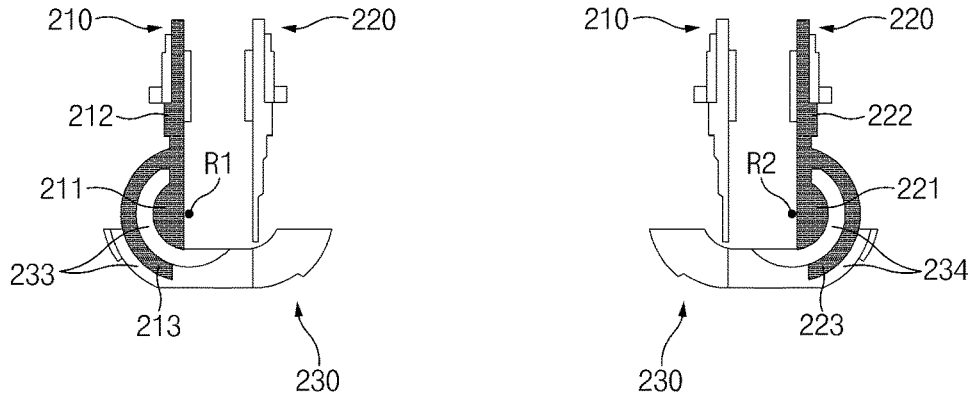

FIGS. 6A, 6B and 6C are views illustrating rotational operations of the rotary structures of the hinge structure according to an embodiment. FIGS. 6A, 6B and 6C are sectional views taken along line A-A' of FIG. 3B.

FIG. 6A is a view illustrating the hinge structure 200 in a flat state. FIG. 6B is a view illustrating the hinge structure 200 in a folded state. FIG. 6C is a view illustrating the hinge structure 200 in a fully folded state.

In an embodiment, the first guide rail 233 and the second guide rail 234 may be formed on the fixed structure 230. In an embodiment, the first guide rail 233 may have a substantially arc shape. For example, the center of the arc of the first guide rail 233 may be the first rotational axis R1. That is, the first guide rail 233 may guide rotation of the first rotary structure 210 along a rotational path whose center coincides with the first rotational axis R1. In an embodiment, the second guide rail 234 may have a substantially arc shape. For example, the center of the arc of the second guide rail 234 may be the second rotational axis R2. That is, the second guide rail 234 may guide rotation of the second rotary structure 220 along a rotational path whose center coincides with the second rotational axis R2.

In an embodiment, the first rotary structure 210 may include the first connecting portion 212 and the first guide portion 211. The first guide portion 211 may have a substantially cylindrical shape. For example, the cross-section of the first guide portion 211 may have a substantially arc shape. In an embodiment, the first rotary structure 210 may rotate about the first rotational axis R1 in the state in which the first protruding portion 213 of the first guide portion 211 is accommodated in the first guide rail 233 of the fixed structure 230. For example, when the first connecting portion 212 is folded or unfolded together with the first housing 110, the first rotary structure 210 may rotate along the rotational path having an arc shape whose center coincides with the first axis of rotation R1.

In an embodiment, the second rotary structure 220 may include the second connecting portion 222 and the second guide portion 221. The second guide portion 221 may have a substantially cylindrical shape. For example, the cross-section of the second guide portion 221 may have a substantially arc shape. In an embodiment, the second rotary structure 220 may rotate about the second rotational axis R2 in the state in which the second protruding portion 223 is accommodated in the second guide rail 234. For example, when the second connecting portion 222 is folded or unfolded together with the second housing 120, the second rotary structure 220 may rotate along the rotational path having an arc shape whose center coincides with the second axis of rotation R2.

In an embodiment, the first rotational axis R1 and the second rotational axis R2 may be parallel to the axial direction of the hinge structure 200. In an embodiment, the first rotational axis R1 and the second rotational axis R2 may be formed in positions spaced apart from the first connecting portion 212 of the first rotary structure 210 and the second connecting portion 222 of the second rotary structure 220 in the z-axis direction.

Referring to FIG. 6A, in the flat state, the first connecting portion 212 may limit a rotational direction of the first rotary structure 210 to one direction. For example, a first end portion of the first guide rail 233 may be open, and a second end portion of the first guide rail 233 may be covered by the first connecting portion 212. Accordingly, in the flat state, the first rotary structure 210 is rotatable in the clockwise direction and not rotatable in the counterclockwise direction about the first rotational axis R1 based on the drawing.

Referring to FIG. 6A, in the flat state, the second connecting portion 222 may limit a rotational direction of the second rotary structure 220 to one direction. For example, a third end portion of the second guide rail 234 may be open, and a fourth end portion of the second guide rail 234 may be covered by the second connecting portion 222. Accordingly, in the flat state, the second rotary structure 220 is rotatable in the counterclockwise direction and not rotatable in the clockwise direction about the second rotational axis R2 based on the drawing.

Figure 7A:
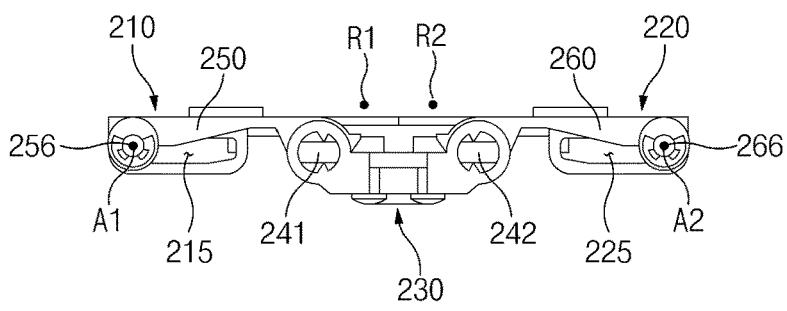
FIGS. 7A, 7B and 7C are views illustrating rotational operations and sliding operations of arm parts and the rotary structures of the hinge structure according to an embodiment.
Figure 7B:
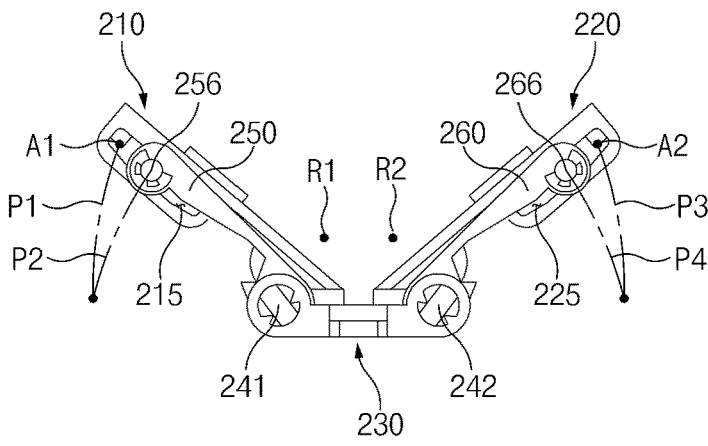
Figure 7C:
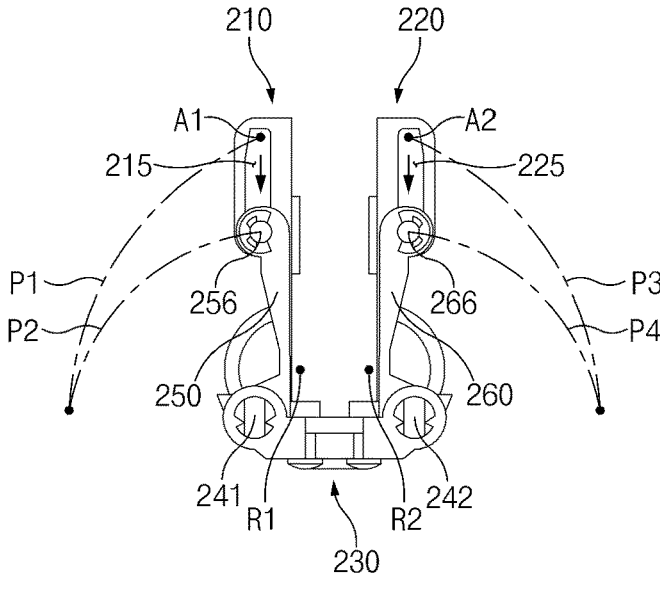

FIGS. 7A, 7B and 7C are views illustrating rotational operations and sliding operations of the arm parts and the rotary structures of the hinge structure according to an embodiment.

FIG. 7A is a view illustrating the hinge structure 200 in a flat state. FIG. 7B is a view illustrating the hinge structure 200 in a folded state. FIG. 7C is a view illustrating the hinge structure 200 in a fully folded state.

Referring to FIGS. 7A, 7B and 7C, when the hinge structure 200 is folded or unfolded, the rotary structures 210 and 220 and the arm parts 250 and 260 may rotate about different axes. For example, the rotary structures 210 and 220 and the arm parts 250 and 260 may rotate along different rotational paths. Due to the difference in rotational path between the rotary structures 210 and 220 and the arm parts 250 and 260, the arm parts 250 and 260 may slide when the hinge structure 200 is folded or unfolded.

In an embodiment, the first rotary structure 210 may rotate about the first rotational axis R1 in a first rotational direction. For example, in a folding operation, the first rotary structure 210 may rotate in the clockwise direction. For example, based on the flat state, the point where the first sliding pin 256 is located in the first rotary structure 210 may be shown as a first point A1. In folding and unfolding operations, the first point A1 of the first rotary structure 210 may move along a first rotational path P1.

Referring to FIGS. 7A, 7B and 7C, the first arm part 250 and the first sliding pin 256 may rotate about the first arm shaft 241. For example, in the folding operation, the first arm part 250 and the first sliding pin 256 may rotate in the clockwise direction. For example, in the flat state, the first sliding pin 256 may be located at the first point A1, and in the folded state, the first sliding pin 256 may be located in a position spaced apart from the first point A1 in a direction perpendicular to the axial direction. The first sliding pin 256 may move along a second rotational path P2 in the folding and unfolding operations.

In various embodiments, the first rotational path P1 and the second rotational path P2 may differ from each other. For example, the first rotational axis R1 and the first arm shaft 241 may be parallel to each other, but may not coincide with each other, and the radii of rotation of the first rotary structure 210 and the first arm part 250 may not coincide with each other.

Accordingly, in the folding and unfolding operations, the first arm part 250 and the first sliding pin 256 may slide relative to the first rotary structure 210. The sliding operation of the first sliding pin 256 and the first arm part 250 may be guided as the first sliding pin 256 is accommodated in the first sliding groove 215 of the first rotary structure 210. In an embodiment, when the folding operation is performed in the flat state, the distance between the first sliding pin 256 and the first point A1 may increase. When the unfolding operation is performed in the fully folded state, the distance between the first sliding pin 256 and the first point A1 may decrease.

In an embodiment, the second rotary structure 220 may rotate about the second rotational axis R2 in a second rotational direction. For example, in the folding operation, the second rotary structure 220 may rotate in the counter-clockwise direction. For example, based on the flat state, the point where the second sliding pin 266 is located in the second rotary structure 220 may be shown as a second point A2. In the folding and unfolding operations, the second point A2 may move along a third rotational path P3.

In an embodiment, the second arm part 260 and the second sliding pin 266 may rotate about the second arm shaft 242. For example, in the folding operation, the second arm part 260 and the second sliding pin 266 may rotate in the counterclockwise direction. For example, in the flat state, the second sliding pin 266 may be located at the second point, and in the folded state, the second sliding pin 266 may be located in a position spaced apart from the second point A2 in a direction perpendicular to the axial direction. The second sliding pin 266 may move along a fourth rotational path P4 in the folding and unfolding operations.

In various embodiments, the third rotational path P3 and the fourth rotational path P4 may differ from each other. For example, the second rotational axis R2 and the second arm shaft 242 may be parallel to each other, but may not coincide with each other, and the radii of rotation of the second rotary structure 220 and the second arm part 260 may not coincide with each other.

Accordingly, in the folding and unfolding operations, the second arm part 260 and the second sliding pin 266 may slide relative to the second rotary structure 220. The sliding operation of the second sliding pin 266 and the second arm part 260 may be guided as the second sliding pin 266 is accommodated in the second sliding groove 225 of the second rotary structure 220. In an embodiment, when the folding operation is performed in the flat state, the distance between the second sliding pin 266 and the second point A2 may increase. When the unfolding operation is performed in the fully folded state, the distance between the second sliding pin 266 and the second point A2 may decrease.

Figure 8:
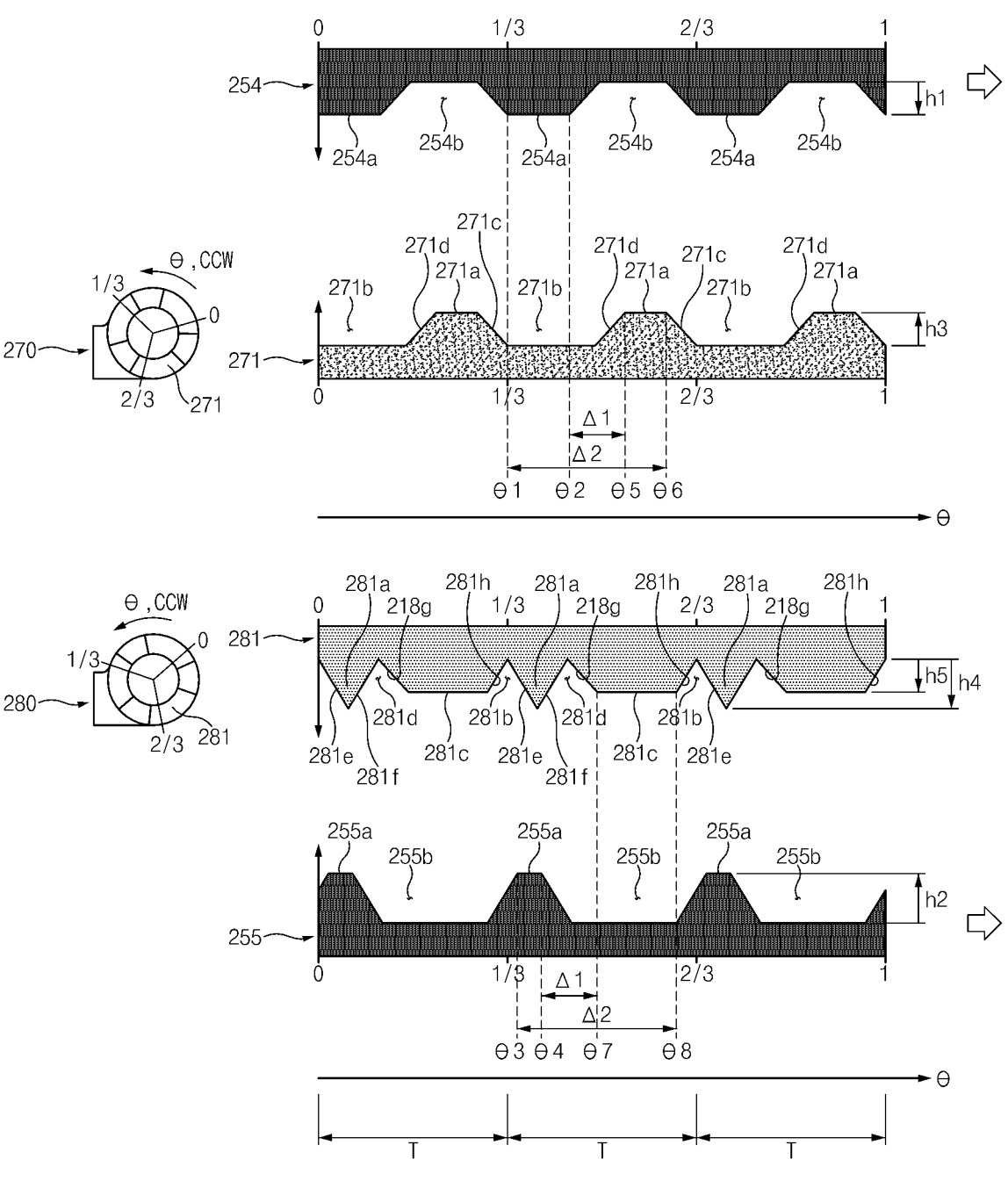
FIG. 8 is a view illustrating a cam profile of the hinge structure according to an embodiment.

FIG. 8 is a view illustrating a cam profile of the hinge structure according to an embodiment.

Only the cam profiles of first cam structures (e.g., the first arm cam 254, the second arm cam 255, the first moving cam 271, and the third moving cam 281) coupled to the first arm shaft 241 are illustrated in FIG. 8, but the cam profiles may be identically applied to second cam structures (e.g., the third arm cam 264, the fourth arm cam 265, the second moving cam 272, and the fourth moving cam 282) coupled to the second arm shaft. The first arm cam 254, the second arm cam 255, the first moving cam 271, the third moving cam 281, and a coupling relationship therebetween, which will be described below, may be identically applied to the third arm cam 264, the fourth arm cam 265, the second moving cam 272, the fourth moving cam 282, and a coupling relationship therebetween.

The illustrated cam profiles of the first cam structures (e.g., the first arm cam 254, the second arm cam 255, the first moving cam 271, and the third moving cam 281) of the hinge structure 200 in a fully folded state are spread with respect to the first arm shaft 241. The horizontal axes of the cam profiles of the first cam structures are spread from 0 degrees, which is a reference point, to 360 degrees. For example, the reference point may correspond to the fully folded state, and as the hinge structure 200 is unfolded, the first arm cam 254 and the second arm cam 255 may move rightward (e.g., rotation in the unfolding direction) in the illustrated profiles, and the first moving cam 271 and the third moving cam 281 may move in the axial direction. The first arm cam 254 and the second arm cam 255 may move by an angle of 120 degrees or less.

Figure 9:
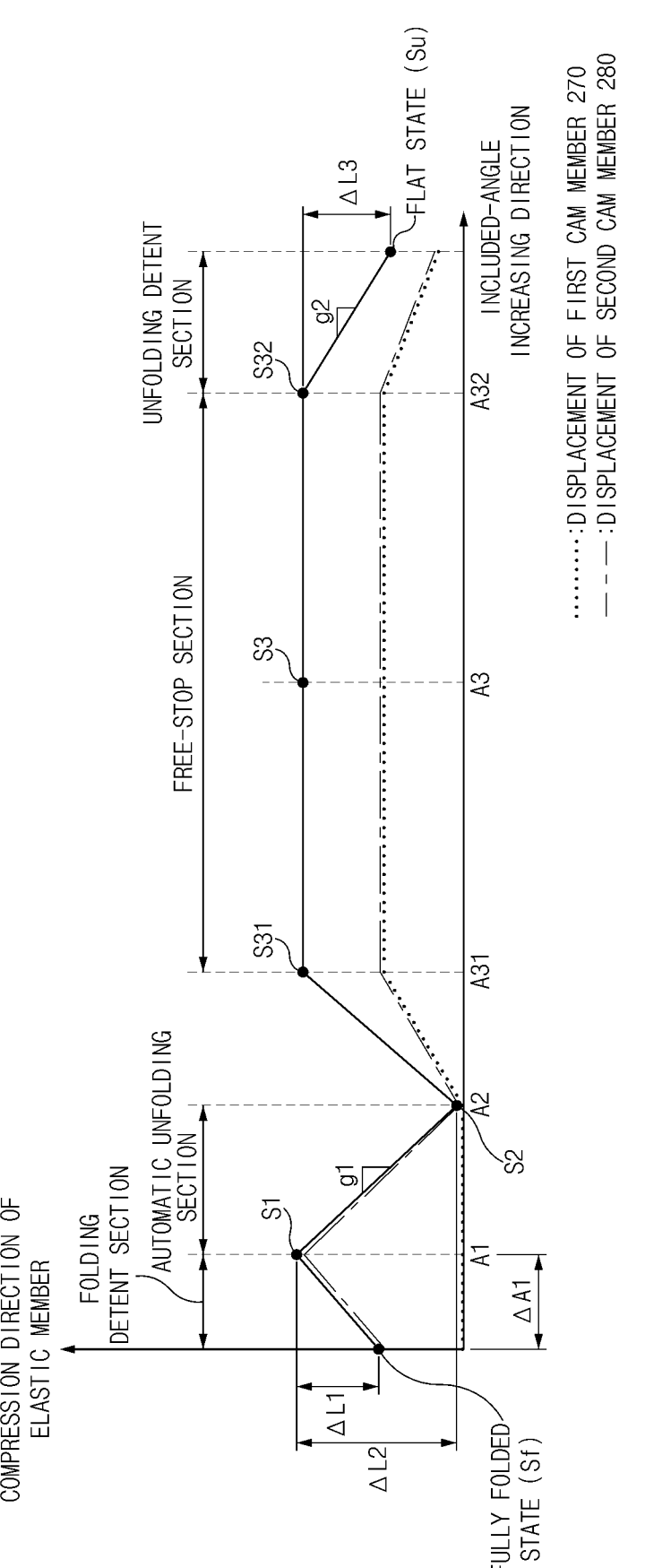
FIG. 9 is a view illustrating compression of elastic members of the hinge structure depending on an included angle of the electronic device according to an embodiment.

In various embodiments, the first arm cam 254 and the second arm cam 255 may rotate together with the first arm shaft 241, and for example, the rotation angle of the first arm shaft 241 may be ½ of the included angle A of the electronic device 100 and the hinge structure 200 illustrated in FIG. 9. In various embodiments, the third arm cam 264 and the fourth arm cam 265 may rotate together with the second arm shaft 242, and for example, the rotation angle of the second arm shaft 242 may be ½ of the included angle A of the electronic device 100.

The horizontal axes of the cam profiles may mean the direction (e.g., the unfolding direction) in which the first arm cam 254 and the second arm cam 255 rotate when the hinge structure 200 is unfolded in the fully folded state that is the reference point. For example, the first arm cam 254 and the second arm cam 255 may move in the direction of the illustrated arrow. The vertical axes of the cam profiles may mean the axial direction of the hinge structure 200.

In an embodiment, the cam structures may be formed to be repeated in the same shape and interval depending on the angular displacement of the first arm shaft 241. The angular displacement, on the basis of which the repetition is made, is shown as a period T. In an embodiment, the cam structures may be configured to have one or more periods T. For example, the cam structures may be formed to have three periods T including an angular displacement of 120 degrees. In various embodiments, the cam structures are not necessarily limited to having the three periods T. For example, the cam structures may have one, two, four, or more periods.

Referring to FIG. 8, the first arm cam 254 may include first protrusions 254*a* and first depressions 254*b*. The first protrusions 254*a* may include portions protruding from flat recessed surfaces of the first depressions 254*b* in the second axial direction ②. The first protrusions 254*a* may protrude in the second axial direction ② by a first height h1. The first protrusions 254*a* may include flat protruding surfaces, and each of the protruding surfaces may extend from a first angle θ1 to a second angle θ2 and may have a first angular displacement θ2-θ1. The first protrusions 254*a* may be engaged with third protrusions 271*a* of the first moving cam 271.

In the first arm cam 254, when viewed in the unfolding direction (e.g., the right direction based on FIG. 8, the direction indicated by the arrow), the first depression 254*b* and the first protrusion 254*a* may be sequentially formed and may form one period T. For example, the first depression 254*b* may be formed again in the unfolding direction of the first protrusion 254*a*.

Referring to FIG. 8, the first moving cam 271 may include the third protrusions 271*a* and third depressions 271*b*. The third protrusions 271*a* may include portions protruding from flat recessed surfaces of the third depressions 271*b* in the first axial direction ①. The third protrusions 271*a* may protrude in the first axial direction ① by a third height h3. The third protrusions 271*a* may include flat protruding surfaces, and each of the protruding surfaces may extend from a fifth angle θ5 to a sixth angle θ6 and may have a third angular displacement θ6-θ5. The third protrusions 271*a* may be engaged with the first protrusions 254*a* of the first arm cam 254. The first moving cam 271 may include first inclined surfaces 271*c* and second inclined surfaces 271*d*. The first inclined surfaces 271*c*, when viewed in the unfolding direction, may be inclined downward (e.g., in the second axial direction ②) from the third protrusions 271*a* toward the third depressions 271*b*. The second inclined surfaces 271*d*, when viewed in the unfolding direction, may be inclined upward (e.g., in the first axial direction ①) from the third depressions 271*b* toward the third protrusions 271*a*. For example, the protruding surfaces may be formed between the first inclined surfaces 271*c* and the second inclined surfaces 271*d*.

In the first moving cam 271, when viewed in the unfolding direction, the first inclined surface 271c, the first depression 271b, the second inclined surface 271d, and the second protrusion 271a may be sequentially formed and may form one period T. For example, the first inclined surface 271c may be formed again in the unfolding direction of the second protrusion 271a.

Referring to FIG. 8, the second arm cam 255 may include second protrusions 255a and second depressions 255b. The second protrusions 255a may include portions protruding from the second depressions 255b in the first axial direction ①. The second protrusions 255a may protrude in the first axial direction ① by a second height h2. The second protrusions 255a may include flat protruding surfaces, and each of the protruding surfaces may extend from a third angle θ3 to a fourth angle θ4 and may have a second angular displacement θ4-θ3. The second protrusions 255a may be engaged with fourth protrusions 281a and fifth protrusions 281c of the third moving cam 281.

In the second arm cam 255, when viewed in the unfolding direction (e.g., the right direction based on FIG. 8, the direction indicated by the arrow), the second protrusion 255a and the second depression 255b may be sequentially formed and may form one period T. For example, the second protrusion 255a may be formed again in the unfolding direction of the second depression 255b.

Referring to FIG. 8, the third moving cam 281 may include the fourth protrusions 281a, the fifth protrusions 281c, fourth depressions 281d, and fifth depressions 281d. The fourth protrusions 281a may include portions protruding from the fourth depressions 281d in the second axial direction ②. The fourth protrusions 281a may protrude in the first axial direction ① by a fourth height h4. The fifth protrusions may include portions protruding from the fourth depressions 281d in the first axial direction ①. The fifth protrusions 281c may protrude in the first axial direction ① by a fifth height h5. The fifth protrusions 281c may include flat protruding surfaces, and each of the protruding surfaces may extend from a seventh angle θ7 to an eighth angle θ8 and may have a fourth angular displacement θ8-θ7. The fourth protrusions 281a and the fifth protrusions 281c may be engaged with the second protrusions 255a of the second arm cam 255. The third moving cam 281 may include third inclined surfaces 281e, fourth inclined surfaces 281f, fifth inclined surfaces 281g, and sixth inclined surfaces 281h. The third inclined surfaces 281e, when viewed in the unfolding direction, may be inclined upward (e.g., in the second axial direction ②) from the fourth depressions 281b toward the fourth protrusions 281a. The fourth inclined surfaces 281f, when viewed in the unfolding direction, may be inclined downward (e.g., in the first axial direction ①) from the fourth protrusions 281a toward the fifth depressions 281d. The fifth inclined surfaces 281g, when viewed in the unfolding direction, may be inclined upward (e.g., in the second axial direction ②) from the fifth depressions 281d toward the fifth protrusions 281c. The sixth inclined surfaces 281h, when viewed in the unfolding direction, may be inclined downward (e.g., in the first axial direction) from the fifth protrusions 281c toward the fourth depressions 281d. For example, the protruding surfaces of the fourth protrusions 281a may be formed between the third inclined surfaces 281e and the fourth inclined surfaces 281f For example, the protruding surfaces of the fifth protrusions 281c may be formed between the fifth inclined surfaces 281g and the sixth inclined surfaces 281h.

In the third moving cam 281, when viewed in the unfolding direction, the fourth depression 281b, the third inclined surface 281e, the fourth protrusion 281a, the fourth inclined surface 281f, the fifth depression 281c, the fifth inclined surface 281g, the fifth protrusion 281d, and the sixth inclined surface 281h may be sequentially formed and may form one period T. For example, the fourth depression 281b may be formed again in the unfolding direction of the sixth inclined surface 281h.

In various embodiments, the protruding surfaces of the first protrusions 254a may have a smaller angular displacement than the recessed surfaces of the third depressions 271b. For example, the protruding surfaces of the first protrusions 254a may have a smaller area than the recessed surfaces of the third depressions 271b. For example, when the first arm cam 254 is viewed in a cylindrical coordinate system whose center coincides with the first arm shaft 241, the protruding surfaces of the first protrusions 254a may have a first length along the circumferential direction, and when the first moving cam 271 is viewed in the cylindrical coordinate system whose center coincides with the first arm shaft 241, the recessed surfaces of the third protrusions 271b may have a second length greater than the first length along the circumferential direction.

In various embodiments, the protruding surfaces of the second protrusions 255a may have a smaller angular displacement than the protruding surfaces of the fifth protrusions 281c. For example, the second angular displacement θ4-θ3 may be smaller than the fourth angular displacement θ8-θ7. For example, the protruding surfaces of the second protrusions 255a may have a smaller area than the protruding surfaces of the fifth protrusions 281c. For example, when the second arm cam 255 is viewed in the cylindrical coordinate system whose center coincides with the first arm shaft 241, the protruding surfaces of the second protrusions 255a may have a third length along the circumferential direction, and when the third moving cam 281 is viewed in the cylindrical coordinate system whose center coincides with the first arm shaft, the protruding surfaces of the fifth protrusions 281c may have a fourth length greater than the third length along the circumferential direction.

In various embodiments, the hinge structure 200 may be configured such that the angular displacement (θ5−θ2=Δ1) between the fifth angle θ5 and the second angle θ2 is substantially the same as the angular displacement (θ7−θ4=Δ1) between the seventh angle θ7 and the fourth angle θ4. For example, when the hinge structure 200 is unfolded in the fully folded state illustrated, the first arm cam 254 and the second arm cam 255 may rotate through the same angle in the unfolding direction. For example, the first arm cam 254 and the second arm cam 255, when viewed in the cam profiles, may move rightward by the same distance. For example, the hinge structure 200 may be configured such that when a second edge of the protruding surface of the first arm cam 254 (e.g., a point at the second angle θ2) moves along the second inclined surface 271d and reaches a fifth edge of the third protrusion 271a of the first moving cam 271 (e.g., a point at the fifth angle θ5), a fourth edge of the protruding surface of the second arm cam 255 (e.g., a point at the fourth angle θ4) simultaneously reaches a seventh edge of the protruding surface of the fifth protruding portion 281c of the third moving cam 281 (e.g., a point at the seventh angle θ7) along the third inclined surface 281e, the fourth inclined surface 281f, and the fifth inclined surface 281g. That is, the first protrusions 254a and the second protrusions 255a may be configured to substantially simultaneously enter the third protrusions 271a of the first moving cam 271 and the fifth protruding portions 281*c* of the third moving cam 281 when the first arm cam 254 and the second arm cam 255 rotate by Δ1.

Likewise, the hinge structure 200 may be configured such that the angular displacement (θ6−θ1=Δ2) between the sixth angle θ6 and the first angle θ1 is substantially the same as the angular displacement (θ8−θ3=Δ2) between the eighth angle θ8 and the third angle θ3. For example, the hinge structure 200 may be configured such that when a first edge of the protruding surface of the first arm cam 254 (e.g., a point at the first angle θ1) moves along the second inclined surface 271*d* and reaches a sixth edge of the third protrusion 271*a* of the first moving cam 271 (e.g., a point at the sixth angle θ6), a third edge of the protruding surface of the second arm cam 255 (e.g., a point at the third angle θ3) simultaneously reaches an eighth edge of the protruding surface of the fifth protruding portion 281*c* of the third moving cam 281 (e.g., a point at the eighth angle θ8) along the third inclined surface 281*e*, the fourth inclined surface 281*f*, and the fifth inclined surface 281*g*. That is, the first protrusions 254*a* and the second protrusions 255*a* may be configured to simultaneously depart from the third protrusions 271*a* of the first moving cam 271 and the fifth protruding portions 281*c* of the third moving cam 281 when the first arm cam 254 and the second arm cam 255 rotate by Δ2.

In an embodiment, the cam structures may be formed such that the first protrusions 254*a* of the first arm cam 254 are accommodated in the first depressions 271*b* of the first moving cam 271 while the second protrusions 255*a* of the second arm cam 255 are engaged with the fourth protrusions 281*a* of the third moving cam 281. In other words, the first depressions 271*b* of the first moving cam 271 may be formed to be longer in the circumferential direction than the fourth protrusions 281*a* of the third moving cam 281. The first depressions 271*b* of the first moving cam 271 may extend at a greater angle θ than the fourth protrusions 281*a* of the third moving cam 281.

The above-described coupling relationship between the cam structures may be for providing a free-stop section of FIG. 9 that will be described below. For example, the first arm cam 254 and the second arm cam 255 may be configured such that the first protrusions 254*a* and the second protrusions 255*a* simultaneously enter and exit the third protrusions 271*a* and the fifth protrusions 281*c*.

However, the cam profiles illustrated in FIG. 8 are merely one example for implementing operations of the hinge structure 200 and the electronic device 100 illustrated in FIG. 9, and the shapes, intervals, and coupling relationship of the cam structures included in the electronic device 100 and the hinge structure 200 according to the embodiment are not limited to the cam profiles illustrated in FIG. 8.

FIG. 9 is a view illustrating compression of the elastic members of the hinge structure depending on an included angle of the electronic device according to an embodiment.

The horizontal axis in the illustrated graph may mean the included angle A. Included angles A1, A2, A31, and A32 mentioned in FIG. 9 may be substantially the same as twice the angles θ illustrated in the profiles of the cam structures of FIG. 8.

In an embodiment, the hinge structure 200 and/or the electronic device 100 may include various states defined by the included angle A formed by the first rotary structure 210 and the second rotary structure 220 in a folding or unfolding operation. In various embodiments, the included angle A may be an angle formed by the first extending portion 253 of the first arm part 250 and the second extending portion

263 of the second arm part 260. Referring to FIGS. 2A to 2C together, the included angle A may include the angle formed by the normal vector n1 of the first region 141 and the normal vector n2 of the second region 142 of the display 140, the angle formed by the third edge P3 and the fourth edge P4, or the angle formed by the first housing 110 and the second housing 120.

The vertical axis in the illustrated graph may mean displacements of the cam members 270 and 280. For example, it may mean that the distance between the first cam member 270 and the second cam member 280 decreases toward the + direction. Alternatively, the vertical axis in the illustrated graph may mean displacements of the elastic members 291 and 292. For example, it may mean that the elastic members 291 and 292 are further compressed toward the + direction.

That is, it may mean that as cam displacements increase, the elastic members 291 and 292 are further compressed and friction forces between the cam structures increase. Increased friction torques may be applied to the arm shafts 241 and 242 by the increased friction forces. The increase in the friction torques may mean an increase in rotational torques required for operating the hinge structure 200.

In an embodiment, the hinge structure 200 and/or the electronic device 100 may include a first state S1 in which the included angle defined between a fully folded state Sf and a flat state Su is a first included angle A1, a second state S2 in which the included angle is a second included angle A2, a third state S3 in which the included angle is a third included angle A3, and a fourth state S4 in which the included angle is a fourth included angle A4. The first included angle A1, the second included angle A2, and the third included angle A3 may be sequentially larger angles. In other words, the hinge structure 200 and/or the electronic device 100 may be sequentially changed from the fully folded state Sf to the flat state Su through the first state S1, the second state S2, and the third state S3.

In an embodiment, the electronic device 100 and the hinge structure 200 may include a folding detent section, an automatic unfolding section, a free-stop section, and an unfolding detent section. The folding detent section may include a section between the fully folded state and the first state S1. The automatic unfolding section may include a section between the first state S1 and the second state S2. The free-stop section may include a section between a state 3-1 S3-1 and a state 3-2 S3-2. The unfolding detent section may include a section between the state 3-2 S3-2 and the flat state Su.

In the folding detent section, the cam displacements may increase as the included angle A increases. For example, in the folding detent section, the elastic members 291 and 292 may be further compressed as the first arm shaft 241 and the second arm shaft 242 rotate. That is, the folding detent section may have a positive slope. Accordingly, to reach the first state S1 from the fully folded state, the electronic device 100 and the hinge structure 200 may require a relatively large force to compress the elastic members 291 and 292 by a first displacement ΔL1. For example, the required force may be proportional to the first displacement ΔL1. For example, when a force smaller than the required force is applied to the electronic device 100 and the hinge structure 200, the electronic device 100 and the hinge structure 200 may be returned to the fully folded state Sf by the elastic forces of the compressed elastic members 291 and 292. Accordingly, the electronic device 100 and the hinge structure 200 may remain in the fully folded state Sf when an unfolding operation is not intended by a user.

In the automatic unfolding section, the cam displacements may decrease as the included angle A increases. The decreased cam displacements may be greater than the increased cam displacements in the folding detent section. For example, in the automatic unfolding section, the elastic members 291 and 292 may be uncompressed as the first arm shaft 241 and the second arm shaft 242 rotate. That is, the automatic unfolding section may have a first negative slope g1. For example, in the automatic unfolding section, the elastic members 291 and 292 may be uncompressed by a second displacement ΔL2 greater than the first displacement ΔL1. The automatic unfolding section and the unfolding detent section may have negative slopes, and the magnitude of the first negative slope g1 of the automatic unfolding section may be greater than the magnitude of a second negative slope g2 of the unfolding detent section. In an embodiment, when departing from the first state S1, the electronic device 100 and the hinge structure 200 may be changed to the second state S2 by the elastic forces of the elastic members 291 and 292 even though an external force (e.g., an unfolding operation of the user) does not act.

In an embodiment, the electronic device 100 and the hinge structure 200 may be configured to be automatically unfolded to the second included angle A2 when a trigger is operated to cause the electronic device 100 and the hinge structure 200 to depart from the first state S1 after being unfolded in the fully folded state. For example, the trigger may include an operation in which the user inserts a finger between the first housing 110 and the second housing 120 to increase the included angle to the first included angle A1 or more.

In various embodiments, the electronic device 100 and the hinge structure 200 may include a semi-automatic unfolding section that includes the folding detent section and the automatic unfolding section. The electronic device 100 and the hinge structure 200 may include the semi-automatic unfolding section (e.g., the folding detent section and the automatic unfolding section) in which the electronic device 100 and the hinge structure 200 are automatically unfolded to the second included angle A2 when a trigger formed at the first included angle A1 or more is applied in the fully folded state. In various embodiments, a first angular displacement ΔA1 to reach the first state S1 may be smaller than a second angular displacement A2-A1 to reach the second state S2 from the first state S1. That is, the electronic device 100 and the hinge structure 200 may be automatically unfolded to a relatively large angle by a trigger by which the electronic device 100 and the hinge structure 200 are unfolded to a relatively small angle. For example, the first included angle A1 may be 15 degrees, and the second included angle A2 may be 40 degrees. However, the first included angle A1 and the second included angle A2 of the hinge structure 200 and the electronic device 100 according to an embodiment are not limited to the aforementioned numerical values and may include various numerical ranges.

In various embodiments, the folding detent section and the automatic unfolding section may be provided by the second cam member 280. For example, the second cam member 280 may include the third moving cam 281 and the fourth moving cam 282. The second cam member 280 may be engaged with the rotating second arm cam 255 and the rotating fourth arm cam 265 and may move in the axial direction to form a cam displacement. In various embodiments, in the folding detent section and the automatic unfolding section, the first cam member 270 may not move in the axial direction. For example, the first cam member 270 may include the first moving cam 271 and the second moving cam 272. In the folding detent section and the automatic unfolding section, the first cam member 270 may be engaged with the rotating first arm cam 254 and the rotating third arm cam 264, but may not move in the axial direction. For example, the first cam member 270 may include a state in which the first protrusions 254a of the first arm cam 254 are accommodated in the third depressions 271b of the first moving cam 271 as illustrated in FIG. 8.

The free-stop section may have s substantially uniform cam displacement irrespective of a change in the included angle. For example, in the free-stop section, the elastic members 291 and 292 may maintain a constant degree of compression even when the first arm shaft 241 and the second arm shaft 242 rotate. In various embodiments, the cam displacement of the free-stop section may be substantially the same as, or greater than, the cam displacement of the first state S1. For example, the elastic members 291 and 292 may be compressed by substantially the same length as that in the first state S1, or may be more compressed than in the first state S1.

The elastic members 291 and 292 compressed in the free-stop section as described above may increase friction forces between the cam structures. Due to the increased friction forces, increased rotational torques may be required to operate the electronic device 100 and the hinge structure 200. Accordingly, the hinge structure 200 and the electronic device 100 may stably maintain various folded states in the free-stop section.

In an embodiment, the free-stop section and the folding detent section may prevent an unintended unfolding operation of the hinge structure 200 and the electronic device 100 due to the restoring forces of the display 140. For example, in a folded state, at least a partial region of the display 140 may be curved. The restoring forces to return the display 140 to the flat state may act on the display 140 in the folded state. The restoring forces may be increased as the thickness and size of the display 140 are increased. Due to the restoring forces, the electronic device 100 and the hinge structure 200 may perform an unintended unfolding operation. For example, the electronic device 100 may be unfolded without maintaining a predetermined angle set by the user, or may be unfolded without maintaining a fully folded state.

In various embodiments, the free-stop section may include the section from the included angle 3-1 A31 to the included angle 3-2 A32. For example, the included angle 3-1 A31 may be 60 degrees, and the included angle 3-2 A32 may be 160 degrees. For example, the free-stop section may be provided in a section of 100 degrees. However, the included angle 3-1 A31 and the included angle 3-2 A32 of the hinge structure 200 and the electronic device 100 according to an embodiment are not limited to the aforementioned numerical values and may include various numerical ranges.

To provide predetermined friction torques in a predetermined folded state (e.g., the free-stop section and the fully folded state Sf), the hinge structure 200 according to an embodiment may include the elastic members 291 and 292 and the cam structures configured to compress the elastic members 291 and 292 in the predetermined folded state. The predetermined friction torques may cancel out restoring torques in the unfolding direction of the display 140. For example, the hinge structure 200 may be configured such that the cam displacements increase as the hinge structure 200 is unfolded in the folding detent section and rotational torques required to reach the first state S1 from the fully folded state Sf are greater than or equal to the restoring torques of the display 140. Accordingly, in the folding detent section, the electronic device 100 and the hinge structure

200 may cancel out the restoring torques of the display 140 and may maintain the fully folded state Sf when a separate external force is not applied.

In an embodiment, in the unfolding detent section, the cam displacements may decrease as the included angle A increases. For example, in the unfolding detent section, the elastic members 291 and 292 may be further uncompressed as the first arm shaft 241 and the second arm shaft 242 rotate. For example, the elastic members 291 and 292 may be uncompressed by a third displacement ΔL3. That is, the unfolding detent section may have the second negative slope g2. The magnitude of the second negative slope g2 may be smaller than the magnitude of the first negative slope g1 in the automatic unfolding section. That is, the slope of the unfolding detent section may be gentler than the slope of the automatic unfolding section. In an embodiment, in the unfolding detent section, the electronic device 100 and the hinge structure 200 may be changed to the flat state by the elastic forces of the elastic members 291 and 292 even when an external force (e.g., an unfolding operation of the user) is not applied. In various embodiments, the third displacement ΔL3 may be substantially the same as the first displacement ΔL1.

To reach the free-stop section (e.g., the state 3-2 S3-2) from the flat state, the electronic device 100 and the hinge structure 200 according to an embodiment may require increased rotational torques capable of further compressing the elastic members 291 and 292 by the third displacement ΔL3. For example, the increased rotational torques may be proportional to the third displacement ΔL3. For example, when torques smaller than the required rotational torques are applied to the electronic device 100 and the hinge structure 200, the electronic device 100 and the hinge structure 200 may be returned to the flat state Su by the elastic forces of the compressed elastic members 291 and 292. Accordingly, the electronic device 100 and the hinge structure 200 may remain in the flat state Su when a folding operation is not intended by the user.

In an embodiment, when folded in the free-stop section (e.g., the state 3-1 S3-1), the electronic device 100 and the hinge structure 200 may be changed to the second state S2 by the elastic forces of the elastic members 291 and 292 even without a separate external force. As described above, when departing from the free-stop section, the electronic device 100 and the hinge structure 200 may be changed to the flat state Su or the second state S2 by the elastic members 291 and 292 even though an external force is not applied.

Figure 10A:
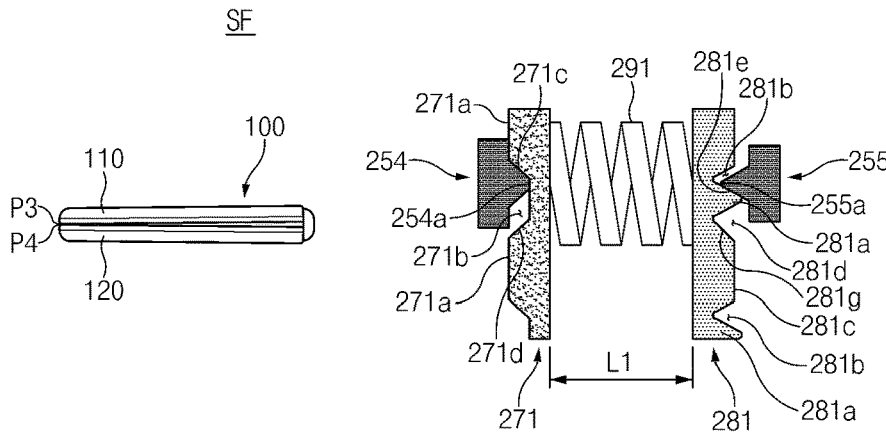
FIGS. 10A, 10B and 10C are views illustrating the hinge structure in a fully folded state and a first state according to an embodiment.
Figure 10B:
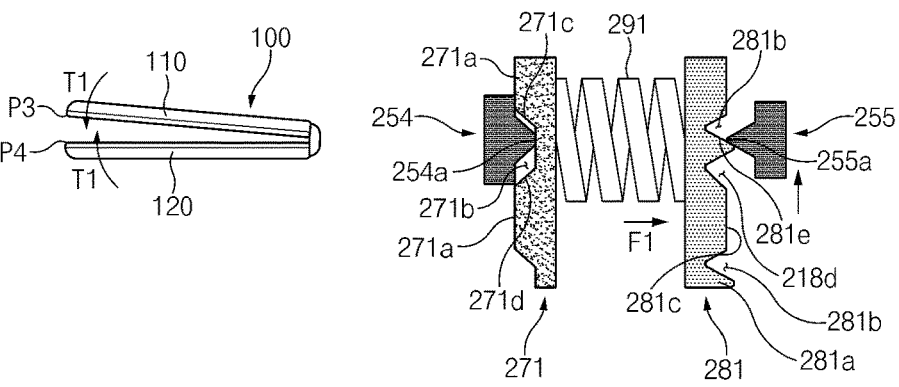
Figure 10C:
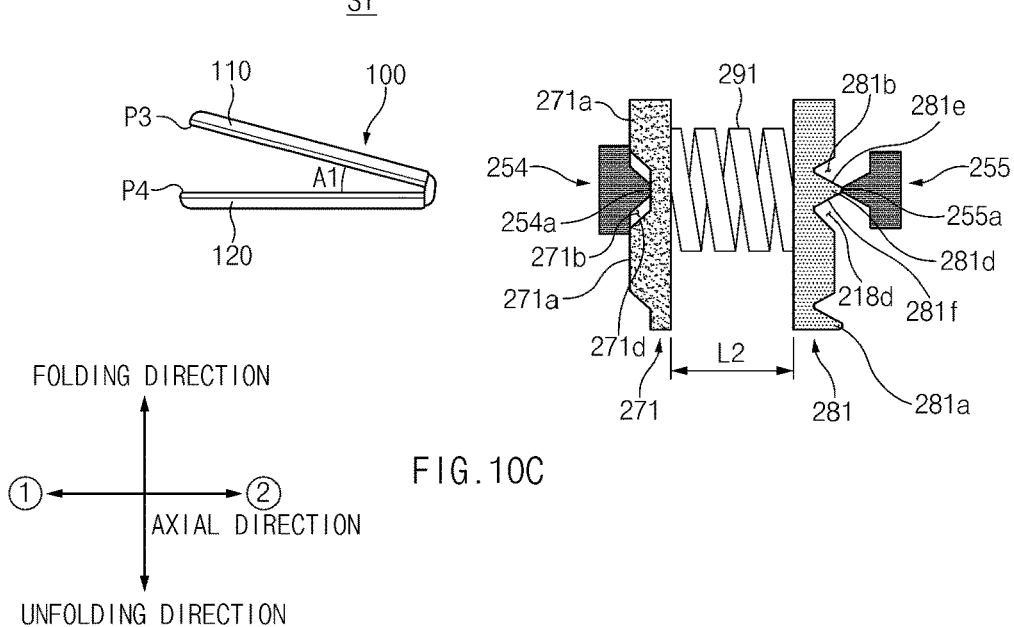
Figure 11A:
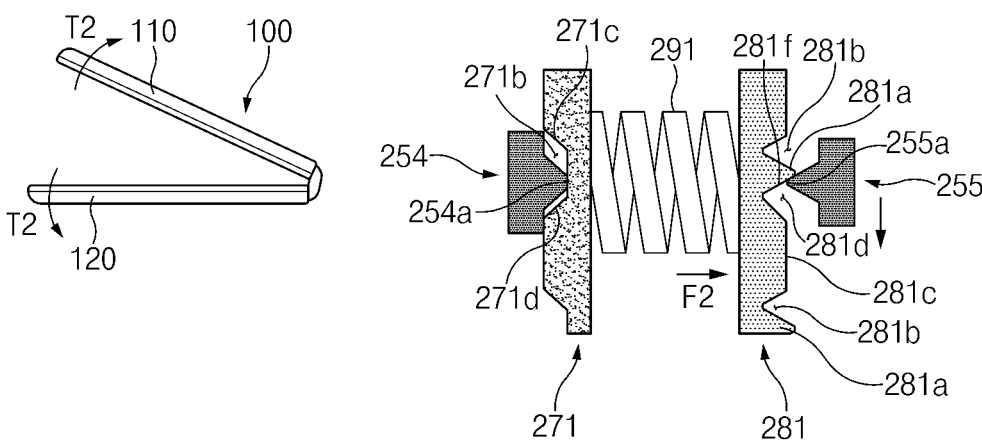
FIGS. 11A and 11B are views illustrating the hinge structure in a second state according to an embodiment.
Figure 11B:
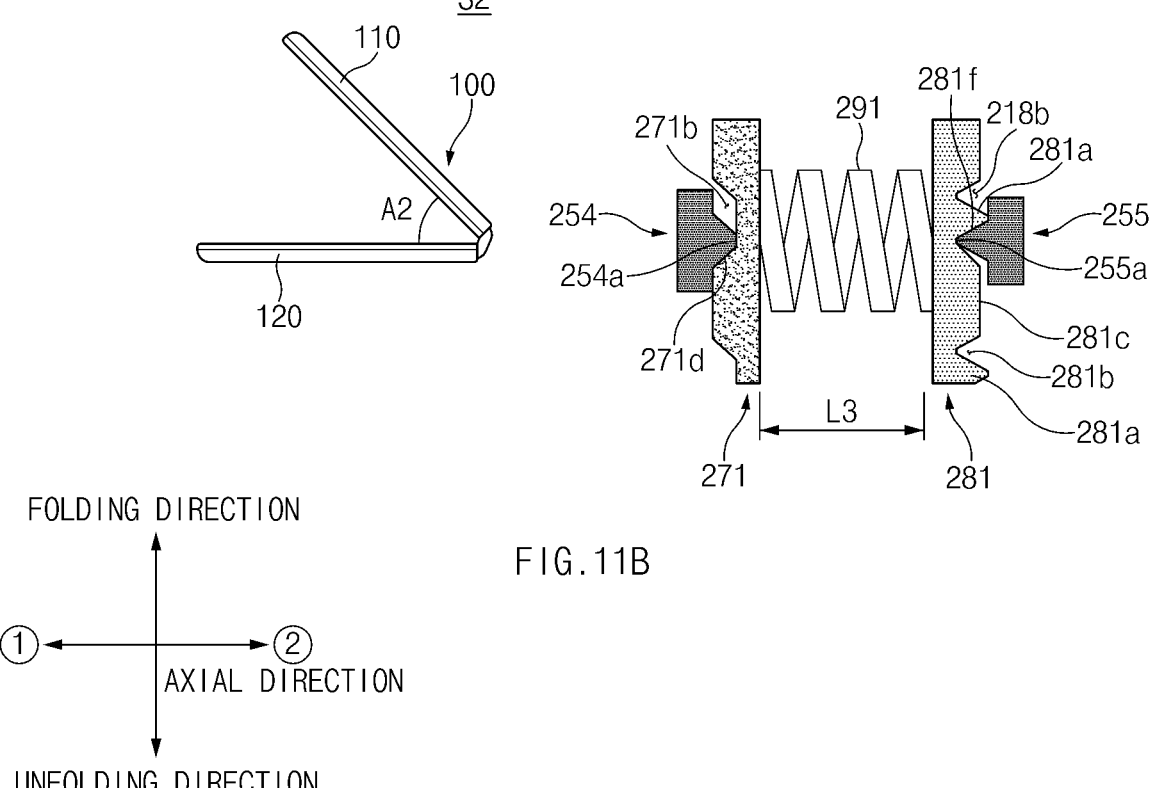
Figure 12A:
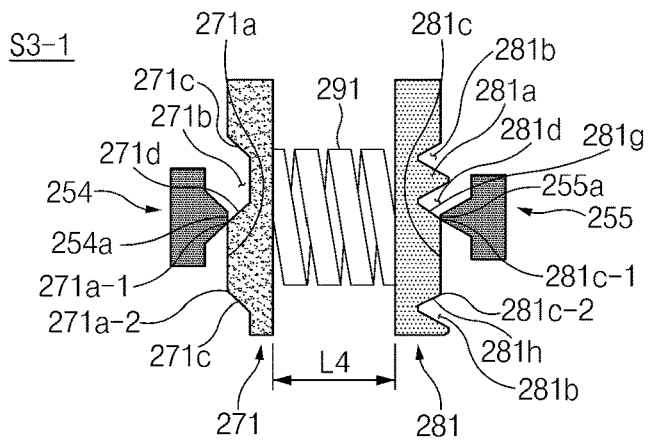
FIGS. 12A, 12B and 12C are views illustrating the hinge structure in a free-stop section according to an embodiment.
Figure 12B:
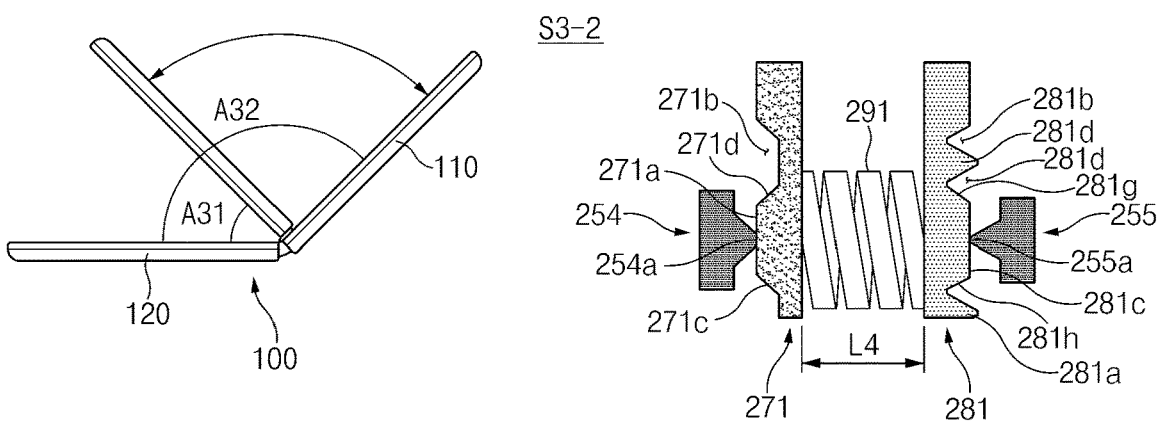
Figure 12C:
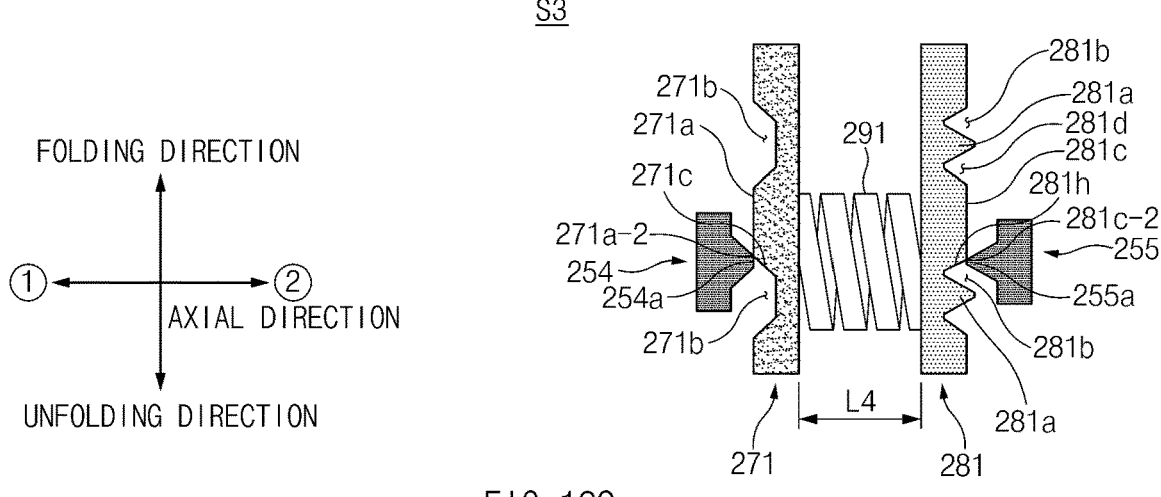
Figure 13A:
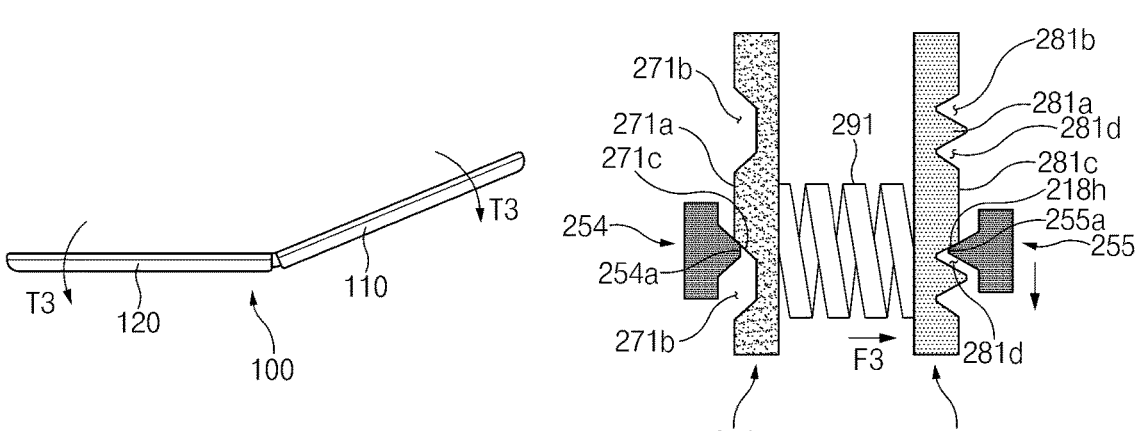
FIGS. 13A and 13B are views illustrating the hinge structure in a flat state according to an embodiment.
Figure 13B:
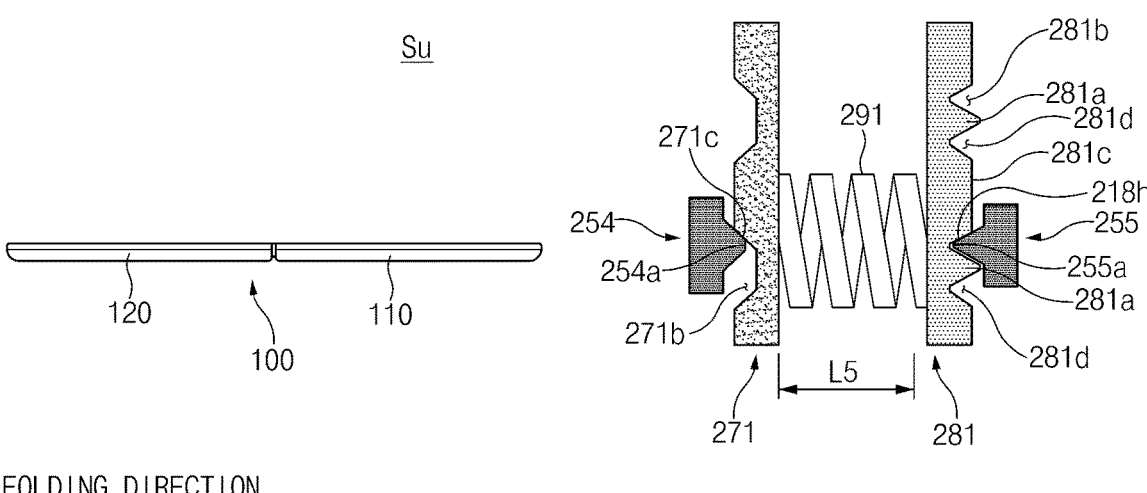
Figure 13B:
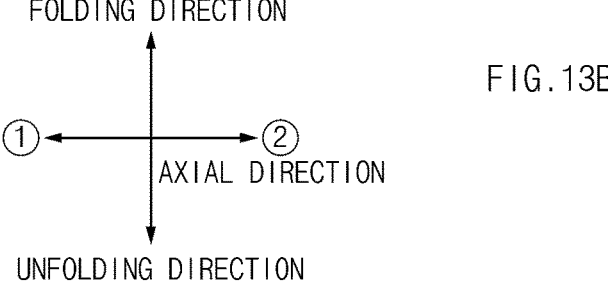

FIGS. 10A, 10B and 10C are views illustrating the hinge structure in the fully folded state and the first state according to an embodiment. FIGS. 11A and 11B are views illustrating the hinge structure in the second state according to an embodiment. FIGS. 12A, 12B and 12C are views illustrating the hinge structure in the free-stop section according to an embodiment. FIGS. 13A and 13B are views illustrating the hinge structure in the flat state according to an embodiment.

Although only the first cam structures related to the first arm shaft are illustrated in FIGS. 10A to 13B, descriptions of the shapes, structures, coupling relationships, and operations of the first cam structures may be identically applied to the second cam structures.

Referring to FIGS. 10A to 13B, in the first moving cam 271, when viewed in the unfolding direction, the first inclined surface 271c, the first depression 271b, the second inclined surface 271d, and the second protrusion 271a may be sequentially formed and may form one period (e.g., the period T of FIG. 8). For example, the first inclined surface 271c may be formed again in the unfolding direction of the second protrusion 271a.

Referring to FIGS. 10A to 13B, in the third moving cam 281, when viewed in the unfolding direction, the fourth depression 281b, the third inclined surface 281e, the fourth protrusion 281a, the fourth inclined surface 281f, the fifth depression 281c, the fifth inclined surface 281g, the fifth protrusion 281d, and the sixth inclined surface 281h may be sequentially formed and may form one period (e.g., the period T of FIG. 8). For example, the fourth depression 281b may be formed again in the unfolding direction of the sixth inclined surface 281h.

Hereinafter, the hinge structure 200 in the fully folded state Sf and the first state S1 and an operation in which the hinge structure 200 and/or the electronic device 100 changes from the fully folded state Sf to the first state S1 will be described with reference to FIGS. 10A, 10B and 10C.

In the fully folded state, at least a portion of the first protrusion 254a of the first arm cam 254 may be located in the third depression 271b of the first moving cam 271. The first protrusion 254a may include a first protruding surface that is flat. The third depression 271b may include a third recessed surface that is flat. The first protruding surface of the first protrusion 254a may make contact with the third recessed surface of the third depression 271b. An inclined surface of the first protrusion 254a may make contact with the first inclined surface 271c of the third depression 271b.

In the fully folded state, at least a portion of the second protrusion 255a of the second arm cam 255 may be located in the fourth depression 281d of the third moving cam 281. The second protrusion 255a may be supported by the third inclined surface 281e. An end portion of the second protrusion 255a may be disposed in a state of being spaced apart from a fourth recessed surface of the fourth depression 281d. Referring to FIG. 2C, in the fully folded state, the first edge P1 and the second edge P2 may make contact with each other, and therefore the first housing 110 and the second housing 120 of the electronic device 100 cannot perform a folding operation any more. Accordingly, the second protrusion 255a of the second arm cam 255 may be supported by the third inclined surface 281e of the third moving cam 281 and cannot move toward a third recessed surface.

In the fully folded state, the first elastic member 291 may be compressed to a first length L1. The first elastic member 291 may be less compressed in the fully folded state than in the first state S1.

In the first state S1, at least a portion of the first protrusion 254a of the first arm cam 254 may be located in the third depression 271b of the first moving cam 271. The first protruding surface of the first protrusion 254a may make contact with the third recessed surface of the third depression 271b. For example, in the first state S1, the first protrusion 254a may be moved in the unfolding direction by a predetermined distance with respect to the fully folded state Sf. The inclined surface of the first protrusion 254a may be spaced apart from the first inclined surface 271c of the third depression 271b.

In the first state, the second protrusion 255a of the second arm cam 255 may make contact with the fourth protrusion 281a of the third moving cam 281. For example, the end portion of the second protrusion 255a may make surface-to-surface contact with an end portion of the fourth protrusion 281a. With respect to the fully folded state Sf, the first cam member 270 may not move in the axial direction, and the second cam member 280 may move in the first axial direction ①. Accordingly, the first elastic member 291 may be more compressed in the first state than in the fully folded state Sf. For example, in the first state S1, the first elastic member 291 may have a second length L1, and the second length L2 may be smaller than the first length L1 in the fully folded state Sf.

When the hinge structure 200 and/or the electronic device 100 changes from the fully folded state Sf to the first state S1, the first protrusion 254a of the first arm cam 254 may move in the third depression 271b of the first moving cam 271. For example, the first protrusion 254a may move in the unfolding direction while the first protruding surface and the third recessed surface make surface-to-surface contact with each other. The second protrusion 255a of the second arm cam 255 may move toward the third protrusion 271a of the third moving cam 281 along the third inclined surface 281e of the third moving cam 281. At this time, the second protrusion 255a may press the third inclined surface 281e in the first axial direction ①, and the first elastic member 291 may be compressed. That is, the length of the first elastic member 291 in the axial direction may be decreased from the first length L1 to the second length L2.

In an embodiment, a force may be applied to the third moving cam 281 and the second cam member 280 in the second axial direction ② by the first elastic member 291. The force may increase a friction force between the second protrusion 255a and the third inclined surface 281e, and thus torque required for a change from the fully folded state Sf to the first state S1 may be increased. Accordingly, a sufficient force capable of cancelling out the torque increased for the change to the first state S1 may be required. In a case in which the sufficient force is not applied, the hinge structure 200 and/or the electronic device 100 may be returned to the fully folded state. As described above, the hinge structure 200 and/or the electronic device 100 may provide a detent function capable of stably maintaining the fully folded state. For example, the hinge structure 200 and/or the electronic device 100 may provide the folding detent section illustrated in FIG. 9.

FIGS. 11A and 11B are views illustrating the hinge structure in the second state according to an embodiment.

Hereinafter, the hinge structure 200 in the second state S2 and an operation in which the hinge structure 200 and/or the electronic device 100 changes from the first state S1 to the second state S2 will be described with reference to FIGS. 11A and 11B.

In the second state S2, at least a portion of the first protrusion 254a of the first arm cam 254 may be located in the third depression 271b of the first moving cam 271. The first protruding surface of the first protrusion 254a may make contact with the third recessed surface of the third depression 271b. For example, in the second state S2, the first protrusion 254a may be moved in the unfolding direction by a predetermined distance with respect to the first state 1. For example, an inclined surface of the first protrusion 254a may make contact with the second inclined surface 271d of the third depression 271b.

In the second state, the second protrusion 255a of the second arm cam 255 may be located in the fifth depression 281d of the third moving cam 281. The end portion of the second protrusion 255a may make contact with a fifth recessed surface of the fifth depression 281d. For example, the second protrusion 255a may make contact with the fourth inclined surface 281f of the third moving cam 281. For example, with respect to the first state S1, the first cam member 270 may not move in the axial direction, and the second cam member 280 may move in the second axial direction ②. Accordingly, the first elastic member 291 may be less compressed in the second state S2 than in the first state S1. For example, in the second state S2, the first elastic member 291 may have a third length L3, and the third length L3 may be greater than the second length L2 in the first state S1.

When the hinge structure 200 and/or the electronic device 100 changes from the first state S1 to the second state S2, the first protrusion 254a of the first arm cam 254 may move in the third depression 271b of the first moving cam 271. For example, the first protrusion 254a may move in the unfolding direction while the first protruding surface and the third recessed surface make surface-to-surface contact with each other. The second protrusion 255a of the second arm cam 255 may move from the fourth protrusion 281a of the third moving cam 281 toward the fifth depression 281d of the third moving cam 281 along the fourth inclined surface 281f of the third moving cam 281. For example, the inclined surface of the second protrusion 255a and the fourth inclined surface 281f of the third moving cam 281 may move while making surface-to-surface contact with each other. At this time, as the second protrusion 255a moves in the unfolding direction, the gap between the third moving cam 281 and the second arm cam 255 may be decreased, and the first elastic member 291 may be uncompressed. That is, the length of the first elastic member 291 in the axial direction may be increased from the second length L2 to the third length L3. The first elastic member 291 may press the second cam member 280 in the second axial direction ②. For example, the potential energy stored in the first elastic member 291 in the first state S1 may be converted into kinetic energy that presses the second cam member 280 in the second axial direction ②. The kinetic energy may more rapidly move the third moving cam 281 and may more rapidly move the second arm cam 255 in the unfolding direction.

The hinge structure 200 and/or the electronic device 100 according to an embodiment may be configured to be rapidly changed to the second state S2 or the fully folded state by using the potential energy stored in the first elastic member 291, when departing from the first state S1. For example, in the first state S1, the second protrusion 255a of the second arm cam 255 and the fourth protrusion 281a of the third moving cam 281 may make contact with each other, and when the hinge structure 200 and/or the electronic device 100 is folded or unfolded in the first state S1, the second protrusion 255a may move along the third inclined surface 281e or the fourth inclined surface 281f.

In an embodiment, in a case in which the hinge structure 200 and/or the electronic device 100 is unfolded from the first state S1 to the second state S2, the second protrusion 255a may rotate by a first rotation angle when viewed in the unfolding direction and may move by a first distance when viewed in the axial direction. In an embodiment, in a case in which the hinge structure 200 and/or the electronic device 100 is folded from the first state S1 to the fully folded state Sf, the second protrusion 255a may rotate by a second rotation angle when viewed in the folding direction and may move by a second distance when viewed in the axial direction. In this case, the second rotation angle may be smaller than the first rotation angle. The second distance may be smaller than the first distance.

Referring to FIGS. 10A to 11B, when a trigger is applied in the fully folded state, the electronic device 100 according to an embodiment may be rapidly unfolded to the second included angle A2. For example, the trigger may include an operation in which the user inserts a finger between the first housing 110 and the second housing 120 in the fully folded state Sf. The trigger may cause the hinge structure 200 to reach the first state S1 in which the included angle between the first housing 110 and the second housing 120 is the first included angle A1, and as the included angle is increased, the hinge structure 200 may depart from the first state S1 and may be changed to the second state S2. At this time, the second protrusion 255a of the second arm cam 255 may be rapidly moved to the fifth depression 281d along the fourth inclined surface 281f by the first elastic member 291.

FIGS. 12A, 12B and 12C are views illustrating the hinge structure in the free-stop section according to an embodiment.

The third state S3 may be any state included in the free-stop section. For example, the free-stop section may include the section from the included angle 3-1 A31 to the included angle 3-2 A32. The third state S3 may include any state in which the included angle is not less than the included angle 3-1 A31 and not more than the included angle 3-2 A32.

In the third state, the first protrusion 254a of the first arm cam 254 may make contact with the third protrusion 271a of the first moving cam 271. For example, the first protruding surface of the first protrusion 254a may make surface-to-surface contact with a third protruding surface of the third protrusion 271a. The second protrusion 255a of the second arm cam 255 may make contact with the fifth protrusion 281c of the third moving cam 281. For example, a second protruding surface of the second protrusion 255a may make surface-to-surface contact with a fifth protruding surface of the fifth protrusion 281c.

When the hinge structure 200 and/or the electronic device 100 changes from the second state S2 to the third state S3, the first protrusion 254a of the first arm cam 254 may move to the third protrusion 271a of the first moving cam 271 along the second inclined surface 271d of the first moving cam 271. The second protrusion 255a of the second arm cam 255 may move to the fifth protrusion 281c of the third moving cam 281 along the fifth inclined surface 281g of the third moving cam 281. Accordingly, the first cam member 270 may move in the second axial direction ②, and the second cam member 280 may move in the first axial direction ①. The first elastic member 291 may be more compressed in the third state S3 than in the second state S2. For example, the first elastic member 291 may have a fourth length L4, and the fourth length L4 may be smaller than the third length L3 in the second state S2.

In various embodiments, the first elastic member 291 may be more compressed in the third state S3 than in the first state S1, or may be identically compressed as in the first state S1. In other words, the fourth length L4 of the first elastic member 291 may be equal to or smaller than the second length L2 in the first state S1.

In various embodiments, the first elastic member 291 may be configured to be compressed to the same length in the free-stop section and the first state S1. That is, the fourth length L4 may be substantially the same as the second length L2. To this end, the protruding height of the fourth protrusion 281a may be equal to the sum of the protruding height of the fifth protrusion 281c and the protruding height of the third protrusion 271a.

In the free-stop section, the first protrusion 254a of the first arm cam 254 may move in the unfolding direction while maintaining the contact with the third protrusion 271a of the first moving cam 271. For example, the first protruding surface and the third protruding surface may remain making surface-to-surface contact with each other. In the free-stop section, the first protrusion 254a of the first arm cam 254 may move along the flat surface of the third protrusion 271a of the first moving cam 271. In the free-stop section, the second protrusion 255a of the second arm cam 255 may move in the folding direction while maintaining the contact with the fifth protrusion 281c of the third moving cam 281. For example, the second protruding surface and the fifth protruding surface may remain making surface-to-surface contact with each other. In the free-stop section, the second protrusion 255a of the second arm cam 255 may move along the flat surface of the fifth protrusion 281c of the third moving cam 281. Accordingly, in the free-stop section, the length of the first elastic member 291 may remain constant at the fourth length L4, and the first elastic member 291 may remain more compressed than in the second state S2. In this case, the fourth length L4 may be smaller than the third length L3 in the second state S2.

Furthermore, since the first elastic member 291 remains in the compressed state, the hinge structure 200 may provide uniform friction forces between the cam structures in the free-stop section. In addition, uniform torques may be required to unfold or fold the electronic device 100 in the free-stop section. That is, the user may apply predetermined forces to the first housing 110 and the second housing 120 to manipulate the first housing 110 and the second housing 120 such that various angles are formed therebetween.

In an embodiment, the state 3-1 s3-1 may be a state in which the included angle is the included angle 3-1 A31 and may be a state in which the free-stop section starts. The state 3-2 S3-2 may be a state in which the included angle is the included angle 3-2 A32 and may be a state in which the free-stop section ends.

In an embodiment, the third protruding surface of the third protrusion 271a of the first moving cam 271 may include a first edge 271a-1 connected with the second inclined surface 271d and a second edge 271a-2 connected with the first inclined surface 271c. For example, the second edge 271a-2 may be located in the unfolding direction from the first edge 271a-1. The fifth protruding surface of the fifth protrusion 281c of the third moving cam 281 may include a third edge 281c-1 connected with the fifth inclined surface 281g and a fourth edge 281c-2 connected with the sixth inclined surface 281h. For example, the fourth edge 281c-1 may be located in the unfolding direction from the third edge 281c-2.

In various embodiments, in the state 3-1, the first protrusion 254a of the first arm cam 254 may be located at the first edge 271a-1 of the third protrusion 271a of the first moving cam 271, and the second protrusion 255a of the second arm cam 255 may be located at the third edge 281c-1 of the fifth protrusion 281c of the third moving cam 281. In the state 3-2, the first protrusion 254a of the first arm cam 254 may be located at the second edge 271a-2 of the third protrusion 271a of the first moving cam 271, and the second protrusion 255a of the second arm cam 255 may be located at the fourth edge 281c-2 of the fifth protrusion 281c of the third moving cam 281. As described above, the hinge structure 200 may be configured such that at the beginning of the free-stop section, the first protrusion 254a of the first arm cam 254 starts making contact with the flat third protruding surface of the first moving cam 271 while the second protrusion 255a of the second arm cam 255 starts making contact with the flat fifth protruding surface of the third moving cam 281. Furthermore, the hinge structure 200 may be configured such that at the end of the free-stop section, the first protrusion 254a of the first arm cam 254 stops making contact with the flat third protruding surface of the first moving cam 271 while the second protrusion 255a of the second arm cam 255 stops making contact with the flat fifth protruding surface of the third moving cam 281.

In various embodiments, when viewed in the cylindrical coordinate system whose center coincides with the first arm shaft, the third protruding surface and the fifth protruding surface may extend in the same angular section. Furthermore, referring to FIG. 8, when an angle is measured from the fully folded state Sf, the third protruding surface and the fifth protruding surface may be located at the same angular displacement of the first moving cam 271 and the third moving cam 281.

FIGS. 13A and 13B are views illustrating the hinge structure in the flat state according to an embodiment.

Hereinafter, the hinge structure 200 in the flat state Su and an operation in which the hinge structure 200 and/or the electronic device 100 changes from the free-stop section to the flat state Su will be described with reference to FIGS. 13A and 13B.

In the flat state Su, at least a portion of the first protrusion 254a of the first arm cam 254 may be located in the third depression 271b of the first moving cam 271. An end portion of the first protrusion 254a may make contact with the first inclined surface 271c of the first moving cam 271. For example, the inclined surface of the first protrusion 254a may make contact with the first inclined surface 271c of the first moving cam 271. The end portion of the first protrusion 254a may be disposed in a state of being spaced apart from the third recessed surface of the third depression 271b.

In the flat state Su, at least a portion of the second protrusion 255a of the second arm cam 255 may be located in the fourth depression 281d of the third moving cam 281. The second protrusion 255a may be supported by the sixth inclined surface 281h. The end portion of the second protrusion 255a may be disposed in a state of being spaced apart from the fourth recessed surface of the fourth depression 281d. In the flat state Su, the first housing 110 and the second housing 120 of the electronic device 100 cannot perform an unfolding operation any more. For example, referring to FIG. 6A together, the first rotary structure 210 can no longer rotate in the counterclockwise due to the first connecting portion 212 of the first rotary structure 210. The second rotary structure 220 can no longer rotate in the clockwise direction due to the second connecting portion 222 of the second rotary structure 220. Accordingly, the second protrusion 255a of the second arm cam 255 may be supported by the sixth inclined surface 281h of the third moving cam 281 and may remain spaced apart from the fourth recessed surface of the fourth depression 281d.

When the hinge structure 200 and/or the electronic device 100 changes from the free-stop section to the flat state, the first protrusion 254a of the first arm cam 254 may move toward the third depression 271b along the first inclined surface 271c of the first moving cam 271. As described above, the first protrusion 254a of the first arm cam 254 may move to any point on the first inclined surface 271c without making contact with the third recessed surface of the third depression 271b. The second protrusion 255a of the second arm cam 255 may move toward the fourth depression 281d of the third moving cam 281 along the sixth inclined surface 281h of the third moving cam 281. In an embodiment, as the first protrusion 254a of the first arm cam 254 moves in the unfolding direction, the gap between the first arm cam 254 and the first moving cam 271 may be decreased. Likewise, as the second protrusion 255a of the second arm cam 255 moves in the unfolding direction, the gap between the second arm cam 254 and the third moving cam 281 may be decreased. Accordingly, the first elastic member 291 may be uncompressed. That is, the length of the first elastic member 291 in the axial direction may be increased from the fourth length L4 to a fifth length L5. In an embodiment, the first elastic member 291 may press the first cam member 270 in the first axial direction ① and may press the second cam member 280 in the second axial direction ②. For example, the potential energy stored in the first elastic member 291 in the free-stop state may be converted into kinetic energy that presses the first cam member 270 and the second cam member 280.

In an embodiment, the hinge structure 200 may provide an unfolding detent function in any state between the free-stop section and the flat state. For example, in a folding operation for entrance into the free-stop section from the flat state, the first arm cam 254 may move to the third protrusion 271a of the first moving cam 271 along the first inclined surface 271c, and the second arm cam 255 may move to the fifth protrusion 281c along the sixth inclined surface 281h. At this time, the first cam member 270 and the second cam member 280 may move toward each other, and the first elastic member 291 may be compressed from the fifth length L5 to the fourth length L4.

The compressed first elastic member 291 may press the first moving cam 271 and the third moving cam 281 such that the first cam member 270 and the second cam member 280 may move away from each other. For example, the first elastic member 291 may press the first moving cam 271 in the first axial direction ① and may press the third moving cam 281 in the second axial direction ②. By pressing the first moving cam 271 and the third moving cam 281 by the first elastic member 291, a friction force between the first arm cam 254 and the first moving cam 271 and/or a friction force between the second arm cam 255 and the third moving cam 281 may be increased. Torque required for the entrance into the free-stop section from the flat state may be increased by the increased friction forces. For example, a sufficient force capable of compressing the first elastic member may be required for the entrance into the free-stop section from the flat state.

In a case in which the sufficient force is not applied, the first arm cam 254 cannot completely pass over the first inclined surface 271c and cannot reach the third protruding surface of the third protrusion 271a. The second arm cam 255 cannot completely pass over the sixth inclined surface 281h and cannot reach the fifth protruding surface of the fifth protrusion 281c. The first arm cam 254 and the second arm cam 255 may be returned to the flat state by the first elastic member 291.

Accordingly, the hinge structure 200 and/or the electronic device 100 may provide the unfolding detent function by which the first arm cam 254 and the second arm cam 255 are returned to the flat state when a relatively small force is applied. For example, the hinge structure 200 and/or the electronic device 100 may provide the unfolding detent section illustrated in FIG. 9.

Figure 14A:
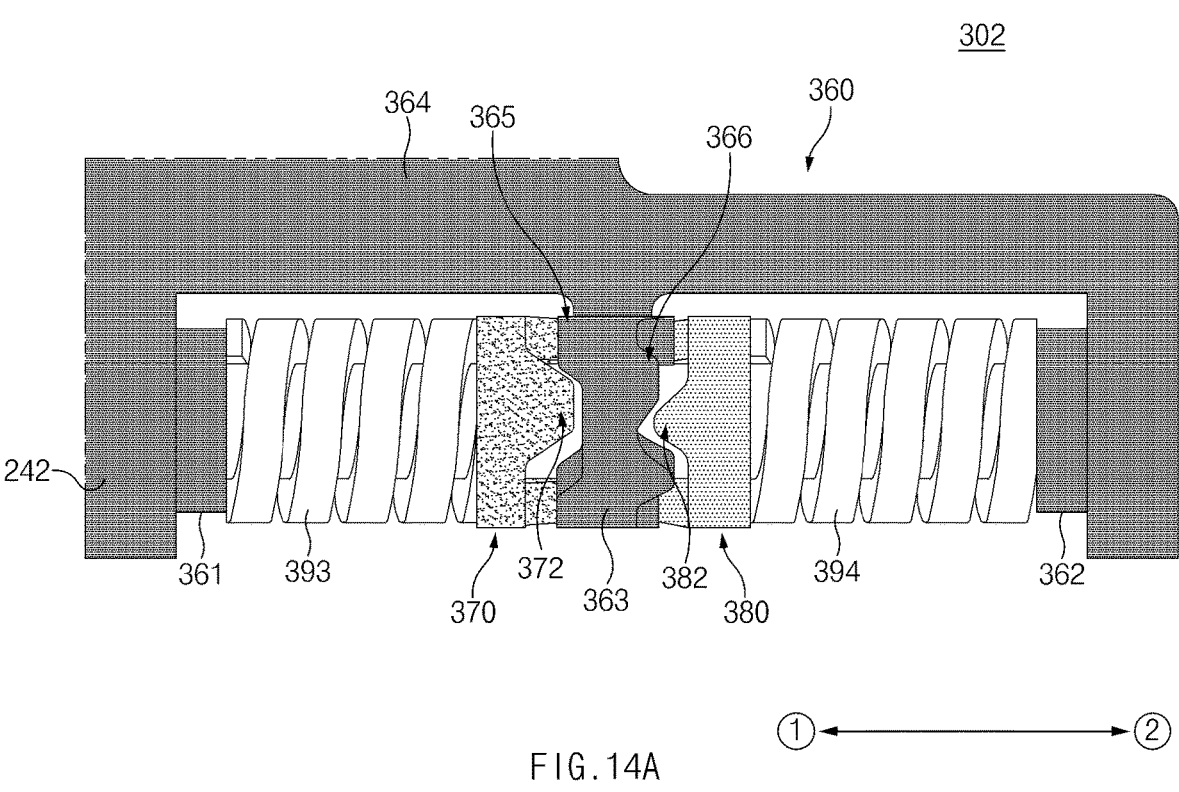
FIGS. 14A and 14B are views illustrating a friction structure of the hinge structure according to another embodiment.
Figure 14B:
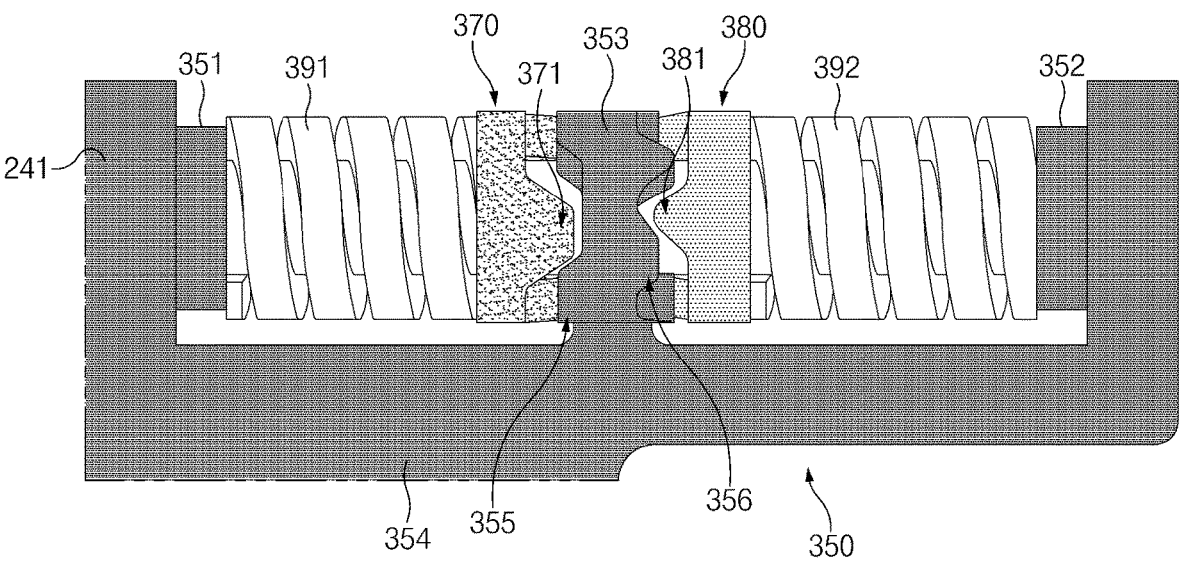

FIGS. 14A and 14B are views illustrating a friction structure of the hinge structure according to another embodiment.

In the other embodiment, the friction structure 302 may include a first arm cam 355 (e.g., the first arm cam 254 of FIG. 5B), a second arm cam 356 (e.g., the second arm cam 255 of FIG. 5B), a third arm cam 365 (e.g., the third arm cam 264 of FIG. 5A), a fourth arm cam 366 (e.g., the fourth arm cam 265 of FIG. 5A), a first cam member 370 (e.g., the first cam member 270 of FIGS. 5A and 5B), a second cam member 380 (e.g., the second cam member 280 of FIGS. 5A and 5B), a first elastic member 391, a second elastic member 392, a third elastic member 393, and a fourth elastic member 394. In describing the embodiment illustrated in FIGS. 14A and 14B, repetitive descriptions identical to ones given with reference to FIGS. 3A to 13B will be omitted.

Referring to FIG. 14B, a first arm part 350 may include a first coupling portion 351 through which the first arm shat 241 passes, a second coupling portion 352 spaced apart from the first coupling portion 351 in the second axial direction ②, a first double-sided cam portion 353 formed between the first coupling portion 351 and the second coupling portion 352 in the axial direction, and a first extending portion 354. The first extending portion 354 may be a portion extending from the first coupling portion 351, the second coupling portion 352, and the first double-sided cam portion 353 in a direction substantially perpendicular to the first arm shaft 241. The first extending portion 354 may include a first sliding pin (e.g., the first sliding pin 256 of FIGS. 7A, 7B and 7C) that rotates together with the first arm shaft 241 and that is fastened with a first rotary structure (e.g., the first rotary structure 210 of FIGS. 7A, 7B and 7C). In various embodiments, the first coupling portion 351, the second coupling portion 352, and the first double-sided cam portion 353 may be coupled to the first arm shaft 241 to rotate together with the first arm shaft 241. For example, at least parts of the first coupling portion 351, the second coupling portion 352, and the first double-sided cam portion 353 may be press-fit onto the first arm shaft 241.

Referring to FIG. 14B, the first arm cam 355 and the second arm cam 356 may be formed on the first double-sided cam portion 353. The first arm cam 355 may be formed on a surface of the first double-sided cam portion 353 that faces the first axial direction ①. For example, the first arm cam 355 may include protrusions protruding in the first axial direction ① (e.g., the first protrusions 254a of FIG. 8). The first arm cam 355 may be engaged with a first moving cam 371 of the first cam member 370. The second arm cam 356 may be formed on a surface of the first double-sided cam portion 353 that faces the second axial direction ②. For example, the second arm cam 356 may include protrusions protruding in the second axial direction ② (e.g., the second protrusions 255a of FIG. 8). The second arm cam 356 may be engaged with a third moving cam 381 of the second cam member 380.

Referring to FIG. 14A, a second arm part 360 may include a third coupling portion 361 through which the second arm shat 242 passes, a fourth coupling portion 362 spaced apart from the third coupling portion 361 in the second axial direction ②, a second double-sided cam portion 363 formed between the third coupling portion 361 and the fourth coupling portion 362 in the axial direction, and a second extending portion 364. The second extending portion 364 may be a portion extending from the third coupling portion 361, the fourth coupling portion 362, and the second double-sided cam portion 363 in a direction substantially perpendicular to the second arm shaft 242. The second extending portion 364 may include a second sliding pin (e.g., the second sliding pin 266 of FIGS. 7A, 7B and 7C) that rotates together with the second arm shaft 242 and that is fastened with a second rotary structure (e.g., the second rotary structure 220 of FIGS. 7A, 7B and 7C). In various embodiments, the third coupling portion 361, the fourth coupling portion 362, and the second double-sided cam portion 363 may be coupled to the second arm shaft 242 to rotate together with the second arm shaft 242. For example, at least parts of the third coupling portion 361, the fourth coupling portion 362, and the second double-sided cam portion 363 may be press-fit onto the second arm shaft 242.

Referring to FIG. 14A, the third arm cam 365 and the fourth arm cam 366 may be formed on the second double-sided cam portion 363. The third arm cam 365 may be formed on a surface of the second double-sided cam portion 363 that faces the first axial direction ①. For example, the third arm cam 365 may include protrusions protruding in the first axial direction ① (e.g., the first protrusions 254a of FIG. 8). The third arm cam 365 may be engaged with a second moving cam 372 of the first cam member 370. The fourth arm cam 366 may be formed on a surface of the second double-sided cam portion 363 that faces the second axial direction ②. For example, the fourth arm cam 366 may include protrusions protruding in the second axial direction ② (e.g., the second protrusions 255a of FIG. 8). The fourth arm cam 366 may be engaged with a fourth moving cam 382 of the second cam member 380.

In an embodiment, the first cam member 370 may include a first portion 370a through which the first arm shaft 241 passes and a second portion 370b through which the second arm shaft 242 passes. In an embodiment, the first moving cam 371 may be formed on the first portion 370a. The first moving cam 371 may be engaged with the first arm cam 355. For example, the first moving cam 371 may include portions protruding in the second axial direction ②. In an embodiment, the second moving cam 372 may be formed on the second portion 370b. The second moving cam 372 may be engaged with the third arm cam 365. For example, the second moving cam 372 may include portions protruding in the second axial direction ②. In an embodiment, the first portion 370a and the second portion 370b may be connected by a first bridge portion (e.g., the first bridge portion 270c of FIGS. 5A and 5B), and when the first arm shaft 241 and the second arm shaft 242 rotate, the first cam member 370 may move in the axial direction without rotating.

In an embodiment, the second cam member 380 may include a third portion 380a through which the first arm shaft 241 passes and a fourth portion 380b through which the second arm shaft 242 passes. In an embodiment, the third moving cam 381 may be formed on the third portion. The third moving cam 381 may be engaged with the second arm cam 356. For example, the third moving cam 381 may include portions protruding in the first axial direction ①. In an embodiment, the fourth moving cam 382 may be formed on the fourth portion 380b. The fourth moving cam 382 may be engaged with the fourth arm cam 366. For example, the fourth moving cam 382 may include portions protruding in the first axial direction ①. In an embodiment, the third portion 380a and the fourth portion 380b may be connected by a second bridge portion (e.g., the second bridge portion 280c of FIGS. 5A and 5B), and when the first arm shaft 241 and the second arm shaft 242 rotate, the second cam member 380 may move in the axial direction without rotating.

Referring to FIG. 14B, when viewed in the second axial direction ②, the first elastic member 391, the first moving cam 371 of the first cam member 370, the first arm cam 355, the second arm cam 356, the third moving cam 381 of the second cam member 380, and the second elastic member 392 may be mounted on the first arm shaft 241.

Referring to FIG. 14B, the first elastic member 391 may be disposed between the first cam member 370 and the first coupling portion of the first arm part. The first elastic member 393 may be compressed or uncompressed in response to linear movement of the first cam member 370 in the axial direction. For example, the compressed first elastic member 391 may increase a friction force between the first moving cam 371 and the first arm cam 355. The increased friction force may provide torque to rotation of the first arm shaft 241.

Referring to FIG. 14B, the second elastic member 392 may be disposed between the second cam member 380 and the second coupling portion 352 of the first arm part. The second elastic member 392 may be compressed or uncompressed in response to linear movement of the second cam member 380 in the axial direction. For example, the compressed second elastic member 392 may increase a friction force between the third moving cam 381 and the first arm cam 356. The increased friction force may provide torque to rotation of the first arm shaft 241.

Referring to FIG. 14A, when viewed in the second axial direction ②, the third elastic member 393, the second moving cam 372 of the first cam member 370, the third arm cam 365, the fourth arm cam 366, the fourth moving cam 382 of the second cam member 380, and the fourth elastic member 394 may be mounted on the second arm shaft 242.

Referring to FIG. 14A, the third elastic member 393 may be disposed between the first cam member 370 and the third coupling portion 361 of the second arm part 360. The third elastic member 393 may be compressed or uncompressed in response to linear movement of the first cam member 370 in the axial direction. For example, the compressed third elastic member 393 may increase a friction force between the second moving cam 372 and the third arm cam 365. The increased friction force may provide torque to rotation of the second arm shaft 242.

Referring to FIG. 14A, the fourth elastic member 394 may be disposed between the second cam member 380 and the fourth coupling portion 362 of the second arm part 360. The fourth elastic member 394 may be compressed or uncompressed in response to linear movement of the second cam member 380 in the axial direction. For example, the compressed fourth elastic member 394 may increase a friction force between the fourth moving cam 382 and the second arm cam 366. The increased friction force may provide torque to rotation of the second arm shaft 242.

When compared to the friction structure 202 illustrated in FIGS. 5A and 5B, the friction structure 302 illustrated in FIGS. 14A and 14B may further include the two elastic members 393 and 394, thereby securing resistance to wear depending on repeated rotation and operation reliability.

An electronic device 100 according to embodiments of the disclosure may include a housing including a first housing 110 including a first edge parallel to an axial direction and a second housing 120 including a second edge parallel to the axial direction, a display 140 extending from the first housing 110 to the second housing 120, and a hinge structure 200 connected to the first housing 110 and the second housing 120.

The electronic device may include a fully folded state Sf in which the first edge P3 and the second edge P4 at least partially make contact with each other, a first state S1 in which the first edge P3 and the second edge P4 form a first included angle, a second state S2 in which the first edge P3 and the second edge P4 form a second included angle A2 greater than the first included angle A1 and smaller than 180 degrees, a third state S3 in which the first edge P3 and the second edge P4 form a third included angle greater than the second included angle A2 and smaller than 180 degrees, and a flat state Su in which the first edge P3 and the second edge P4 form an angle of 180 degrees.

The hinge structure 200 may include a fixed structure 230, a first rotary structure 210 coupled to the fixed structure 230 to rotate about a first rotational axis R1 parallel to the axial direction and connected to the first housing 110, and a second rotary structure 220 coupled to the fixed structure

230 to rotate about a second rotational axis R2 parallel to the axial direction and connected to the second housing 120.

In an embodiment, the hinge structure 200 may include a torque structure for providing torques related to rotation of the first rotary structure 210 and the second rotary structure 220.

The torque structure may include: a first arm shaft 241 and a second arm shaft 242 that are connected to the fixed structure 230 so as to be rotatable and that extend in the axial direction;

a first arm part 250 that is coupled to the first arm shaft 241 to rotate together with the first arm shaft 241 and connected to the first rotary structure 210 and that includes a first coupling portion 251 coupled to one portion of the first arm shaft 241 and a second coupling portion 252 spaced apart from the first coupling portion 251 in the axial direction and coupled to another portion of the first arm shaft 241;

a second arm part 260 that is coupled to the second arm shaft 242 to rotate together with the second arm shaft 242 and connected to the second rotary structure 220 and that includes a third coupling portion 261 coupled to one portion of the second arm shaft 242 and a fourth coupling portion 262 spaced apart from the third coupling portion 261 in the axial direction and coupled to another portion of the second arm shaft 242, wherein the first arm part 250 includes a first arm cam 254 formed on the first coupling portion 251 and formed around the first arm shaft 241 and a second arm cam 255 formed on the second coupling portion 252 and formed around the first arm shaft 241, and the second arm part 260 includes a third arm cam 264 formed on the third coupling portion 261 and formed around the second arm shaft 242 and a fourth arm cam 265 formed on the fourth coupling portion 262 and formed around the second arm shaft 242;

a first cam member 270 including a first cam portion 270*a* that is located between the first coupling portion 251 and the second coupling portion 252 of the first arm part 250 and through which the first arm shaft 241 passes, the first cam portion 270*a* including a first moving cam 271 engaged with the first arm cam 254, a second cam portion 270*b* that is located between the third coupling portion and the fourth coupling portion 262 of the second arm part 260 and through which the second arm shaft 242 passes, the second cam portion 270*b* including a second moving cam 272 engaged with the third arm cam 264, and a first bridge portion 270*c* connecting the first cam portion 270*a* and the second cam portion 270*b*;

a second cam member 280 including a third cam portion 280*a* that is located between the first coupling portion 251 and the second coupling portion 252 of the first arm part 250 and through which the first arm shaft 241 passes, the third cam portion 280*a* including a third moving cam 281 engaged with the second arm cam 255, a fourth cam portion 280*b* that is located between the third coupling portion 261 and the fourth coupling portion 262 of the second arm part 260 and through which the second arm shaft 242 passes, the fourth cam portion 280*b* including a fourth moving cam 282 engaged with the fourth arm cam 265, and a second bridge portion 280*c* connecting the third cam portion 280*a* and the fourth cam portion 280*b;* a first elastic member 291 located between the first cam portion 270*a* of the first cam member 270 and the third cam portion 280a of the second cam member 280 and coupled to the first arm shaft 241; and a second elastic member 292 located between the second cam portion 270b of the first cam member 270 and the fourth cam portion 280b of the second cam member 280 and coupled to the second arm shaft 242.

The first cam member 270 and the second cam member 280 may compress the first elastic member 291 and the second elastic member 292, or may linearly move in the axial direction such that the second elastic member 292 is uncompressed.

In an embodiment, the first arm cam 254 and the third arm cam 264 may include first protrusions 254a that protrude toward the first moving cam 271 and the second moving cam 272, respectively.

In an embodiment, the second arm cam 255 and the fourth arm cam 265 may include second protrusions 255a that protrude toward the third moving cam 281 and the fourth moving cam 282, respectively.

In an embodiment, the first moving cam 271 and the second moving cam 272 of the first cam member 270 may include third protrusions 271a that protrude toward the first arm cam 254 and the third arm cam 264 and third depressions 271b located on opposite sides of the third protrusions 271a.

In an embodiment, the third moving cam 281 and the fourth moving cam 282 of the second cam member 280 may include fourth protrusions 281a that protrude toward the second arm cam 255 and the fourth arm cam 265, fourth depressions 281b located on one side of the first protrusions 281a, third inclined surfaces 281e extending from the fourth depressions 281b to the fourth protrusions 281a, fifth protrusions 281c located on an opposite side of the fourth protrusions 281a and protruding toward the second arm cam 255 and the fourth arm cam 265, fifth depressions 281d located between the fourth protrusions 281a and the fifth protrusions 281c, fourth inclined surfaces 281f extending from the fourth protrusions 281a to the fifth depressions 281d, and fifth inclined surfaces 281g extending from the fifth depressions 281d to the fifth protrusions 281c.

In an embodiment, the hinge structure 200 may be configured such that the second protrusions 255a make contact with the fourth inclined surfaces 281f in the fully folded state Sf, the second protrusions 255a make contact with the fourth protrusions 281a in the first state S1, and at least portions of the second protrusions 255a are accommodated in the fifth depressions 281d in the second state S2.

In an embodiment, the hinge structure 200 may be configured such that when the electronic device is unfolded from the fully folded state Sf to the second state S2, the second protrusions 255a pass over the fourth protrusions 281a and move into the fifth depressions 281d.

In various embodiments, the electronic device may include a state 3-1 S3-1 in which the first edge P3 and the second edge P3 form an included angle 3-1 A31 greater than the second included angle A2 and smaller than 180 degrees, a state 3-2 S3-2 in which the first edge P3 and the second edge P3 form an included angle 3-2 A32 greater than the included angle 3-1 A31 and smaller than 180 degrees, and a free-stop section defined from the state 3-1 S3-1 to the state 3-2 S3-2. In the free-stop section, the first cam member 270 and the second cam member 280 may be fixed in specified positions in the axial direction, and the first elastic member 291 and the second elastic member 292 may remain more compressed than in the second state S2.

In various embodiments, the hinge structure 200 may be configured such that in the free-stop section, the first protrusions 254a make contact with the third protrusions 271a and the second protrusions 255a make contact with the fifth protrusions 281c.

In various embodiments, the hinge structure 200 may be configured such that when the electronic device enters the free-stop section, the first protrusions 254a start to make contact with the third protrusions 271a and the second protrusions 255a start to make contact with the fifth protrusions 281c, and the hinge structure 200 may be configured such that when the electronic device departs from the free-stop section, the first protrusions 254a stop making contact with the third protrusions 271a and the second protrusions 255a stop making contact with the fifth protrusions 281c.

In various embodiments, the hinge structure 200 may be configured such that when the electronic device changes from the free-stop section to the flat state, the first elastic member 291 and the second elastic member 292 are uncompressed.

In various embodiments, the hinge structure 200 may be configured such that the first elastic member 291 and the second elastic member 292 have a first length in the axial direction in the fully folded state, a second length smaller than the first length in the first state, and a third length greater than the first length in the second state.

In various embodiments, the hinge structure may be configured such that when the electronic device changes from the fully folded state to the first state S1, the first elastic member 291 and the second elastic member 292 are compressed by a first displacement ΔL1 in the axial direction and when the electronic device changes from the first state S1 to the second state S2, the first elastic member 291 and the second elastic member 292 are uncompressed by a second displacement ΔL2 greater than the first displacement ΔL1 in the axial direction.

In various embodiments, the hinge structure 200 may be configured such that when the electronic device changes from the fully folded state Sf to the second state S2, at least portions of the first protrusions 254a are located in the third depressions 271b.

In various embodiments, in a case in which the electronic device changes from the fully folded state Sf to the second state S2, the first cam member 270 may be fixed in a specified position when viewed in the axial direction.

In various embodiments, the first arm shaft 241 and the second arm shaft 242 may rotate by a first rotation angle from the fully folded state to the first state S1 and may rotate by a second rotation angle greater than the first rotation angle from the first state S1 to the second state S2.

In various embodiments, the fourth protrusions 281a may protrude to a fourth height h4 from one of the fourth depressions 281b or the fifth depressions 281d, and the fifth protrusions 281c may protrude to a fifth height h5 greater than the fourth height h4 from one of the fourth depressions 281b or the fifth depressions 281d.

In various embodiments, when the electronic device changes from the fully folded state to the first state S1, the first elastic member 291 and the second elastic member 292 may be compressed by a first displacement ΔL1 in the axial direction and when the electronic device changes from the first state S1 to the second state S2, the first elastic member 291 and the second elastic member 292 may be uncompressed by a second displacement ΔL2 greater than the first displacement ΔL1 in the axial direction. The fourth height h4 may be greater than the first displacement ΔL1 and may be substantially the same as the second displacement ΔL2.

In various embodiments, the second cam member 280, when viewed in the axial direction, may be spaced apart from the first cam member 270 by a first distance in the fully folded state, may be spaced apart from the first cam member 270 by a second distance smaller than the first distance in the first state S1, and may be spaced apart from the first cam member 270 by a third distance greater than the first distance in the second state S2.

In various embodiments, the fourth protrusions 281*a* and the fifth protrusions 281*c* may include substantially flat protruding surfaces, and the protruding surfaces included in the fourth protrusions 281*a* may have a smaller area than the protruding surfaces included in the fifth protrusions 281*c*.

In various embodiments, circumferential directions having the first arm shaft 241 and the second arm shaft 242 as the centers is shown for the third moving cam 281 and the fourth moving cam 282, the protruding surfaces of the fourth protrusions 281*a* may extend to have a first angular displacement along the circumferential directions, and the protruding surfaces of the fifth protrusions 281*c* may extend to have a second angular displacement greater than the first angular displacement along the circumferential directions.

An electronic device according to embodiments of the disclosure may include a housing including a first housing 110 including a first edge P3 parallel to an axial direction and a second housing 120 including a second edge P4 parallel to the axial direction, a display 140 extending from the first housing 110 to the second housing 120, and a hinge structure 200 connected to the first housing 110 and the second housing 120 such that the first housing 110 rotates about a first rotational axis R1 parallel to the axial direction and the second housing 120 rotates about a second rotational axis R2 parallel to the axial direction.

The electronic device 100 may include a fully folded state Sf in which the first edge P3 and the second edge P4 at least partially make contact with each other, a first state in which the first edge P3 and the second edge P4 form a first included angle, a second state S2 in which the first edge P3 and the second edge P4 form a second included angle A2 greater than the first included angle A1 and smaller than 180 degrees, a state 3-1 S3-1 in which the first edge and the second edge form an included angle 3-1 A31 greater than the second included angle and smaller than 180 degrees, a state 3-2 S3-2 in which the first edge and the second edge form an included angle 3-2 greater than the included angle 3-1 A31 and smaller than 180 degrees, and a flat state in which the first edge P3 and the second edge P4 form an angle of 180 degrees.

The electronic device may include a folding detent section defined from the fully folded state Sf to the first stat S1, an automatic unfolding section defined from the first state S1 to the second state S2, a free-stop section defined from the state 3-1 S3-1 to the state 3-2 S3-2, and an unfolding detent section defined from the state 3-2 S3-2 to the flat state Su.

The hinge structure may include a first arm shaft 241 that rotates in conjunction with rotation of the first rotary structure 210, first cam structures 254, 271, 281, and 255 coupled to the first arm shaft 241, and a first elastic member 291 compressed or uncompressed by the first cam structures 254, 271, 281, and 255 and may include a second arm shaft 242 that rotates in conjunction with rotation of the second rotary structure 220, second cam structures 264, 272, 282, and 265 coupled to the second arm shaft 242, and a second elastic member 292 compressed or uncompressed by the second cam structures 264, 272, 282, and 265.

In the folding detent section, the first elastic member 291 and the second elastic member 292 may be compressed as the included angle A increases, and in the automatic unfolding section and the unfolding detent section, the first elastic member 291 and the second elastic member 292 may be uncompressed as the included angle A increases.

In various embodiments, when an unfolding trigger making the included angle A larger than the first angle A1 is applied in the fully folded state Sf, the electronic device may provide a semi-automatic unfolding function by which the electronic device is unfolded to the second angle A2 by the elastic forces of the first elastic member 291 and the second elastic member 292.

In various embodiments, the difference between the second angle A2 and the first angle A1 may be greater than the difference between the first angle A1 and the included angle in the fully folded state Sf, and the difference between the second angle A2 and the first angle A2 may be smaller than the difference between the angle 3-2 A32 and the angle 3-1 A31.

In various embodiments, the slope of a change in the length of the first elastic member 291 and the second elastic member 292 with respect to an increase in the included angle A is shown. The slope may have a negative value in the folding detent section and the section from the second state S2 to the state 3-1 S3-1. The slope may have a negative value in the automatic unfolding section and the unfolding detent section. The slope may have a first magnitude g1 in the automatic unfolding section and may have a second magnitude g2 smaller than the first magnitude g1 in the unfolding detent section.

In various embodiments, in the free-stop section, the first elastic member 291 and the second elastic member 292 may remain in a compressed state irrespective of the included angle A.

Figures 15A, 15B:
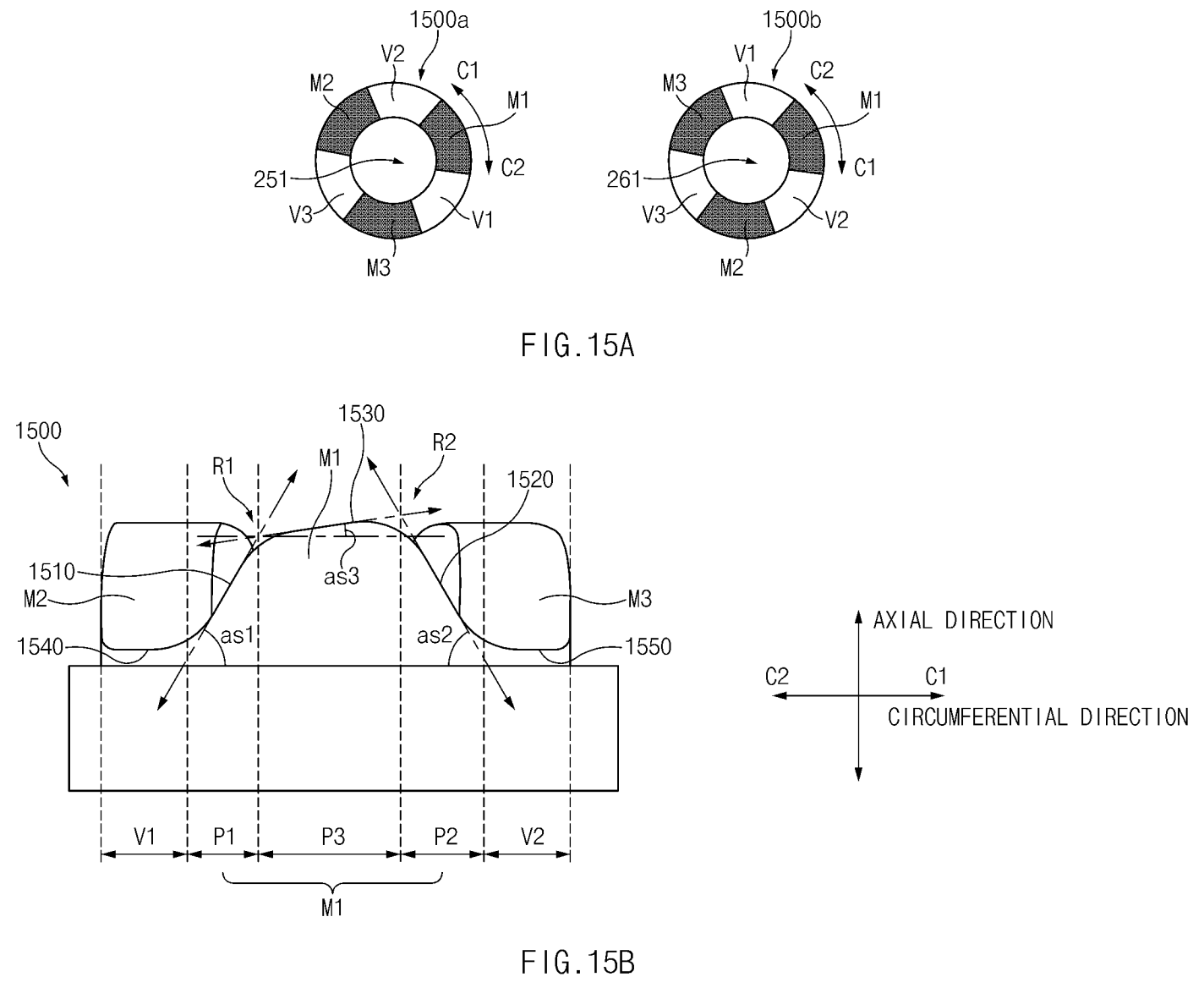

FIGS. 15A and 15B is a view illustrating another example of the cams of the hinge structure according to an embodiment.

Referring to FIG. 15A, a cam structure 1500 according to an embodiment may include a first cam structure 1500*a* coupled to the first arm shaft 241 and a second cam structure 1500*b* coupled to the second arm shaft 242.

Each of the first cam structure 1500*a* and the second cam structure 1500*b* may include a plurality of protrusions M1, M2, and M3 and a plurality of depressions V1, V2, and V3. In FIG. 15A, the cam 1500 is illustrated as including the three protrusions M1, M2, and M3 and the three depressions V1, V2, and V3. However, the disclosure is not limited thereto. For example, the cam structure 1500 may have a structure including two or more protrusions and two or more depressions.

In an embodiment, the plurality of protrusions M1, M2, and M3 may all have the same structure. Alternatively, at least one protrusion among the plurality of protrusions M1, M2, and M3 may have a form different from those of the other protrusions. In some embodiments, the plurality of protrusions M1, M2, and M3 may include a protrusion having a third inclination angle as3 illustrated in FIG. 15B and a protrusion having a flat protruding surface (e.g., the protrusions 254*a*, 255*a*, 271*a*, and 281*c* of FIG. 8).

In describing the illustrated embodiment, circumferential directions C1 and C2 whose center coincides with the arm shafts 241 and 242, to which the illustrated cam structure 1500 is coupled, are defined. The circumferential directions C1 and C2 may be directions perpendicular to the axial direction. For example, in the first cam structure 1500*a*, the first circumferential direction C1 may be the counterclockwise direction and may be the right direction based on FIG. 15B. In the first cam structure 1500*a*, the second circumferential direction C2 may be the clockwise direction and may be the left direction based on FIG. 15B. For example, in the second cam structure 1500b, the first circumferential direction C1 may be the clockwise direction and may be the right direction based on FIG. 15B. In the second cam structure 1500b, the second circumferential direction C2 may be the counterclockwise direction and may be the left direction based on FIG. 15B.

The following description will be focused on the first protrusion M1 among the plurality of protrusions M1, M2, and M3.

In an embodiment, the cam structure 1500 may include the first protrusion M1, the first depression V1, and the second depression V2. Referring to the drawing, the first depression V1 may be formed on one side of the first protrusion M1 in the circumferential direction C, and the second depression V2 may be formed on an opposite side of the first protrusion M1 in the circumferential direction C. In an embodiment, the first protrusion M1 may include a first portion P1 including a first inclined surface 1510, a second portion P2 including a second inclined surface 1520, and a third portion P3 including a third inclined surface 1530.

In an embodiment, the first inclined surface 1510, when viewed in the first circumferential direction C1, may extend from a first recessed surface 1540 of the first depression V1 to a protruding surface of the first protrusion M1. For example, the first inclined surface 1510 may extend obliquely upward from the first recessed surface when viewed in the first circumferential direction C1 and may extend obliquely downward from the protruding surface of the first protrusion M1 when viewed in the second circumferential direction C2. In an embodiment, the first inclined surface 1510 may have a first inclination angle as1 with respect to the circumferential direction C. In various embodiments, the first inclination angle as1 may differ from a second inclination angle as2.

In an embodiment, the second inclined surface 1520, when viewed in the first circumferential direction C1, may extend from the protruding surface of the first protrusion M1 to a second recessed surface 1550 of the second depression V2. For example, the second inclined surface 1520 may extend obliquely downward from the protruding surface of the first protrusion M1 when viewed in the first circumferential direction C1 and may extend obliquely upward from the second recessed surface 1550 when viewed in the second circumferential direction C2. In an embodiment, the second inclined surface 1520 may have the second inclination angle as2 with respect to the circumferential direction C. In various embodiments, the second inclination angle as2 may differ from the first inclination angle as1.

In an embodiment, the protruding surface of the first protrusion M1 may include the third inclined surface 1530. The third inclined surface 1530 may extend from the first inclined surface 1510 to the second inclined surface 1520 when viewed in the first circumferential direction C1. For example, the third inclined surface 1530 may extend obliquely upward from the first inclined surface 1510 when viewed in the first circumferential direction C1 and may extend obliquely downward from the second inclined surface 1520 when viewed in the second circumferential direction C2. In an embodiment, the third inclined surface 1530 may have the third inclination angle as3 with respect to the circumferential direction C. For example, the absolute value of the third inclination angle as3 may be smaller than the absolute values of the first inclination angle as1 and the second inclination angle as2.

In various embodiments, the first inclination angle as1, the second inclination angle as2, and the third inclination angle as3 may include an acute angle smaller than 90 degrees with respect to the circumferential direction C.

In various embodiments, the first inclined surface 1510 and the third inclined surface 1530 may be connected by a round surface having a first curvature. The second inclined surface 1520 and the third inclined surface 1530 may be connected by a round surface having a second curvature. For example, the protruding surface of the first protrusion M1 may further include rounded curved regions formed on opposite sides of the third inclined surface 1530.

Figure 16:
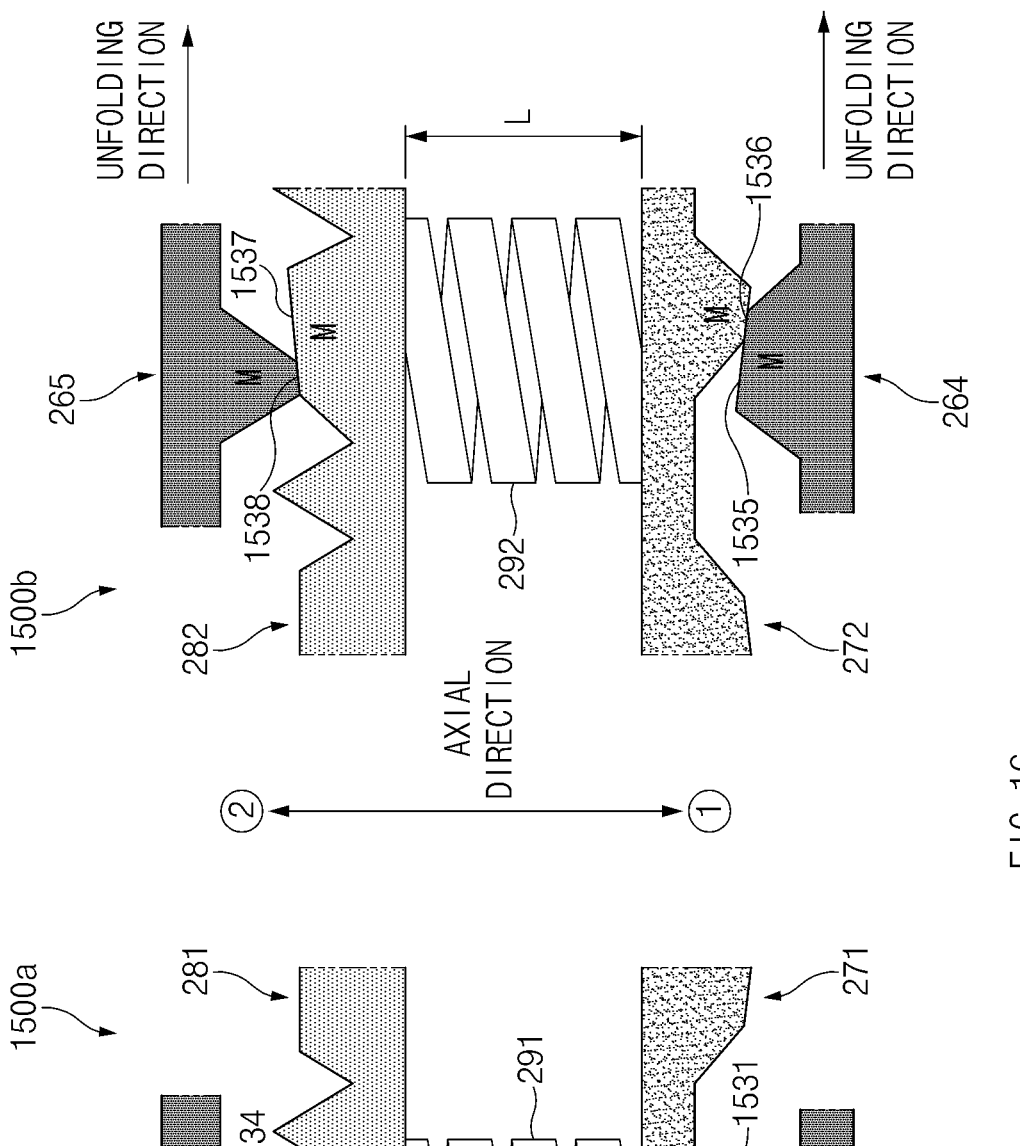
FIG. 16 is a view illustrating another example of first cam structures and second cam structures of the hinge structure according to an embodiment.

FIG. 16 is a view illustrating another example of the first cam structures and the second cam structures of the hinge structure according to an embodiment. FIG. 16 is a view illustrating a case in which the hinge structure is in a free-stop state. For example, at least one of cam structures illustrated in FIG. 16 may include the cam illustrated in FIGS. 15A and 15B.

The directions in which the arm shafts 241 and 242 rotate when the electronic device 100 and/or the hinge structure 200 is unfolded may be defined as unfolding directions. For example, the unfolding directions may be directions in which the included angle A of FIG. 9 is increased.

First cam structures 1500a illustrated may be structures coupled to or mounted on the first arm shaft 241 and may include a first arm cam 254, a first moving cam 271 of a first cam member 270, a third moving cam 281 of a second cam member 280, and a second arm cam 255. For example, referring to FIGS. 7A, 7B and 7C together, when the electronic device and/or the hinge structure is unfolded, the first arm cam 254 and the second arm cam 255 may rotate in the counterclockwise direction together with the first arm shaft 254, and the first arm cam 254 and the second arm cam 255 may move rightward in the profiles illustrated in FIG. 8. Furthermore, the first cam member 270 and the second cam member 280 may linearly move in the axial direction.

Second cam structures 1500b illustrated may be structures coupled to or mounted on the second arm shaft 242 and may include a third arm cam 264, a second moving cam 272 of the first cam member 270, a fourth moving cam 282 of the second cam member 280, and a fourth arm cam 265. For example, referring to FIGS. 7A, 7B and 7C together, when the electronic device 100 and/or the hinge structure 200 is unfolded, the third arm cam 264 and the fourth arm cam 265 may rotate in the clockwise direction together with the second arm shaft 242, and the third arm cam 263 and the fourth arm cam 265 may move rightward in the profiles illustrated in FIG. 8.

In the electronic device 100 and/or the hinge structure 200 in a folded state (e.g., FIGS. 2B and 2C), restoring torques caused by restoring forces of the display may be applied to the first arm shaft 241 and the second arm shaft 242. The restoring torques of the display may be forces acting by a property of the display by which a curved region (e.g., the folding region 143 of FIGS. 2B and 2C) tends to return to a flat state. That is, the restoring torques of the display may act in the unfolding directions. For example, referring to FIGS. 6A to 7C, restoring torque of the display may act on the first arm shaft 241, the first arm part 250, and the first rotary structure 210 in the counterclockwise direction, and restoring torque of the display may act on the second arm shaft 242, the second arm part 260, and the second rotary structure 220 in the clockwise direction. The restoring torques of the display may be increased as the electronic device 100 and/or the hinge structure 200 approaches to a fully folded state. The restoring torques of the display may be increased as the thickness or area of the display is increased. For example, due to the restoring torques, the electronic device including a large display may perform an unfolding operation not intended by the user. For example, the electronic device 100 and/or the hinge structure 200 may be unfolded without maintaining the free-stop state. To solve this problem, the hinge structure 200 and/or the electronic device 100 according to an embodiment may include the friction structure 202 for providing friction torques to the arm shafts, and the friction torques may act in the folding directions in the free-stop section and may be greater than the restoring torques of the display.

Protrusions M of the first cam structures 1500*a* may make surface-to-surface contact with each other in the free-stop section. The protrusions M of the first cam structures 1500*a* may include third inclined surfaces (e.g., the third inclined surface 1530 of FIG. 15B) formed to make surface-to-surface contact with each other in the free stop section. For example, the first arm cam 254, the first moving cam 271, the third moving cam 281, and the second arm cam 255 may include an inclined surface 3-1 1531, an inclined surface 3-2 1532, an inclined surface 3-3 1533, and an inclined surface 3-4 1534, respectively.

The third inclined surfaces 1531, 1532, 1533, and 1534 included in the first cam structures 1500*a* may be obliquely formed in the directions in which the first elastic member 291 is further compressed when an unfolding operation is performed in the free-stop section. For example, as the first arm cam 254 and the second arm cam 255 move in the left direction that is an unfolding direction, the first moving cam 271 of the first cam member 200 may move in the second axial direction ②, the third moving cam 281 of the second cam member 280 may move in the first axial direction ①, and the first elastic member 291 may be compressed. For example, the third inclined surfaces 1531, 1532, 1533, and 1534 may be inclined in the directions in which the gap between the first cam member 270 and the second cam member 280 in the axial direction is decreased when an unfolding operation is performed in the free-stop section.

For example, the inclined surface 3-1 1531 of the first arm cam 254 may be inclined in the first axial direction ① along the unfolding direction. For example, the inclined surface 3-2 1532 of the first moving cam 271 of the first cam member 270 may be inclined in the first axial direction ① along the unfolding direction. For example, the inclined surface 3-3 1533 of the third moving cam 281 of the second cam member 280 may be inclined in the second axial direction ② along the unfolding direction. For example, the inclined surface 3-4 1534 of the second arm cam 255 may be inclined in the second axial direction ② along the unfolding direction.

In an embodiment, the third inclined surfaces 1531 and 1534 of the first arm cam 254 and the second arm cam 255 that rotate together with the first arm shaft 254 may be inclined such that a protruding height is decreased in the unfolding direction in the free-stop section. In an embodiment, the first moving cam 271 and the third moving cam 281 that do not rotate together with the first arm shaft 241 may be inclined such that a protruding height is increased in the unfolding direction in the free-stop section.

In an embodiment, the first elastic member 291 may be gradually compressed as an unfolding operation (e.g., movement of the first arm cam 254 and the second arm cam 255 to the left) is performed in the free-stop section.

Referring to the drawing, although the first cam structures 1500*a* engaged with each other are illustrated as including the third inclined surfaces 1531, 1532, 1533, and 1734 having corresponding shapes, the shapes of the first cam structures 1500*a* of the hinge structure according to an embodiment are not necessarily limited thereto. For example, one of the protrusion M of the first arm cam 254 and the protrusion M of the first moving cam 271 of the first cam member 270 that are engaged with each other may include the third inclined surface 1531 or 1532, and the other may include a flat protruding surface (e.g., FIGS. 12A, 12B and 12C). For example, one of the protrusion M of the third moving cam 281 of the second cam member 280 and the protrusion M of the second arm cam 255 that are engaged with each other may include the third inclined surface 1533 or 1534, and the other may include a flat protruding surface (e.g., FIGS. 12A, 12B and 12C).

In the free-stop section, protruding portions M of the second cam structures 1500*b* may make surface-to-surface contact with each other. The protrusions M of the second cam structures 1500*b* may include third inclined surfaces (e.g., the third inclined surface 1530 of FIG. 15B) formed to make surface-to-surface contact with each other in the free-stop section. For example, the third arm cam 264, the second moving cam 272, the fourth moving cam 282, and the fourth arm cam 265 may include an inclined surface 3-5 1535, an inclined surface 3-6 1536, an inclined surface 3-7 1537, and an inclined surface 3-8 1538, respectively.

The third inclined surfaces 1535, 1536, 1537, and 1538 included in the second cam structures 1500*b* may be obliquely formed in the directions in which the second elastic member 292 is further compressed when an unfolding operation is performed in the free-stop section. For example, as the third arm cam 264 and the fourth arm cam 265 move in the right direction that is an unfolding direction, the second moving cam 272 of the first cam member 270 may move in the second axial direction ②, the fourth moving cam 282 of the second cam member 280 may move in the first axial direction ①, and the second elastic member 292 may be compressed. For example, the third inclined surfaces 1535, 1536, 1537, and 1538 may be inclined in the directions in which the gap between the first cam member 270 and the second cam member 280 in the axial direction is decreased when an unfolding operation is performed in the free-stop section.

For example, the inclined surface 3-5 1535 of the third arm cam 264 may be inclined in the first axial direction ① along the unfolding direction. For example, the inclined surface 3-6 1536 of the second moving cam 272 of the first cam member 270 may be inclined in the first axial direction ① along the unfolding direction. For example, the inclined surface 3-7 1537 of the fourth moving cam 282 of the second cam member 280 may be inclined in the second axial direction ② along the unfolding direction. For example, the inclined surface 3-8 1538 of the fourth arm cam 265 may be inclined in the second axial direction ② along the unfolding direction.

In an embodiment, the third inclined surfaces 1535 and 1538 of the third arm cam 264 and the fourth arm cam 265 that rotate together with the second arm shaft 242 may be inclined such that a protruding height is decreased in the unfolding direction in the free-stop section. In an embodiment, the second moving cam 272 and the fourth moving cam 282 that do not rotate together with the second arm shaft 242 may be inclined such that a protruding height is increased in the free-stop section when viewed in the unfolding direction.

In an embodiment, the second elastic member 292 may be gradually compressed as an unfolding operation (e.g., movement of the third arm cam 264 and the fourth arm cam 265 to the right) is performed in the free-stop section.

Referring to the drawing, although the second cam structures 1500*b* engaged with each other are illustrated as including the third inclined surfaces 1535, 1536, 1537, and 1738 having corresponding shapes, the shapes of the second cam structures 1500*b* of the hinge structure according to an embodiment are not necessarily limited thereto. For example, one of the protrusion M of the third arm cam 264 and the protrusion M of the second moving cam 272 of the first cam member 270 that are engaged with each other may include the third inclined surface 1535 or 1536, and the other may include a flat protruding surface (e.g., FIGS. 12A, 12B and 12C). For example, one of the protrusion M of the fourth moving cam 282 of the second cam member 280 and the protrusion M of the fourth arm cam 265 that are engaged with each other may include the third inclined surface 1537 or 1538, and the other may include a flat protruding surface (e.g., FIGS. 12A, 12B and 12C).

In an embodiment, the hinge structure 200 may be configured such that in the free-stop section, rotational torques required for performing an unfolding operation are greater than rotational torques required for performing a folding operation. For example, referring to the drawing, the unfolding directions in the free-stop section may correspond to the direction in which the elastic members 291 and 292 are compressed, and the folding directions in the free-stop section may correspond to the direction in which the elastic members 291 and 292 are uncompressed. In various embodiments, the rotational torques required for performing the unfolding operation (e.g., friction torques provided by the friction structure 202) may be greater than the restoring torques of the display.

In an embodiment, in the free-stop section, the electronic device 100 and the hinge structure 200 may provide friction torques greater than the restoring torques of the display such that the elastic member 291 and 292 are not compressed even though the restoring torques of the display act in the unfolding directions. Accordingly, the electronic device 100 and the hinge structure 200 may maintain any state included in the free-stop section.

As described above, considering that the restoring torques of the display act in the unfolding directions, the hinge structure 200 according to the embodiment may include the third inclined surface 1530 such that the elastic members 291 and 292 are further compressed in an unfolding operation in the free-stop section. Accordingly, an unfolding operation not intended by the user may be prevented from being performed as an unfolding operation caused by the restoring torques of the display.

An electronic device according to embodiments of the disclosure may include a first housing 110, a second housing 120, and a hinge structure 200 connected to the first housing 110 and the second housing 120 such that the first housing 110 rotates about a first rotational axis R1 parallel to an axial direction and the second housing 120 rotates about a second rotational axis R2 parallel to the axial direction.

The hinge structure 200 may include a first arm shaft 241 that operates in conjunction with rotation of the first housing 110 and is parallel to the axial direction, a second arm shaft 242 that operates in conjunction with rotation of the second housing 120 and is parallel to the axial direction, a first arm cam 254 and a second arm cam 255 that rotate together with the first arm shaft 241, a third arm cam 264 and a fourth arm cam 265 that rotate together with the second arm shaft 242, a first cam member 270 that includes a first moving cam 271 engaged with the first arm cam 254 and a second moving cam 272 engaged with the third arm cam 264 and moves in the axial direction along the first arm shaft 241 and the second arm shaft 242, a second cam member 280 that includes a third moving cam 281 engaged with the second arm cam 255 and a fourth moving cam 282 engaged with the fourth arm cam 265 and moves in the axial direction along the first arm shaft 241 and the second arm shaft 242, a first elastic member 291 coupled to the first arm shaft 241 and disposed between the first cam member 270 and the second cam member 280, and a second elastic member 292 coupled to the second arm shaft 242 and disposed between the first cam member 270 and the second cam member 280.

The electronic device 100 may include a free-stop section defined between a fully folded state Sf and a flat state Su, a first state S1 defined between the free-stop section and the fully folded state Sf, and a second state S2 in which the electronic device 100 is further unfolded than in the first state S1, the second state S2 being defined between the free-stop section and the fully folded state.

The hinge structure 200 may be configured such that when the electronic device 100 changes from the fully folded state Sf to the second state S2, the first cam member 270 is fixed in a specified position in the axial direction and the second cam member 280 moves in the axial direction.

In various embodiments, the hinge structure 200 may be configured such that when the electronic device 100 changes from the fully folded state Sf to the first state S1, the second cam member 280 moves in a direction toward the first cam member 270 and the first elastic member 291 and the second elastic member 292 are compressed and when the electronic device 100 changes from the first state S1 to the second state S2, the second cam member 280 moves in a direction away from the first cam member 270 and the first elastic member 291 and the second elastic member 292 are uncompressed.

In various embodiments, each of the first elastic member 291 and the second elastic member 292 may be compressed by a first displacement $\Delta L1$ from the fully folded state Sf to the first state S1 and may be uncompressed by a second displacement $\Delta L2$ greater than the first displacement $\Delta L1$ from the first state S1 to the second state S2.

In various embodiments, the hinge structure 200 may be configured such that when the electronic device 100 changes from the second state S2 to the free-stop section, the first cam member 270 and the second cam member 280 move toward each other and the first elastic member 291 and the second elastic member 292 are compressed by a third displacement.

In various embodiments, the third displacement may be smaller than or substantially the same as the second displacement $\Delta L2$.

In various embodiments, the hinge structure 200 may be configured such that when the electronic device 100 changes from the free-stop section to the flat state Su, the first cam member 270 and the second cam member 280 move away from each other and the first elastic member 291 and the second elastic member 292 are uncompressed.

In various embodiments, as the electronic device 100 is unfolded in the free-stop section, the first cam member 270 and the second cam member 280 may move toward each other, or may be fixed in specified positions in the axial direction to maintain a constant interval therebetween, and as the electronic device 100 is unfolded in the free-stop section, each of the first elastic member 291 and the second elastic member 292 may be compressed or may remain in a compressed state.

In various embodiments, the first arm cam 254 and the third arm cam 264 may include first protrusions 254*a*, respectively. The second arm cam 255 and the fourth arm cam 265 may include second protrusion 255a, respectively. The first moving cam 271 and the second moving cam 272 may include third protrusions 271a that protrude toward the first arm cam 254 and the third arm cam 264, respectively. The third moving cam 281 and the fourth moving cam 282 may include fourth protrusions 281a and fifth protrusions 281c, respectively. The fourth protrusions 281a may protrude toward the second arm cam 255 and the fourth arm cam 265 by a fourth height h4, and the fifth protrusions 281c may protrude toward the second arm cam 255 and the fourth arm cam 265 by a fifth height h5 smaller than the fourth height h4 and may be located in unfolding directions when compared to the fourth protrusions 281a. The second protrusions 255a may at least partially make contact with the fifth protrusions 281c in the free-stop section, may at least partially make contact with the fourth protrusions 281a in the first state S1, and may be at least partially accommodated in fourth depressions 281b formed between the fourth protrusions 281a and the fifth protrusions 281c in the second state S2.

In various embodiments, protruding surfaces of the fifth protrusions 281c may have a larger area than protruding surfaces of the fourth protrusions 281a.

In various embodiments, in the fully folded state, the first protrusions 254a may be located in third depressions 271b of the first moving cam 271 and the second moving cam 272, and the second protrusions 255a may be located on inclined surfaces of the fourth protrusions 281a.

In various embodiments, when the electronic device 100 changes from the fully folded state Sf to the second state S2, the first protrusions 254a may be located in third depressions 271b of the first moving cam 271 and the second moving cam 272, the second protrusions 255a may pass over the fourth protrusions 281a and may move into fourth depressions 281b between the fourth protrusions 281a and the fifth protrusions 281c, and the first moving cam 271 and the second moving cam 272 may be fixed in specified positions in the axial direction.

In various embodiments, when the electronic device 100 changes from the fully folded state Sf to the first state S1, the first protrusions 254a may be located in the third depressions 271b, the second protrusions 255a may move to protruding surfaces of the fourth protrusions 281a along inclined surfaces of the fourth protrusions 281a, and the first elastic member 291 and the second elastic member 292 may be compressed by movement of the first cam member 270.

In various embodiments, when the electronic device 100 changes from the first state S1 to the second state S2, the first protrusions 254a may be located in the third depressions 271b, the second protrusions 255a may move from protruding surfaces of the fourth protrusions 281a to the fourth depressions 281b along inclined surfaces of the fourth protrusions 281a, and the first elastic member 291 and the second elastic member 292 may be uncompressed by movement of the first cam member 270.

In various embodiments, when the electronic device 100 changes from the second state S2 to the free-stop section, the first protrusions 254a may move to protruding surfaces of the third protrusions 271a along inclined surfaces of the third protrusions 271a, the second protrusions 255a may move to protruding surfaces of the fifth protrusions 281c along inclined surfaces of the fifth protrusions 281c, and the first elastic member 291 and the second elastic member 292 may be compressed by movement of the first cam member 270 and the second cam member 280.

In various embodiments, when the electronic device 100 changes from the free-stop section to the flat state Su, the first protrusions 254a may move along inclined surfaces of the third protrusions 271a, second protrusions 255a may move along inclined surfaces of the fifth protrusions 281c, and the first elastic member 291 and the second elastic member 292 may be uncompressed by movement of the first cam member 270 and the second cam member 280.

An electronic device according to embodiments of the disclosure may include a first housing 110, a second housing 120, a display 140 on a first surface 141 of the first housing 110 and a second surface 142 of the second housing 120, and a hinge structure 200 connected to the first housing 110 and the second housing 120. The first surface 141 and the second surface 142 may form an included angle A by rotation of the first housing 110 about a first rotational axis R1 and rotation of the second housing 120 about a second rotational axis R2 parallel to the first rotational axis R1.

The electronic device 100 may include a flat state Su in which the first surface 141 and the second surface 142 form a substantially continuous flat surface and a fully folded state Sf in which the first housing 110 and the second housing 120 are rotated such that an edge P1 of the first housing 110 and an edge P2 of the second housing 120 at least partially make contact with each other.

The hinge structure 200 may include a first arm shaft 241 that operates in conjunction with rotation of the first housing 110, a first elastic member 291 mounted on the first arm shaft 241 to provide an elastic force in an extension direction of the first arm shaft 241, a second arm shaft 242 that operates in conjunction with rotation of the second housing 120, and a second elastic member 292 mounted on the second arm shaft 242 to provide an elastic force in an extension direction of the second arm shaft 242.

The hinge structure 200 may include a folding detent section defined from the fully folded state Sf to a first state S1 having a first included angle A1, wherein in the folding detent section, the first elastic member 291 and the second elastic member 292 are compressed by a first displacement ΔL1 as the included angle A increases, an automatic unfolding section defined from the first state S1 to a second state S2 having a second included angle A2 greater than the first included angle A1, wherein in the automatic unfolding section, the first elastic member 291 and the second elastic member 292 are uncompressed by a second displacement ΔL2 as the included angle A increases, a free-stop section defined from a state 3-1 S31 having an included angle 3-1 A31 greater than the second included angle A2 to a state 3-2 S32 having an included angle 3-2 A32 greater than the included angle 3-1 A31, wherein in the free-stop section, the first elastic member 291 and the second elastic member 292 remain in a compressed state independently of the included angle A or are compressed as the included angle A increases, and an unfolding detent section defined from the state 3-2 S32 to the flat state Su, wherein in the unfolding detent section, the first elastic member 291 and the second elastic member 292 are uncompressed by a third displacement ΔL3 as the included angle A increases.

In various embodiments, the first displacement ΔL1 may have a smaller magnitude than the second displacement ΔL2.

In various embodiments, the third displacement ΔL3 may have substantially the same magnitude as the second displacement ΔL2.

In various embodiments, a magnitude of a first slope g1 corresponding to a ratio of the second displacement ΔL2 to an increment A2-A1 of the included angle A in the automatic unfolding section may be greater than a magnitude of a second slope g2 corresponding to a ratio of the third displacement ΔL3 to an increment of the included angle A in the unfolding detent section.

In various embodiments, the hinge structure 200 may provide, in the folding detent section, torques to the first arm shaft 241 and the second arm shaft 242 in directions in which the included angle A decreases and may provide, in the automatic unfolding section and the unfolding detent section, torques to the first arm shaft 241 and the second arm shaft 242 in directions in which the included angle A increases. When the included angle A is greater than the first included angle A1 by application of a trigger in the fully folded state, the electronic device 100 may be unfolded without an additional external force such that the included angle A is increased to the second included angle A2.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 130).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 130) in the form of a program module. The instruction, when executed by a processor (e.g., a processor 120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

What is claimed is:

1. An electronic device comprising:
   a first housing;
   a second housing; and
   a hinge structure connected to the first housing and the second housing such that the first housing rotates about a first rotational axis parallel to an axial direction and the second housing rotates about a second rotational axis parallel to the axial direction,
   wherein the hinge structure comprises:
      a first arm shaft configured to operate with a rotation of the first housing, the first arm shaft being parallel to the axial direction;
      a second arm shaft configured to operate with a rotation of the second housing, the second arm shaft being parallel to the axial direction;
      a first arm cam and a second arm cam, both configured to rotate together with the first arm shaft;
      a third arm cam and a fourth arm cam, both configured to rotate together with the second arm shaft;
      a first cam member comprising a first moving cam and a second moving cam, the first moving cam being engaged with the first arm cam and the second moving cam being engaged with the third arm cam, and the first cam member being configured to move in the axial direction along the first arm shaft and the second arm shaft;
      a second cam member comprising a third moving cam and a fourth moving cam, the third moving cam being engaged with the second arm cam and the fourth moving cam being engaged with the fourth arm cam, and the second cam member being configured to move in the axial direction along the first arm shaft and the second arm shaft;

a first elastic member coupled to the first arm shaft and disposed between the first cam member and the second cam member; and a second elastic member coupled to the second arm shaft and disposed between the first cam member and the second cam member, wherein the electronic device is operable to be in a free-stop section between a fully folded state and a flat state, a first state between the free-stop section and the fully folded state, and a second state in which the electronic device is further unfolded than in the first state, the second state being between the free-stop section and the fully folded state, and wherein the hinge structure is configured such that when the electronic device changes from the fully folded state to the second state, the first cam member is fixed in a specified position in the axial direction and the second cam member moves in the axial direction.

2. The electronic device of claim 1, wherein the hinge structure is configured such that:

when the electronic device changes from the fully folded state to the first state, the second cam member moves in a direction toward the first cam member and the first elastic member and the second elastic member are compressed; and when the electronic device changes from the first state to the second state, the second cam member moves in a direction away from the first cam member and the first elastic member and the second elastic member are uncompressed.

3. The electronic device of claim 1, wherein each of the first elastic member and the second elastic member is compressed by a first displacement from the fully folded state to the first state and each of the first elastic member and the second elastic member is uncompressed by a second displacement greater than the first displacement from the first state to the second state.

4. The electronic device of claim 3, wherein the hinge structure is configured such that when the electronic device changes from the second state to the free-stop section, the first cam member and the second cam member move toward each other and the first elastic member and the second elastic member are compressed by a third displacement.

5. The electronic device of claim 4, wherein the third displacement is smaller than or substantially the same as the second displacement.

6. The electronic device of claim 3, wherein the hinge structure is configured such that when the electronic device changes from the free-stop section to the flat state, the first cam member and the second cam member move away from each other and the first elastic member and the second elastic member are uncompressed.

7. The electronic device of claim 1, wherein as the electronic device is unfolded in the free-stop section, the first cam member and the second cam member move toward each other, or are fixed in specified positions in the axial direction to maintain a constant interval therebetween, and wherein as the electronic device is unfolded in the free-stop section, each of the first elastic member and the second elastic member is compressed or remains in a compressed state.

8. The electronic device of claim 1, wherein the first arm cam and the third arm cam comprise first protrusions, respectively, wherein the second arm cam and the fourth arm cam comprise second protrusions, respectively, wherein the first moving cam and the second moving cam comprise third protrusions configured to protrude toward the first arm cam and the third arm cam, respectively, wherein the third moving cam and the fourth moving cam comprise fourth protrusions and fifth protrusions, respectively, wherein the fourth protrusions protrude toward the second arm cam and the fourth arm cam by a fourth height, and the fifth protrusions protrude toward the second arm cam and the fourth arm cam by a fifth height smaller than the fourth height and are located in unfolding directions when compared to the fourth protrusions, and wherein the second protrusions at least partially make contact with the fifth protrusions in the free-stop section, at least partially make contact with the fourth protrusions in the first state, and are at least partially disposed in fourth depressions formed between the fourth protrusions and the fifth protrusions in the second state.

9. The electronic device of claim 8, wherein protruding surfaces of the fifth protrusions have a larger surface area than protruding surfaces of the fourth protrusions.

10. The electronic device of claim 8, wherein in the fully folded state, the first protrusions are disposed in third depressions of the first moving cam and the second moving cam, and the second protrusions are disposed on inclined surfaces of the fourth protrusions.

11. The electronic device of claim 8, wherein when the electronic device 100 changes from the fully folded state to the second state, the first protrusions are disposed in third depressions of the first moving cam and the second moving cam, the second protrusions pass over the fourth protrusions and move into fourth depressions between the fourth protrusions and the fifth protrusions, and the first moving cam and the second moving cam are fixed in specified positions in the axial direction.

12. The electronic device of claim 11, wherein when the electronic device changes from the fully folded state to the first state, the first protrusions are disposed in the third depressions, the second protrusions move to protruding surfaces of the fourth protrusions along inclined surfaces of the fourth protrusions, and the first elastic member and the second elastic member are compressed by movement of the first cam member.

13. The electronic device of claim 11, wherein when the electronic device changes from the first state to the second state, the first protrusions are disposed in the third depressions, the second protrusions move from protruding surfaces of the fourth protrusions to the fourth depressions along inclined surfaces of the fourth protrusions, and the first elastic member and the second elastic member are uncompressed by movement of the first cam member.

14. The electronic device of claim 8, wherein when the electronic device changes from the second state to the free-stop section, the first protrusions move to protruding surfaces of the third protrusions along inclined surfaces of the third protrusions, the second protrusions move to protruding surfaces of the fifth protrusions along inclined surfaces of the fifth protrusions, and the first elastic member and the second elastic member are compressed by movement of the first cam member and the second cam member.

15. The electronic device of claim 8, wherein when the electronic device changes from the free-stop section to the flat state, the first protrusions move along inclined surfaces of the third protrusions, second protrusions move along inclined surfaces of the fifth protrusions, and the first elastic member and the second elastic member are uncompressed by movement of the first cam member and the second cam member.

\* \* \* \* \*